United States Patent
Sakamoto

(10) Patent No.: US 11,856,176 B2
(45) Date of Patent: Dec. 26, 2023

(54) THREE-DIMENSIONAL IMAGE DISPLAY METHOD, THREE-DIMENSIONAL IMAGE DISPLAY DEVICE, AND RECORDING MEDIUM

(71) Applicant: Evident Corporation, Nagano (JP)

(72) Inventor: Yohei Sakamoto, Hachioji (JP)

(73) Assignee: Evident Corporation, Nagano (JP)

( * ) Notice: Subject to any disclaimer, the term of this patent is extended or adjusted under 35 U.S.C. 154(b) by 29 days.

(21) Appl. No.: 17/741,911

(22) Filed: May 11, 2022

(65) Prior Publication Data

US 2022/0385874 A1 Dec. 1, 2022

(30) Foreign Application Priority Data

Jun. 1, 2021 (JP) ................. 2021-092249

(51) Int. Cl.
| | |
|---|---|
| *H04N 13/156* | (2018.01) |
| *H04N 13/207* | (2018.01) |
| *H04N 13/361* | (2018.01) |
| *H04N 13/111* | (2018.01) |
| *H04N 13/167* | (2018.01) |

(52) U.S. Cl.
CPC ......... *H04N 13/156* (2018.05); *H04N 13/111* (2018.05); *H04N 13/167* (2018.05); *H04N 13/207* (2018.05); *H04N 13/361* (2018.05)

(58) Field of Classification Search
CPC .. H04N 13/156; H04N 13/111; H04N 13/167; H04N 13/207; H04N 13/361; G06T 19/00
IPC ..................................................... H04N 13/156
See application file for complete search history.

(56) References Cited

U.S. PATENT DOCUMENTS

| | | | |
|---|---|---|---|
| 10,565,737 B1* | 2/2020 | Islam | H04N 13/246 |
| 2002/0094134 A1* | 7/2002 | Nafis | G01C 11/06 |
| | | | 703/2 |
| 2005/0096515 A1* | 5/2005 | Geng | A61N 5/1049 |
| | | | 600/315 |
| 2011/0125006 A1* | 5/2011 | Yamamoto | A61B 5/064 |
| | | | 600/424 |
| 2019/0050998 A1* | 2/2019 | Kirby | H04N 13/239 |
| 2019/0269485 A1* | 9/2019 | Elbaz | A61B 1/00009 |
| 2019/0327413 A1* | 10/2019 | Lorenzo | G06T 17/05 |
| 2020/0018994 A1* | 1/2020 | Nieuwenhuis | G06N 20/00 |

(Continued)

FOREIGN PATENT DOCUMENTS

| | | |
|---|---|---|
| JP | 2010-066595 A | 3/2010 |
| JP | 6040882 B2 | 12/2016 |
| JP | 6811763 B2 | 1/2021 |

*Primary Examiner* — Tung T Vo
(74) *Attorney, Agent, or Firm* — Scully, Scott, Murphy & Presser, P.C.

(57) ABSTRACT

In a three-dimensional image display method, a processor acquires first three-dimensional data and second three-dimensional data of a subject from a recording medium. The processor converts a first three-dimensional coordinate system of the first three-dimensional data and a second three-dimensional coordinate system of the second three-dimensional data into a three-dimensional common coordinate system on the basis of structure information related to a geometric structure of the subject. The processor displays an image of the first three-dimensional data in the common coordinate system and an image of the second three-dimensional data in the common coordinate system on a display.

22 Claims, 37 Drawing Sheets

(56) References Cited

U.S. PATENT DOCUMENTS

2020/0043186 A1* 2/2020 Selviah .................... G06T 7/33
2020/0080830 A1* 3/2020 Hunter .................. G01B 5/008
2022/0079675 A1* 3/2022 Lang ..................... G02B 30/52

* cited by examiner

|  | INPUT INFORMATION | STRUCTURE INFORMATION |
|---|---|---|
| CL11 | STRAIGHT PIPE | XXX |
|  | 90-DEGREE FITTING | YYY |
|  | ... | ... |
|  | ... | ... |

TB11

ND IMAGE DISPLAY
THREE-DIMENSIONAL IMAGE DISPLAY METHOD, THREE-DIMENSIONAL IMAGE DISPLAY DEVICE, AND RECORDING MEDIUM

BACKGROUND OF THE INVENTION

Field of the Invention

The present invention relates to a three-dimensional image display method, a three-dimensional image display device, and a recording medium.

Priority is claimed on Japanese Patent Application No. 2021-092249, filed on Jun. 1, 2021, the content of which is incorporated herein by reference.

Description of Related Art

Industrial endoscope devices have been used for an inspection of internal abnormalities (damage, corrosion, and the like) of boilers, gas turbines, automobile engines, pipes, and the like. In an endoscopic inspection, an inspection worker records a still image during the inspection in order to record whether an abnormality has occurred or record severity of an abnormality as proof of the inspection. After the endoscopic inspection is completed, an inspection report is generated. In general, text indicating the state or the like of an abnormality seen in a recorded still image is attached to the inspection report along with the still image.

Position information is included in an additional item related to an abnormality. The position information indicates a position at which a recorded still image is acquired in an inspection target. The position information of a found abnormality is important when the abnormal portion is replaced or fixed, or when a next inspection is performed. A method of recording and managing position information of an abnormality is disclosed. The method associates a still image recorded during an inspection with a specific position in three-dimensional data (3D data) indicating a three-dimensional shape (3D shape) of an inspection target and visualizes a position at which the still image is acquired. By using this method, the position of the inspection target in which the still image is acquired becomes clear.

A method of acquiring 3D data of an inspection target is disclosed. The method reconfigures a 3D shape of the inspection target by using a video recorded during an inspection. In this method, a video recorded during the inspection is used. Therefore, special inspection equipment does not need to be brought in, and a blueprint or the like of the inspection target is unnecessary.

In the method of reconfiguring the 3D shape of the inspection target, a plurality of images acquired at a plurality of viewpoints need to be associated with each other. If it is difficult to associate the plurality of images with each other, there is a problem in that 3D data are divided into multiple pieces of data. For example, there is a case in which a distal end of an endoscope suddenly moves in the process of recording a video and the composition of an image greatly changes. Alternatively, there is a case in which halation or the like occurs in an image in the process of recording a video and the state of the image greatly changes. Alternatively, there is a case in which recording of a video is resumed after interruption and an inspection target seen in an image acquired after the resumption does not match an inspection target seen in an image acquired before the interruption. In these cases, 3D data are divided into multiple pieces of data.

It is preferable for a user that 3D data of the widest possible region of an inspection target be configured as a single piece of data without being divided. If multiple pieces of 3D data of the inspection target are generated, it is important to connect the multiple pieces of 3D data together and generate 3D data of a wide region of the inspection target. The following technique is disclosed as a method of connecting multiple pieces of 3D data of a partial region together so as to generate 3D data of a wide region.

A technique disclosed in Japanese Patent No. 6040882 provides a method of connecting multiple pieces of 3D data together by using a relationship between the 3D data and a two-dimensional image group used for generating the 3D data. First 3D data are associated with a first two-dimensional image group, and second 3D data are associated with a second two-dimensional image group. A first image and a second image including the same feature point are selected. The first image is included in the first two-dimensional image group, and the second image is included in the second two-dimensional image group. Translation and rotation of 3D data are performed such that the three-dimensional coordinates of the feature point in the first image match the three-dimensional coordinates of the feature point in the second image. Thereafter, errors of the three-dimensional coordinates are minimized.

A technique disclosed in each of Japanese Patent No. 6811763 and Japanese Unexamined Patent Application, First Publication No. 2010-066595 provides a method of connecting multiple pieces of 3D data together on the basis of a 3D shape indicated by the 3D data. In the technique disclosed in Japanese Patent No. 6811763, a feature of grounds, a feature of planes, or a feature of pillars is allocated to multiple pieces of 3D data of a partial region. The multiple pieces of 3D data are connected together such that the features of one piece of the 3D data match the features of another piece of the 3D data. In the technique disclosed in Japanese Unexamined Patent Application, First Publication No. 2010-066595, three planes are detected in each of the multiple pieces of 3D data. Normal lines of three planes are orthogonal to each other. The multiple pieces of 3D data are connected together such that the three planes of one piece of the 3D data match the three planes of another piece of the 3D data.

SUMMARY OF THE INVENTION

According to a first aspect of the present invention, a three-dimensional image display method includes a first acquisition step, a second acquisition step, a conversion step, and a display step. A processor connects to a recording medium storing first three-dimensional data of a subject and second three-dimensional data of the subject and acquires the first three-dimensional data from the recording medium in the first acquisition step. The first three-dimensional data include three-dimensional coordinates defined in a first three-dimensional coordinate system. The second three-dimensional data include three-dimensional coordinates defined in a second three-dimensional coordinate system different from the first three-dimensional coordinate system. At least part of a region of the subject corresponding to the first three-dimensional data is different from at least part of a region of the subject corresponding to the second three-dimensional data. The processor connects to the recording medium and acquires the second three-dimensional data from the recording medium in the second acquisition step. The processor converts the first three-dimensional coordinate system and the second three-dimensional coordinate system into a three-dimensional common coordinate system on the basis of structure information related to a geometric structure of the subject in the conversion step. The structure information is generated without using the first three-dimensional data or the second three-dimensional data. The processor displays an image of the first three-dimensional data in the common coordinate system and an image of the second three-dimensional data in the common coordinate system on a display in the display step.

According to a second aspect of the present invention, in the first aspect, the first three-dimensional data may be generated by using two or more first images acquired at two or more different viewpoints. The second three-dimensional data may be generated by using two or more second images acquired at two or more different viewpoints. At least one of the two or more first images and at least one of the two or more second images may be different from each other.

According to a third aspect of the present invention, in the second aspect, each of the two or more first images and each of the two or more second images may include time information. The processor may convert the first three-dimensional coordinate system and the second three-dimensional coordinate system into the common coordinate system on the basis of the time information in the conversion step.

According to a fourth aspect of the present invention, in the second aspect, the two or more first images may be included in two or more images included in a first video. The two or more second images may be included in two or more images included in a second video that is the same as or different from the first video.

According to a fifth aspect of the present invention, in the fourth aspect, the two or more first images and the two or more second images may be included in the same video file.

According to a sixth aspect of the present invention, in the fifth aspect, the three-dimensional image display method may further include a calculation step in which the processor calculates a position of a lost region on the basis of the number of the two or more first images, the number of the two or more second images, and the number of third images. The third images are temporally disposed between a set of the two or more first images and a set of the two or more second images in the video file. The lost region is a region of the subject different from any one of a first region of the subject and a second region of the subject. The first region corresponds to the three-dimensional coordinates included in the first three-dimensional data. The second region corresponds to the three-dimensional coordinates included in the second three-dimensional data. The processor may convert the first three-dimensional coordinate system and the second three-dimensional coordinate system into the common coordinate system on the basis of the position of the lost region in the conversion step.

According to a seventh aspect of the present invention, in the sixth aspect, the processor may calculate a shape of the lost region in the calculation step. The processor may convert the first three-dimensional coordinate system and the second three-dimensional coordinate system into the common coordinate system on the basis of the shape of the lost region in the conversion step.

According to an eighth aspect of the present invention, in the second aspect, the structure information may indicate two or more positions at which a distal end of a movable insertion unit capable of being inserted inside an object having the subject is sequentially disposed.

According to a ninth aspect of the present invention, in the eighth aspect, the structure information may include first position information and second position information. The first position information indicates two or more positions at which the distal end is sequentially disposed in order to acquire the two or more first images. The second position information indicates two or more positions at which the distal end is sequentially disposed in order to acquire the two or more second images. The three-dimensional image display method may further include a generation step in which the processor generates a position conversion parameter and a posture conversion parameter used for converting the first three-dimensional coordinate system and the second three-dimensional coordinate system into the common coordinate system on the basis of the first position information and the second position information. The processor may convert the first three-dimensional coordinate system and the second three-dimensional coordinate system into the common coordinate system by using the position conversion parameter and the posture conversion parameter in the conversion step.

According to a tenth aspect of the present invention, in the second aspect, the processor may convert the first three-dimensional coordinate system and the second three-dimensional coordinate system into the common coordinate system such that a first region of the subject and a second region of the subject are connected together in the conversion step. The first region corresponds to the three-dimensional coordinates included in the first three-dimensional data. The second region corresponds to the three-dimensional coordinates included in the second three-dimensional data. The processor may display information indicating positions of the first region and the second region on the display in the display step.

According to an eleventh aspect of the present invention, in the tenth aspect, the processor may display information indicating accuracy of connection between the first region and the second region on the display in the display step.

According to a twelfth aspect of the present invention, in the second aspect, the two or more first images and the two or more second images may be generated by an endoscope.

According to a thirteenth aspect of the present invention, in the second aspect, the two or more first images and the two or more second images may be generated on the basis of an optical image of the subject acquired through a single-eye optical system.

According to a fourteenth aspect of the present invention, in the second aspect, the three-dimensional image display method may further include a generation step in which the processor generates a scale conversion parameter used for correcting at least one of a scale of a three-dimensional shape indicated by the first three-dimensional data and a scale of a three-dimensional shape indicated by the second three-dimensional data. The processor may convert the first three-dimensional coordinate system and the second three-dimensional coordinate system into the common coordinate system by using the scale conversion parameter in the conversion step.

According to a fifteenth aspect of the present invention, in the second aspect, the structure information may be configured as design data including a design value of the geometric structure or is configured as three-dimensional data different from any of the first three-dimensional data and the second three-dimensional data.

According to a sixteenth aspect of the present invention, in the second aspect, the structure information may be generated on the basis of data output from a sensor.

According to a seventeenth aspect of the present invention, in the second aspect, the two or more first images and the two or more second images may be generated on the basis of an optical image of the subject acquired by an insertion unit. The insertion unit may be capable of being inserted inside an object having the subject and may be bendable. The structure information may be generated on the basis of information indicating a bending direction and a bending amount of the insertion unit.

According to an eighteenth aspect of the present invention, in the second aspect, the three-dimensional image display method may further include a generation step in which the processor generates a position conversion parameter and a posture conversion parameter used for converting the first three-dimensional coordinate system and the second three-dimensional coordinate system into the common coordinate system on the basis of the structure information. The processor may convert the first three-dimensional coordinate system and the second three-dimensional coordinate system into the common coordinate system by using the position conversion parameter and the posture conversion parameter in the conversion step.

According to a nineteenth aspect of the present invention, in the second aspect, the three-dimensional image display method may further include an adjustment step in which the processor adjusts at least one of a position and a posture of at least one of the first three-dimensional data and the second three-dimensional data in the common coordinate system.

According to a twentieth aspect of the present invention, in the second aspect, the subject may include two or more objects. The structure information may indicate positions at which the two or more objects are disposed.

According to a twenty-first aspect of the present invention, a three-dimensional image display device includes a processor. The processor is configured to connect to a recording medium storing first three-dimensional data of a subject and second three-dimensional data of the subject. The first three-dimensional data include three-dimensional coordinates defined in a first three-dimensional coordinate system. The second three-dimensional data include three-dimensional coordinates defined in a second three-dimensional coordinate system different from the first three-dimensional coordinate system. At least part of a region of the subject corresponding to the first three-dimensional data is different from at least part of a region of the subject corresponding to the second three-dimensional data. The processor is configured to acquire the first three-dimensional data and the second three-dimensional data from the recording medium. The processor is configured to convert the first three-dimensional coordinate system and the second three-dimensional coordinate system into a three-dimensional common coordinate system on the basis of structure information related to a geometric structure of the subject. The structure information is generated without using the first three-dimensional data or the second three-dimensional data. The processor is configured to display an image of the first three-dimensional data in the common coordinate system and an image of the second three-dimensional data in the common coordinate system on a display.

According to a twenty-second aspect of the present invention, a non-transitory computer-readable recording medium stores a program causing a computer to execute a first acquisition step, a second acquisition step, a conversion step, and a display step. The computer connects to a recording medium storing first three-dimensional data of a subject and second three-dimensional data of the subject and acquires the first three-dimensional data from the recording medium in the first acquisition step. The first three-dimensional data include three-dimensional coordinates defined in a first three-dimensional coordinate system. The second three-dimensional data include three-dimensional coordinates defined in a second three-dimensional coordinate system different from the first three-dimensional coordinate system. At least part of a region of the subject corresponding to the first three-dimensional data is different from at least part of a region of the subject corresponding to the second three-dimensional data. The computer connects to the recording medium and acquires the second three-dimensional data from the recording medium in the second acquisition step. The computer converts the first three-dimensional coordinate system and the second three-dimensional coordinate system into a three-dimensional common coordinate system on the basis of structure information related to a geometric structure of the subject in the conversion step. The structure information is generated without using the first three-dimensional data or the second three-dimensional data. The computer displays an image of the first three-dimensional data in the common coordinate system and an image of the second three-dimensional data in the common coordinate system on a display in the display step.

DETAILED DESCRIPTION OF THE INVENTION

Hereinafter, embodiments of the present invention will be described with reference to the drawings.

First Embodiment

Figure 1:
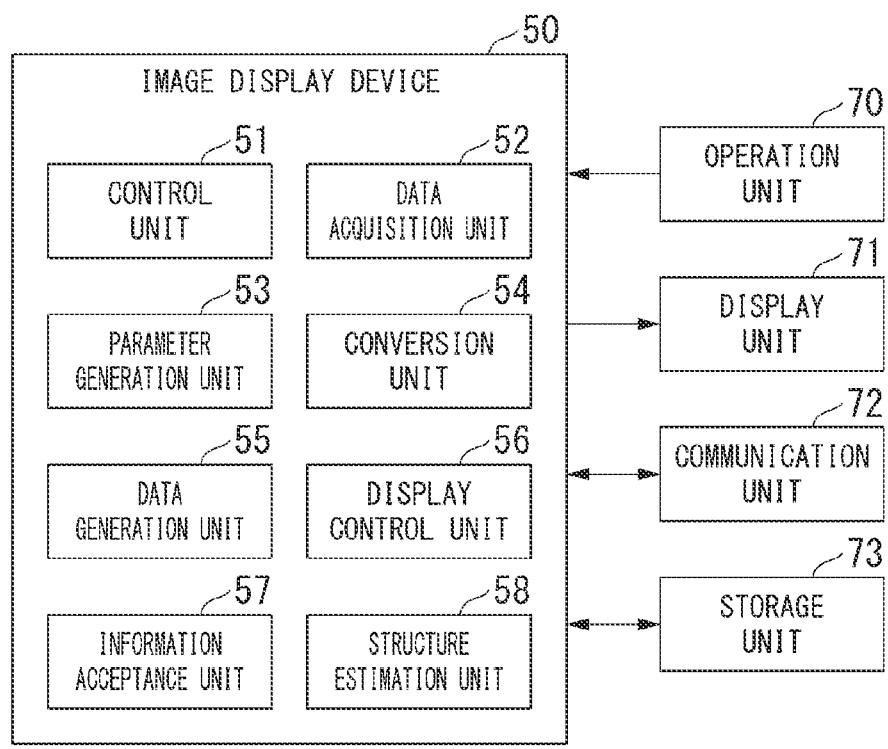
FIG. 1 is a block diagram showing a configuration of an image display device according to a first embodiment of the present invention.

FIG. 1 shows a configuration of an image display device 50 according to a first embodiment of the present invention. The image display device 50 shown in FIG. 1 includes a control unit 51, a data acquisition unit 52, a parameter generation unit 53, a conversion unit 54, a data generation unit 55, a display control unit 56, an information acceptance unit 57, and a structure estimation unit 58. An operation unit 70, a display unit 71, a communication unit 72, and a storage unit 73 shown in FIG. 1 are connected to the image display device 50. The image display device 50 may include at least one of the operation unit 70, the display unit 71, the communication unit 72, and the storage unit 73.

For example, the image display device 50 is a personal computer (PC). The image display device 50 may be any one of a desktop PC, a laptop PC, and a tablet terminal. The image display device 50 may be a computer system that operates on a cloud.

The operation unit 70 is a user interface. For example, the operation unit 70 is at least one of a button, a switch, a key, a mouse, a joystick, a touch pad, a track ball, and a touch panel. The operation unit 70 accepts an operation from a user. A user can input various kinds of information into the image display device 50 by operating the operation unit 70. The operation unit 70 accepts information input by the user and outputs the information to the image display device 50.

The display unit 71 includes a display screen and displays an image or the like of 3D data on the display screen. The display unit 71 is a monitor (display) such as a liquid crystal display (LCD). The display unit 71 may be a touch panel. In such a case, the operation unit 70 and the display unit 71 are integrated.

The communication unit 72 performs communication with an external device such as an endoscope device. For example, the communication unit 72 is connected to the external device wirelessly or by a cable. The communication between the communication unit 72 and the external device may be performed via a local area network (LAN) or the Internet.

The storage unit 73 is a nonvolatile memory. For example, the storage unit 73 is at least one of a static random-access memory (SRAM), a read-only memory (ROM), an erasable programmable read-only memory (EPROM), an electrically erasable programmable read-only memory (EEPROM), and a flash memory.

The storage unit 73 stores two or more pieces of 3D data including first 3D data and second 3D data. The storage unit 73 may include a first storage unit storing the first 3D data and a second storage unit storing the second 3D data.

The first 3D data and the second 3D data include three-dimensional coordinates (3D coordinates) of two or more points of a subject. The first 3D data and the second 3D data indicate a 3D shape of the subject. The first 3D data are generated by using two or more first images acquired at two or more different viewpoints. The second 3D data are generated by using two or more second images acquired at two or more different viewpoints. The two or more first images are not completely the same as the two or more second images. At least one of the two or more first images is different from at least one of the two or more second images. All the two or more first images may be different from any of the two or more second images. All the two or more second images may be different from any of the two or more first images.

The first 3D data and the second 3D data are different from each other. At least some of the 3D coordinates included in the first 3D data are different from those included in the second 3D data. One or more points included in the first 3D data are different from one or more points included in the second 3D data. At least some of the 3D coordinates included in the second 3D data are different from those included in the first 3D data. One or more points included in the second 3D data are different from one or more points included in the first 3D data.

All the 3D coordinates included in the first 3D data may be different from any of the 3D coordinates included in the second 3D data. All the two or more points included in the first 3D data may be different from any of all the two or more points included in the second 3D data. All the 3D coordinates included in the second 3D data may be different from any of the 3D coordinates included in the first 3D data. All the two or more points included in the second 3D data may be different from any of all the two or more points included in the first 3D data.

In other words, there is no subject region corresponding to at least part of the first 3D data in a subject region corresponding to the entire second 3D data. In addition, there is no subject region corresponding to at least part of the second 3D data in a subject region corresponding to the entire first 3D data.

A three-dimensional coordinate system (first 3D coordinate system) of the first 3D data and a three-dimensional coordinate system (second 3D coordinate system) of the second 3D data are different from each other. One of the first 3D coordinate system and the second 3D coordinate system can be converted into the other by using a parameter indicating each of a position, a posture, and a scale. At least one of the position, the posture, and the scale is different between the first 3D coordinate system and the second 3D coordinate system. The posture is defined by using three parameters. At least one parameter indicating the posture may be different between the first 3D coordinate system and the second 3D coordinate system.

At least some of the two or more viewpoints at which the two or more first images are acquired are different from any of the two or more viewpoints at which the two or more second images are acquired. All the two or more viewpoints at which the two or more first images are acquired may be different from any of the two or more viewpoints at which the two or more second images are acquired. At least some of the two or more viewpoints at which the two or more second images are acquired are different from any of the two or more viewpoints at which the two or more first images are acquired. All the two or more viewpoints at which the two or more second images are acquired may be different from any of the two or more viewpoints at which the two or more first images are acquired.

The control unit 51 controls each unit of the image display device 50.

The data acquisition unit 52 connects to the storage unit 73 and acquires the first 3D data and the second 3D data from the storage unit 73.

The parameter generation unit 53 generates a conversion parameter used for converting the first 3D coordinate system and the second 3D coordinate system into a common coordinate system. The common coordinate system is a 3D coordinate system that is common between the first 3D data and the second 3D data. The first 3D data and the second 3D data are converted into 3D data in the common coordinate system by converting the first 3D coordinate system and the second 3D coordinate system into the common coordinate system. The conversion parameter includes both a first conversion parameter used for converting the first 3D coordinate system into the common coordinate system and a second conversion parameter used for converting the second 3D coordinate system into the common coordinate system. Each of the first conversion parameter and the second conversion parameter includes both a position-and-posture conversion parameter used for conversion of the position and the posture of each 3D coordinate system and a scale conversion parameter used for conversion of the scale of each 3D coordinate system.

The conversion unit 54 converts the first 3D coordinate system and the second 3D coordinate system into the common coordinate system by using the conversion parameter generated by the parameter generation unit 53. In this way, the conversion unit 54 converts the first 3D data and the second 3D data into 3D data in the common coordinate system.

The data generation unit 55 connects together the first 3D data and the second 3D data converted by the conversion unit 54 into the 3D data in the common coordinate system. In this way, the data generation unit 55 generates 3D data of a wide range of a subject.

The display control unit 56 outputs an image of the 3D data to the display unit 71 and displays the image on the display unit 71. The display control unit 56 displays an image of the first 3D data and the second 3D data on the display unit 71. In other words, the display control unit 56 displays an image of each of the 3D shape indicated by the first 3D data and the 3D shape indicated by the second 3D data on the display unit 71. In addition, the display control unit 56 displays an image of the 3D data generated by the data generation unit 55 on the display unit 71. In other words, the display control unit 56 displays an image of the 3D shape indicated by the 3D data of a wide range of a subject on the display unit 71.

The information acceptance unit 57 accepts information output from the operation unit 70. Alternatively, the information acceptance unit 57 accepts information received by the communication unit 72. The information acceptance unit 57 may accept information corresponding to voice input into a microphone not shown in FIG. 1. The information acceptance unit 57 may accept structure information related to a geometric structure of a subject. The structure information indicates a structure of the subject in a region in which the 3D shape of the first 3D data and the 3D shape of the second 3D data are connected together. Hereinafter, the region is called a connection region. The structure information is generated without using the first 3D data or the second 3D data. The information acceptance unit 57 may accept information not including the structure information.

In a case in which the information acceptance unit 57 accepts information not including structure information, the structure estimation unit 58 estimates a structure of a subject in a connection region on the basis of the accepted information and generates structure information. In a case in which the information acceptance unit 57 accepts information including structure information, the structure estimation unit 58 is not used.

Each unit of the image display device 50 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit of the image display device 50 may include one or a plurality of processors. Each unit of the image display device 50 may include one or a plurality of logic circuits.

A computer of the image display device 50 may read a program and execute the read program. The program includes commands defining the operations of each unit of the image display device 50. In other words, the functions of each unit of the image display device 50 may be realized by software.

The program described above, for example, may be provided by using a "computer-readable storage medium" such as a flash memory. The program may be transmitted from the computer storing the program to the image display device 50 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

Hereinafter, distinctive processing of the first embodiment will be described. In the following descriptions, it is assumed that 3D data are generated on the basis of a still image group acquired by endoscope equipment. The endoscope equipment generates the two or more first images used for generating the first 3D data and generates the two or more second images used for generating the second 3D data. In addition, the two or more first images and the two or more second images are generated on the basis of an optical image of a subject acquired through a single-eye optical system. Inspection equipment that acquires a still image group is not limited to the endoscope equipment. As long as the inspection equipment includes a camera, the inspection equipment may be any equipment.

For example, each of the two or more first images is a still image, and each of the two or more second images is a still image. The two or more first images may be all or some of two or more images included in a video. The two or more second images may be all or some of two or more images included in a video. The two or more first images may be included in a first video file, and the two or more second images may be included in a second video file different from the first video file. The two or more first images and the two or more second images do not need to be divided into two video files. The two or more first images and the two or more second images may be included in a single video file.

Figure 2:
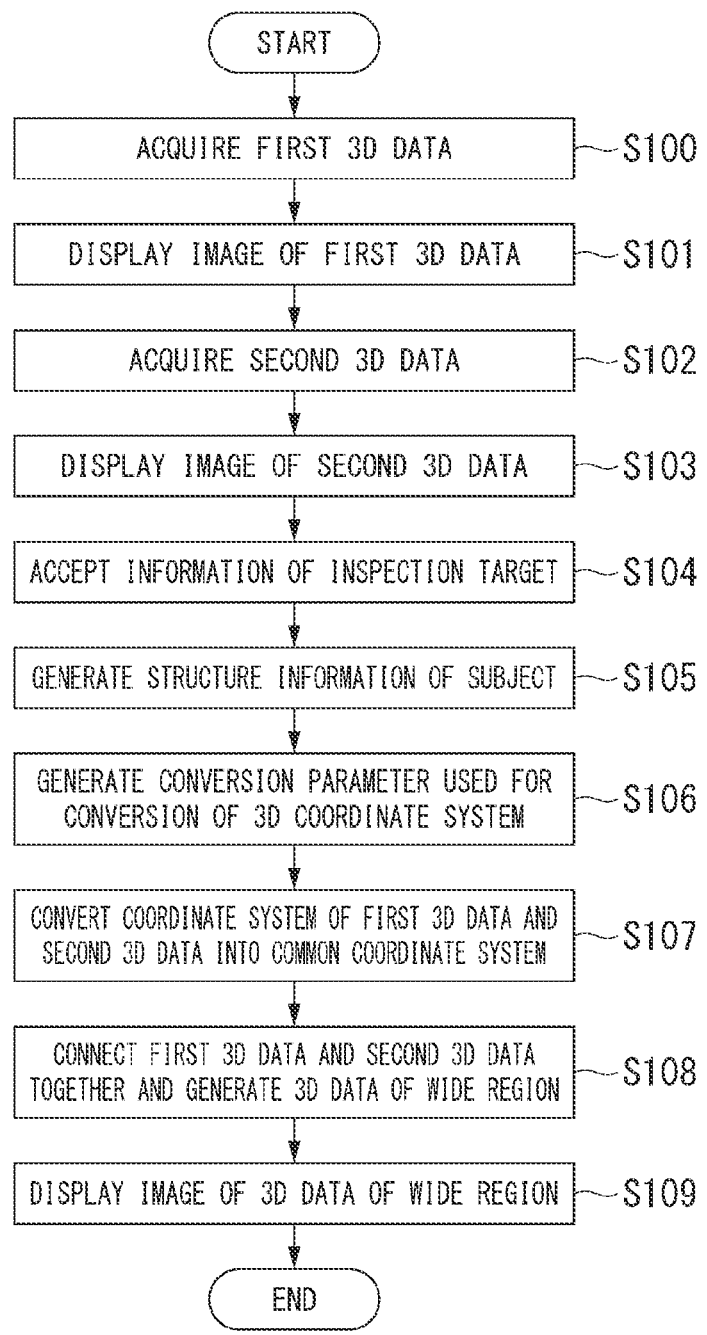
FIG. 2 is a flow chart showing a procedure of processing executed by the image display device according to the first embodiment of the present invention.

Processing executed by the image display device 50 will be described by using FIG. 2. FIG. 2 shows a procedure of the processing executed by the image display device 50.

The data acquisition unit 52 connects to the storage unit 73 and acquires the first 3D data from the storage unit 73 (Step S100). After Step S100, the display control unit 56 displays an image of the first 3D data on the display unit 71 (Step S101).

After Step S101, the data acquisition unit 52 connects to the storage unit 73 and acquires the second 3D data from the storage unit 73 (Step S102). After Step S102, the display control unit 56 displays an image of the second 3D data on the display unit 71 (Step S103).

The order of Steps S100 to S103 is not limited to that shown in FIG. 2. For example, Step S100 and Step S101 may be executed after Step S102 and Step S103 are executed. Alternatively, Step S101 and Step S103 may be executed after Step S100 and Step S102 are executed. Step S101 and Step S103 may be omitted.

Figure 3:
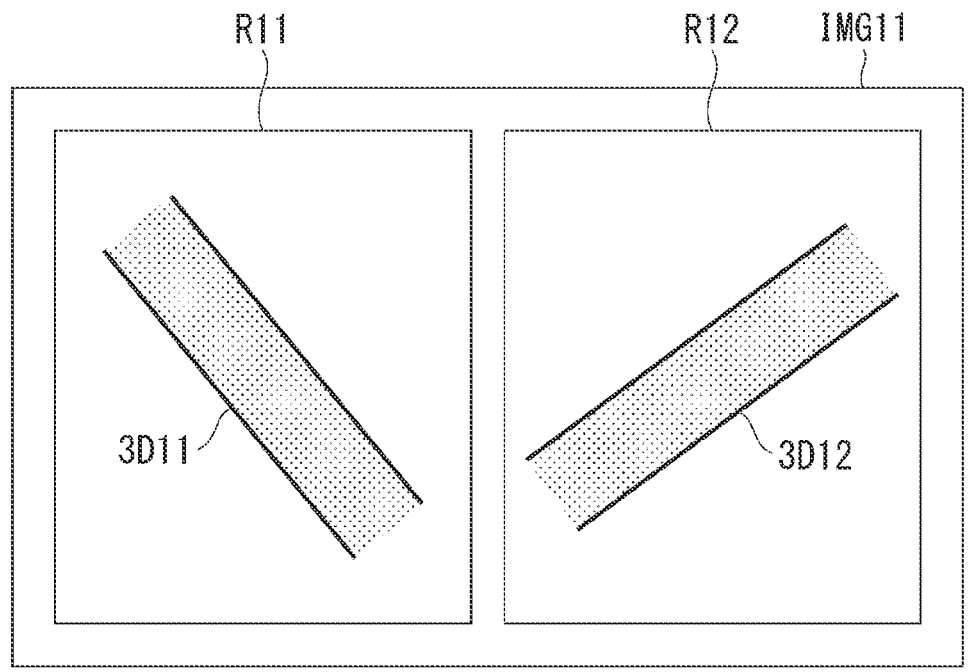
FIG. 3 is a diagram showing an example of an image displayed on a display unit according to the first embodiment of the present invention.

FIG. 3 shows an example of an image displayed on the display unit 71. The display control unit 56 displays an image IMG11 on the display unit 71. The image IMG11 includes a region R11 and a region R12. An image of a first 3D shape 3D11 is displayed in the region R11. The first 3D shape 3D11 is indicated by the first 3D data. An image of a second 3D shape 3D12 is displayed in the region R12. The second 3D shape 3D12 is indicated by the second 3D data.

After Step S103, the information acceptance unit 57 accepts information of an inspection target (Step S104). Hereinafter, an example in which the information acceptance unit 57 accepts information not including structure information from the operation unit 70 will be described.

Figure 4:
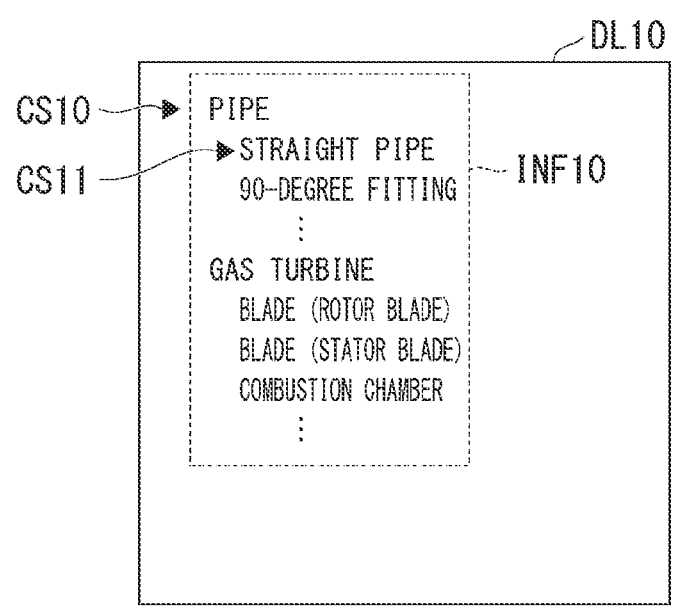
FIG. 4 is a diagram showing an example of a dialog box displayed on the display unit according to the first embodiment of the present invention.

The display control unit 56 displays a dialog box on the display unit 71. FIG. 4 shows an example of the dialog box displayed on the display unit 71. The display control unit 56 displays a dialog box DL10 on the display unit 71. A user can select information in the dialog box DL10 by operating the operation unit 70.

A cursor CS10 and a cursor CS11 are displayed in the dialog box DL10. Each of the cursor CS10 and the cursor CS11 indicates an item selected at present. Information INF10 is displayed in the dialog box DL10. The information INF10 includes a name of an inspection target and includes a name of a typical inspection portion or structure that is present in the inspection target.

A user selects a subject in the inspection target. In a case in which a region in which the first 3D shape 3D11 and the second 3D shape 3D12 shown in FIG. 3 are connected together is a "straight pipe," a user selects a "pipe" shown in FIG. 4 and then selects a "straight pipe." When the user inputs information indicating that the selection is finalized into the image display device 50, the information acceptance unit 57 accepts the information selected by the user. At this time, the information acceptance unit 57 accepts a character string "straight pipe."

After Step S104, the structure estimation unit 58 estimates a structure of a subject in a connection region on the basis of the information accepted in Step S104 and generates structure information (Step S105).

An example of a method in which the structure estimation unit 58 generates the structure information will be described. For example, the structure estimation unit 58 uses a reference table TB11 shown in FIG. 5. The reference table TB11 includes information (input information) accepted by the information acceptance unit 57 and the structure information. The input information and the structure information are associated with each other.

The structure estimation unit 58 converts a character string accepted by the information acceptance unit 57 into structure information. For example, when the information acceptance unit 57 accepts a character string "straight pipe," the structure estimation unit 58 refers to a column CL11 in the reference table TB11 and acquires the structure information in the column CL11. For example, the structure information indicates that the 3D shape of the first 3D data and the 3D shape of the second 3D data are almost a cylinder. Since there is a possibility that the 3D data include a foreign substance or the like, the structure information indicates an approximate cylinder rather than a complete cylinder. The structure information indicates that the inner diameter of the 3D shape of the first 3D data and the inner diameter of the 3D shape of the second 3D data are the same. The structure information indicates that the center axis of the cylinder of the first 3D data matches the center axis of the cylinder of the second 3D data.

A method of generating the structure information is not limited to that using the reference table TB11. For example, the information acceptance unit 57 may accept similar information to the structure information included in the reference table TB11 from the operation unit 70. In other words, the information acceptance unit 57 may accept information including the structure information from the operation unit 70. In this case, the structure estimation unit 58 may be omitted.

The display control unit 56 may display an input box on the display unit 71. A user may input a word or a keyword into the input box by using the operation unit 70 or a microphone. The structure estimation unit 58 may estimate the structure of the subject on the basis of the input word or keyword and may generate structure information.

A method of acquiring structure information of a connection region is not limited to that described above. For example, the structure estimation unit 58 may estimate the structure of the subject by using a technique such as artificial intelligence (AI).

After Step S105, the parameter generation unit 53 generates a conversion parameter used for converting the first 3D coordinate system and the second 3D coordinate system into a common coordinate system (Step S106).

Hereinafter, a 3D coordinate system will be described. The first 3D coordinate system in the first 3D data and the second 3D coordinate system in the second 3D data do not match each other. In order to combine the first 3D data and the second 3D data into 3D data of a wide range, the first 3D coordinate system and the second 3D coordinate system need to be converted into any common coordinate system. The common coordinate system may be a different 3D coordinate system from any of the first 3D coordinate system and the second 3D coordinate system. The common coordinate system may be the same as the first 3D coordinate system or the second 3D coordinate system.

In a case in which the common coordinate system is different from any of the first 3D coordinate system and the second 3D coordinate system, the parameter generation unit 53 generates a first conversion parameter used for converting the first 3D coordinate system into a third 3D coordinate system and generates a second conversion parameter used for converting the second 3D coordinate system into the third 3D coordinate system.

On the other hand, in a case in which the common coordinate system is the same as the first 3D coordinate system, the parameter generation unit 53 generates only a second conversion parameter used for converting the second 3D coordinate system into the first 3D coordinate system. Similarly, in a case in which the common coordinate system is the same as the second 3D coordinate system, the parameter generation unit 53 generates only a first conversion parameter used for converting the first 3D coordinate system into the second 3D coordinate system.

Hereinafter, a scale of a 3D coordinate system will be described. The scale of the first 3D data and the scale of the second 3D data do not necessarily match each other. In order to combine the first 3D data and the second 3D data into 3D data of a wide range, the scale of the first 3D data and the scale of the second 3D data need to match each other. The scale of the combined 3D data may be different from any of the scale of the first 3D data and the scale of the second 3D data. The scale of the combined 3D data may be the same as the scale of the first 3D data or the scale of the second 3D data.

Hereinafter, an example in which the first 3D coordinate system is the reference of coordinate systems and is used as a common coordinate system will be described. In the following example, the parameter generation unit 53 generates a position-and-posture conversion parameter used for causing the position and the posture of the second 3D coordinate system to match the position and the posture of the first 3D coordinate system, respectively. In addition, the parameter generation unit 53 generates a scale conversion parameter used for causing the scale of the second 3D coordinate system to match the scale of the first 3D coordinate system. However, a method of generating a conversion parameter is not limited to the following example. The second 3D coordinate system may be used as a common coordinate system. A different 3D coordinate system from any of the first 3D coordinate system and the second 3D coordinate system may be used as a common coordinate system.

Figures 5, 6:
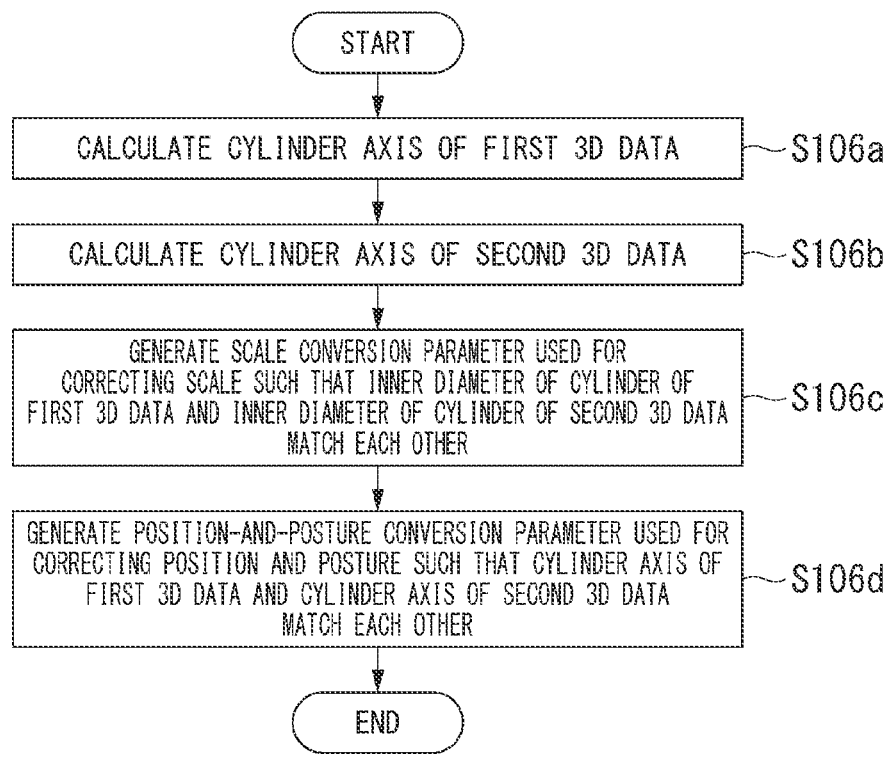
FIG. 5 is a diagram showing an example of a reference table in the first embodiment of the present invention.
FIG. 6 is a flow chart showing a procedure of processing executed by the image display device according to the first embodiment of the present invention.

The parameter generation unit 53 executes processing shown in FIG. 6 in Step S106. FIG. 6 shows a procedure of the processing executed by the parameter generation unit 53.

The structure information indicates that the 3D shape of the first 3D data and the 3D shape of the second 3D data are almost a cylinder. Therefore, the parameter generation unit 53 calculates a cylinder axis (first cylinder axis) of the first 3D data (Step S106*a*). The cylinder axis of the first 3D data indicates a center axis of a cylinder of the first 3D data.

Figure 7:
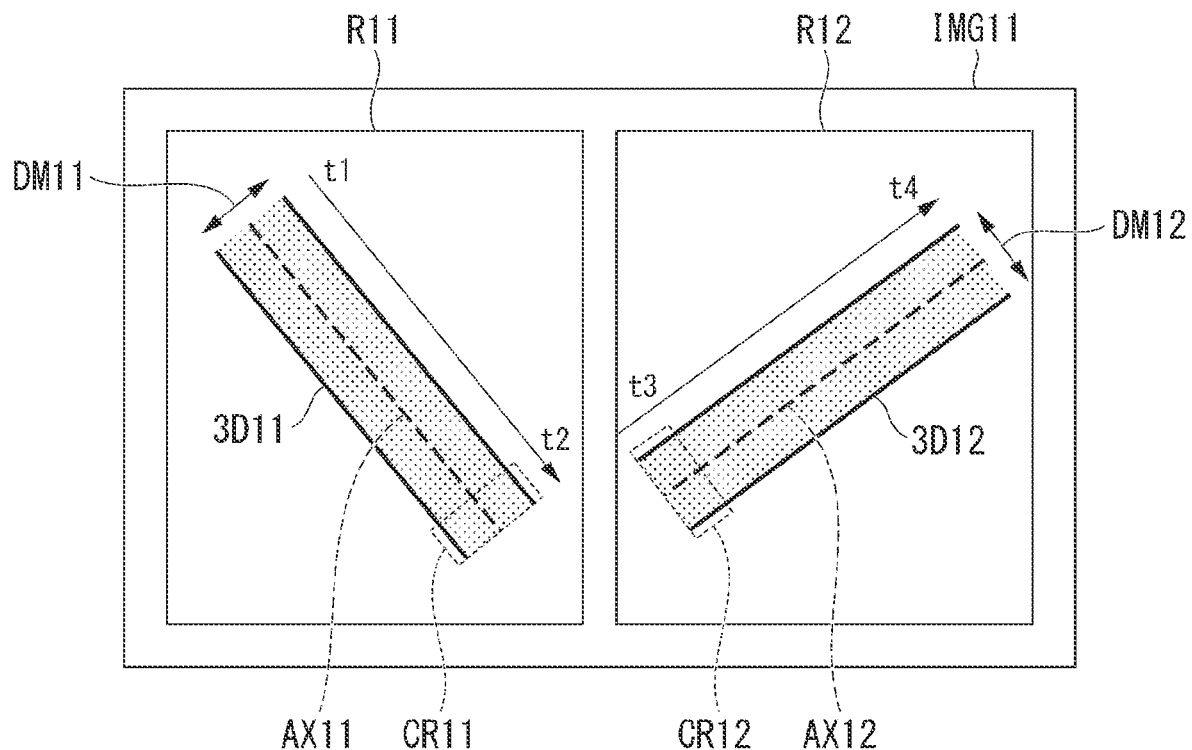
FIG. 7 is a diagram showing an example of an image displayed on the display unit according to the first embodiment of the present invention.

FIG. 7 shows a similar image to that shown in FIG. 3. The same parts as those shown in FIG. 3 will not be described. The parameter generation unit 53 calculates a first cylinder axis AX11.

After Step S106*a*, the parameter generation unit 53 calculates a cylinder axis (second cylinder axis) of the second 3D data (Step S106*b*). The cylinder axis of the second 3D data indicates a center axis of a cylinder of the second 3D data. The parameter generation unit 53 calculates a second cylinder axis AX12 shown in FIG. 7.

The order of Step S106*a* and Step S106*b* is not limited to that shown in FIG. 6. For example, Step S106*a* may be executed after Step S106*b* is executed.

The structure information indicates that the inner diameter of the 3D shape of the first 3D data and the inner diameter of the 3D shape of the second 3D data are the same. Therefore, after Step S106*b*, the parameter generation unit 53 generates a scale conversion parameter used for correcting the scale of the second 3D data such that the inner diameter of the cylinder of the first 3D data and the inner diameter of the cylinder of the second 3D data match each other (Step S106*c*). Specifically, the parameter generation unit 53 generates a scale conversion parameter used for causing a diameter DM12 of the cylinder of the second 3D shape 3D12 shown in FIG. 7 to match a diameter DM11 of the cylinder of the first 3D shape 3D11.

The structure information indicates that the center axis of the cylinder of the first 3D data and the center axis of the cylinder of the second 3D data match each other. Therefore, after Step S106*c*, the parameter generation unit 53 generates a position-and-posture conversion parameter used for correcting the position and the posture of the second 3D data such that the cylinder axis of the first 3D data and the cylinder axis of the second 3D data match each other (Step S106*d*). When Step S106*d* is executed, the processing shown in FIG. 6 is completed.

In a case in which each piece of 3D data includes a timestamp (time information), the parameter generation unit 53 can identify a connection region by using the timestamp. The timestamp indicates a time point at which each of two or more images used for generating each of the first 3D data and the second 3D data are generated. For example, the first 3D data include timestamps from a time point t1 to a time point t2 shown in FIG. 7, and the second 3D data include timestamps from a time point t3 to a time point t4 shown in FIG. 7.

The parameter generation unit 53 identifies a region of the first 3D data associated with the time point t2 and a region of the second 3D data associated with the time point t3 as connection regions. Specifically, the parameter generation unit 53 identifies a first connection region CR11 of the first 3D shape 3D11 and a second connection region CR12 of the second 3D shape 3D12.

The first connection region CR11 includes the terminal end of the first 3D shape 3D11. The second connection region CR12 includes the start end of the second 3D shape 3D12. The parameter generation unit 53 generates a position-and-posture conversion parameter used for causing the second cylinder axis AX12 in the second connection region CR12 to match the first cylinder axis AX11 in the first connection region CR11.

The parameter generation unit 53 can convert the first 3D coordinate system and the second 3D coordinate system into a common coordinate system by executing Steps S106*a* to S106*d*. When the information acceptance unit 57 accepts a character string "straight pipe," the parameter generation unit 53 generates a position-and-posture conversion parameter and a scale conversion parameter used for converting the first 3D coordinate system and the second 3D coordinate system into a common coordinate system.

After Step S106, the conversion unit 54 converts the first 3D coordinate system and the second 3D coordinate system into a common coordinate system by using the conversion parameter generated in Step S106. In other words, the conversion unit 54 converts the first 3D data and the second 3D data into 3D data in the common coordinate system (Step S107). The position, the posture, and the scale of the first 3D coordinate system are not changed, and the position, the posture, and the scale of the second 3D coordinate system are changed in a case in which the first 3D coordinate system is used as the common coordinate system.

After Step S107, the data generation unit 55 connects the first 3D data and the second 3D data together in the common coordinate system (Step S108). In this way, the data generation unit 55 generates 3D data of a wide range of a subject.

After the first 3D coordinate system and the second 3D coordinate system are converted into the common coordinate system, the first 3D data and the second 3D data do not need to be combined into a single piece of 3D data. Therefore, the data generation unit 55 may be omitted.

After Step S108, the display control unit 56 displays an image of a 3D shape indicated by the 3D data generated in Step S108 on the display unit 71 (Step S109). When Step S109 is executed, the processing shown in FIG. 2 is completed.

Figure 8:
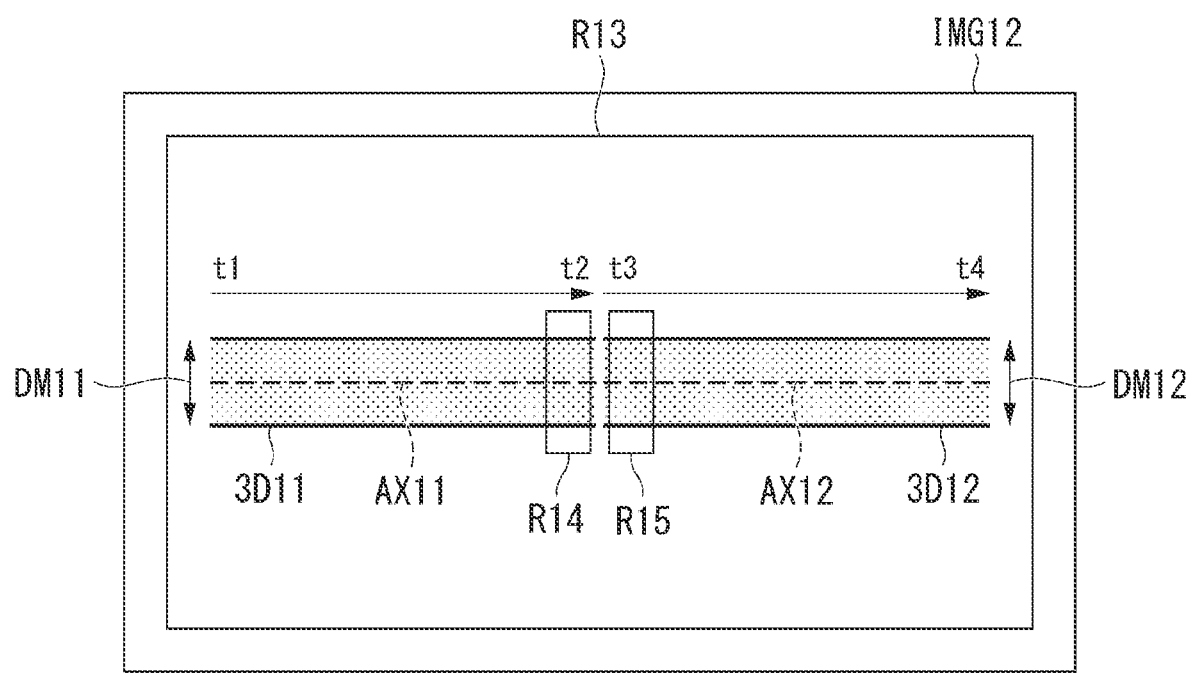
FIG. 8 is a diagram showing an example of an image displayed on the display unit according to the first embodiment of the present invention.

FIG. 8 shows an example of an image displayed on the display unit 71. The same parts as those shown in FIG. 7 will not be described. The display control unit 56 displays an image IMG12 on the display unit 71. The image IMG12 includes a region R13. An image of a first 3D shape 3D11 and a second 3D shape 3D12 is displayed in the region R13.

The first 3D shape 3D11 and the second 3D shape 3D12 are disposed such that a first connection region and a second connection region are connected together. In the example shown in FIG. 8, a gap is shown between the first 3D shape 3D11 and the second 3D shape 3D12 in order to facilitate understanding of connection between the first connection region and the second connection region.

The display control unit 56 displays a region R14 and a region R15 in the region R13. The region R14 corresponds to the first connection region, and the region R15 corresponds to the second connection region. In the example shown in FIG. 8, each of the region R14 and the region R15 is shown by a line. Since each of the region R14 and the region R15 is shown by a line, a user can easily check the position at which the first 3D shape 3D11 and the second 3D shape 3D12 are connected together.

The display control unit 56 may display the region R14 and the region R15 in a first color and may display a region other than the region R14 or the region R15 in a second color different from the first color. The position of each of the region R14 and the region R15 may be reported to a user by using voice. As long as a user can distinguish a connection region from the other regions, a method of reporting a region of a 3D shape to the user is not limited to the above-described method.

The display control unit 56 may display the region R14 and the region R15 in different colors. When a user looks over a 3D shape of a wide range, the user can easily check how far apart the first 3D shape 3D11 and the second 3D shape 3D12 are from each other. In addition, the user can easily check where the first 3D shape 3D11 and the second 3D shape 3D12 are connected together.

An image of the first 3D shape 3D11 and the second 3D shape 3D12 may be attached to an inspection report. The display control unit 56 may display the inspection report on the display unit 71, thus displaying the image of the first 3D shape 3D11 and the second 3D shape 3D12 on the display unit 71.

The parameter generation unit 53 may calculate the reliability of connection between the first connection region and the second connection region in Step S106. The reliability indicates the accuracy of the connection between the first connection region and the second connection region. For example, the parameter generation unit 53 executes cylinder fitting by using the first 3D data. In this way, the parameter generation unit 53 calculates a cylinder approximating the first 3D data and calculates a center axis (first cylinder axis) of the cylinder. In addition, the parameter generation unit 53 executes cylinder fitting by using the second 3D data. In this way, the parameter generation unit 53 calculates a cylinder approximating the second 3D data and calculates a center axis (second cylinder axis) of the cylinder.

An error occurs between the 3D coordinates included in the 3D data and the 3D coordinates of the calculated cylinder. The parameter generation unit 53 calculates an error of the distance between each point of the 3D data and each point on the cylinder for all the points of the 3D data and calculates an average, a standard deviation, or the like of the error as the reliability of the 3D data. The parameter generation unit 53 calculates a statistic of the reliability of the first 3D data and a statistic of the reliability of the second 3D data as the reliability of the connection between the first connection region and the second connection region. The statistic is a minimum value, a maximum value, an average value, or the like of the reliability of the first 3D data and the reliability of the second 3D data.

The display control unit 56 may display the reliability of the first 3D data and the reliability of the second 3D data on the display unit 71 in Step S109. For example, the reliability is displayed as percentage. Alternatively, the reliability is displayed on a scale of 1 to 5. A method of displaying the reliability is not limited to the above-described examples.

In a case in which the 3D shape indicated by the 3D data is a complete cylinder, the parameter generation unit 53 can accurately calculate a cylinder axis. Therefore, the reliability is high. On the other hand, in a case in which the 3D data include an error, the center axis of a cylinder approximating the 3D data is shifted from an original center axis. Therefore, the reliability is low. Since the reliability is displayed, a user can check the accuracy of the connection between the first connection region and the second connection region.

A three-dimensional image display method according to each aspect of the present invention includes a first acquisition step, a second acquisition step, a conversion step, and a display step. The data acquisition unit 52 connects to the storage unit 73 (recording medium) storing first 3D data of a subject and second 3D data of the subject and acquires the first 3D data from the storage unit 73 in the first acquisition step (Step S100). The first 3D data include 3D coordinates defined in a first 3D coordinate system. The second 3D data include 3D coordinates defined in a second 3D coordinate system different from the first 3D coordinate system. At least part of a region of the subject corresponding to the first 3D data is different from at least part of a region of the subject corresponding to the second 3D data. The data acquisition unit 52 connects to the storage unit 73 and acquires the second 3D data from the storage unit 73 in the second acquisition step (Step S102). The conversion unit 54 converts the first 3D coordinate system and the second 3D coordinate system into a three-dimensional common coordinate system on the basis of structure information related to a geometric structure of the subject in the conversion step (Step S107). The structure information is generated without using the first 3D data or the second 3D data. The display control unit 56 displays an image of the first 3D data in the common coordinate system and an image of the second 3D data in the common coordinate system on the display unit 71 (display) in the display step (Step S109).

A three-dimensional image display device according to each aspect of the present invention includes the data acquisition unit 52, the conversion unit 54, and the display control unit 56. The data acquisition unit 52 connects to the storage unit 73 (recording medium) storing first 3D data of a subject and second 3D data of the subject and acquires the first 3D data and the second 3D data from the storage unit 73. The conversion unit 54 converts a first 3D coordinate system and a second 3D coordinate system into a three-dimensional common coordinate system on the basis of structure information related to a geometric structure of the subject. The display control unit 56 displays an image of the first 3D data in the common coordinate system and an image of the second 3D data in the common coordinate system on the display unit 71 (display).

Each aspect of the present invention may include the following modified example. Each of two or more first images and each of two or more second images include time information (timestamp). The conversion unit 54 converts the first 3D coordinate system and the second 3D coordinate system into the common coordinate system on the basis of the time information in the conversion step (Step S107).

Each aspect of the present invention may include the following modified example. The conversion unit 54 converts the first 3D coordinate system and the second 3D coordinate system into the common coordinate system such that a first region (first connection region CR11) of the subject and a second region (second connection region CR12) of the subject are connected together in the conversion step (Step S107). The first region corresponds to the 3D coordinates included in the first 3D data. The second region corresponds to the 3D coordinates included in the second 3D data. The display control unit 56 displays information indicating the positions of the first region and the second region on the display unit 71 (display) in the display step (Step S109).

Each aspect of the present invention may include the following modified example. The display control unit 56 displays information indicating the accuracy of connection between the first region (first connection region CR11) and the second region (second connection region CR12) on the display unit 71 (display) in the display step (Step S109).

Each aspect of the present invention may include the following modified example. The conversion unit 54 generates a position conversion parameter and a posture conversion parameter used for converting the first 3D coordinate system and the second 3D coordinate system into the common coordinate system on the basis of the structure information in the conversion step (Step S107). The conversion unit 54 converts the first 3D coordinate system and the second 3D coordinate system into the common coordinate system by using the position conversion parameter and the posture conversion parameter in the conversion step (Step S107).

Each aspect of the present invention may include the following modified example. The parameter generation unit 53 generates a scale conversion parameter used for correcting at least one of a scale of a 3D shape indicated by the first 3D data and a scale of a 3D shape indicated by the second 3D data in a generation step (Step S106). The conversion unit 54 converts the first 3D coordinate system and the second 3D coordinate system into the common coordinate system by using the scale conversion parameter in the conversion step (Step S107).

Each aspect of the present invention may include the following modified example. The first 3D data are generated by using two or more first images acquired at two or more different viewpoints. The second 3D data are generated by using two or more second images acquired at two or more different viewpoints. At least one of the two or more first images and at least one of the two or more second images are different from each other.

Each aspect of the present invention may include the following modified example. The two or more first images are at least some of two or more images included in a first video. The two or more second images are at least some of two or more images included in a second video that is the same as or different from the first video.

Each aspect of the present invention may include the following modified example. The two or more first images and the two or more second images are generated by an endoscope.

Each aspect of the present invention may include the following modified example. The two or more first images and the two or more second images are generated on the basis of an optical image of the subject acquired through a single-eye optical system.

In the first embodiment, there is a case in which the first 3D data and the second 3D data do not include 3D data of a common region. Even in such a case, the image display device 50 can display an image of a 3D shape of a wide range indicated by two or more pieces of 3D data. Therefore, a user can capture the entire structure of an inspection target in a visual field and can check the structure.

There is a case in which 3D data corresponding to a region between a first connection region in the 3D shape indicated by the first 3D data and a second connection region in the 3D shape indicated by the second 3D data are lost. Even in such a case, the image display device 50 can display an image of a 3D shape of a wide range indicated by two or more pieces of 3D data.

First Modified Example of First Embodiment

Figure 9:
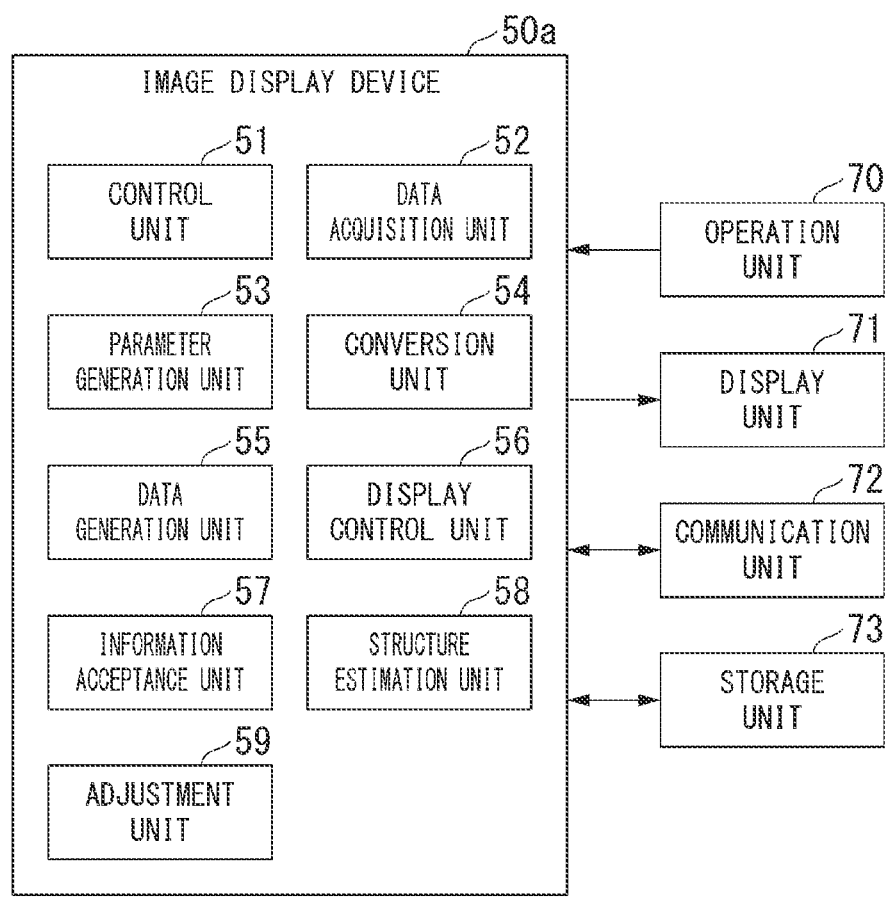
FIG. 9 is a block diagram showing a configuration of an image display device according to a first modified example of the first embodiment of the present invention.

A first modified example of the first embodiment of the present invention will be described. The image display device 50 shown in FIG. 1 is changed to an image display device 50a shown in FIG. 9. FIG. 9 shows a configuration of the image display device 50a. The same configuration as that shown in FIG. 1 will not be described.

The image display device 50a shown in FIG. 9 includes a control unit 51, a data acquisition unit 52, a parameter generation unit 53, a conversion unit 54, a data generation unit 55, a display control unit 56, an information acceptance unit 57, a structure estimation unit 58, and an adjustment unit 59.

Each unit of the image display device 50a may be constituted by at least one of a processor and a logic circuit. Each unit of the image display device 50a may include one or a plurality of processors. Each unit of the image display device 50a may include one or a plurality of logic circuits.

The adjustment unit 59 adjusts at least one of the position and the posture of at least one of the first 3D data and the second 3D data in the common coordinate system. For example, the adjustment unit 59 executes adjustment processing of the first 3D data and the second 3D data. Alternatively, the adjustment unit 59 executes adjustment processing of only the first 3D data or adjustment processing of only the second 3D data. The adjustment unit 59 adjusts the position and the posture of 3D data in the adjustment processing. Alternatively, the adjustment unit 59 adjusts only the position of the 3D data or only the posture of the 3D data in the adjustment processing.

After the adjustment unit 59 executes the adjustment processing, the display control unit 56 displays an image of the first 3D data and an image of the second 3D data on the display unit 71 again. In this way, at least one of the position and the posture of at least one of the image of the first 3D data and the image of the second 3D data is changed.

Figure 10:
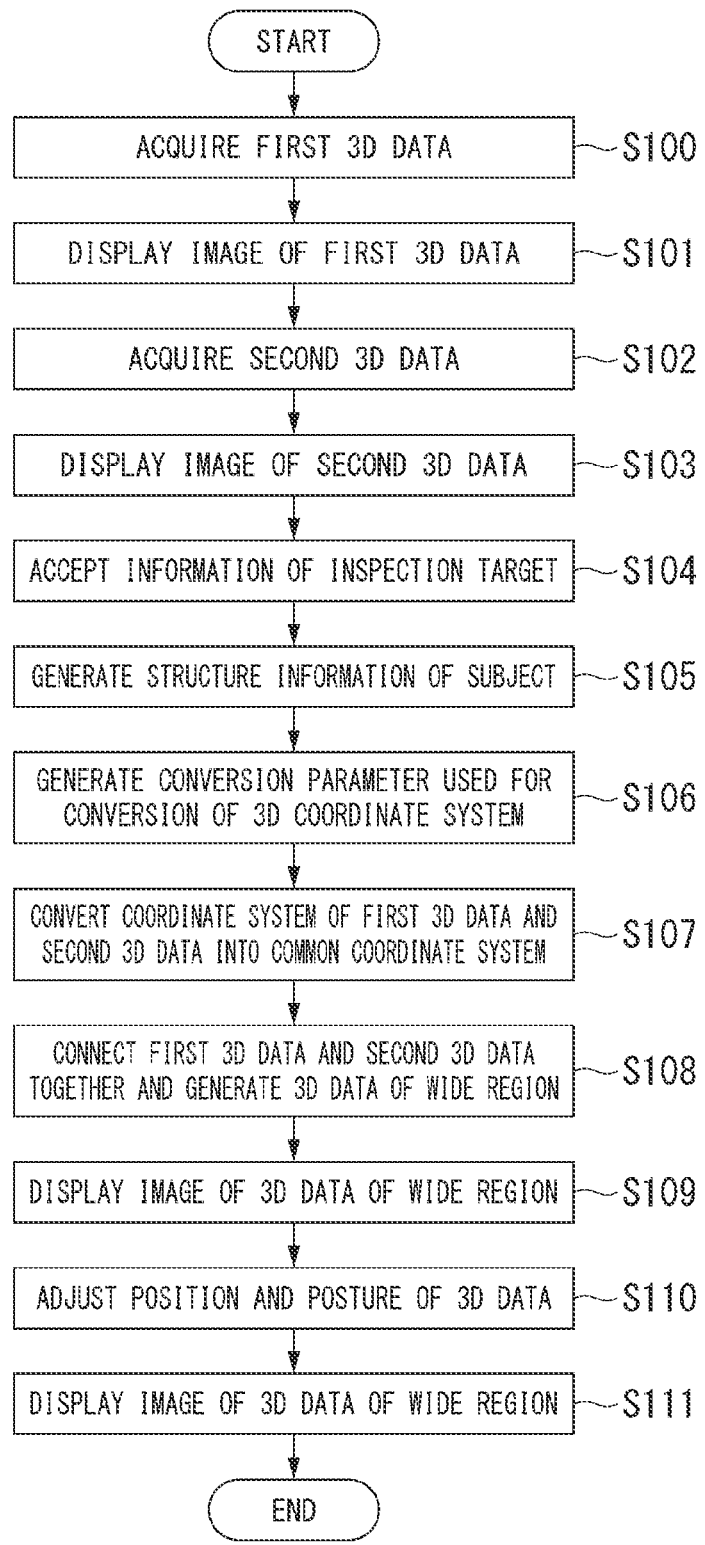
FIG. 10 is a flow chart showing a procedure of processing executed by the image display device according to the first modified example of the first embodiment of the present invention.

Processing executed by the image display device 50a will be described by using FIG. 10. FIG. 10 shows a procedure of the processing executed by the image display device 50a. The same processing as that shown in FIG. 2 will not be described.

For example, the image IMG12 shown in FIG. 8 is displayed on the display unit 71 in Step S108. In the example shown in FIG. 8, the terminal end of the first 3D shape 3D11 and the start end of the second 3D shape 3D12 match each other. There is a case in which 3D data between the terminal end of the first 3D shape 3D11 and the start end of the second 3D shape 3D12 are lost.

In the first modified example of the first embodiment, a user estimates the length of the section between the terminal end of the first 3D shape 3D11 and the start end of the second 3D shape 3D12. The 3D data in the section are lost. A user can change the disposition of the first 3D shape 3D11 and the second 3D shape 3D12 such that the terminal end of the first 3D shape 3D11 and the start end of the second 3D shape 3D12 are away from each other by the length of the section.

A user inputs an instruction to move at least one of the first 3D shape 3D11 and the second 3D shape 3D12 into the image display device 50a by operating the operation unit 70. The information acceptance unit 57 accepts the instruction. Hereinafter, an example in which the second 3D shape 3D12 moves will be described. The adjustment unit 59 adjusts at least one of the position and the posture of the second 3D shape 3D12 on the basis of the instruction accepted by the information acceptance unit 57 (Step S110).

The 3D data generated in Step S108 include 3D data corresponding to the first 3D data and 3D data corresponding to the second 3D data. The adjustment unit 59 changes the 3D coordinates of the 3D data corresponding to the second 3D data. In this way, the adjustment unit 59 adjusts at least one of the position and the posture of the 3D shape indicated by the 3D data.

After Step S110, the display control unit 56 displays an image of the 3D shape indicated by the 3D data processed in Step S110 on the display unit 71 (Step S110. When Step S111 is executed, the processing shown in FIG. 10 is completed.

Figure 11:
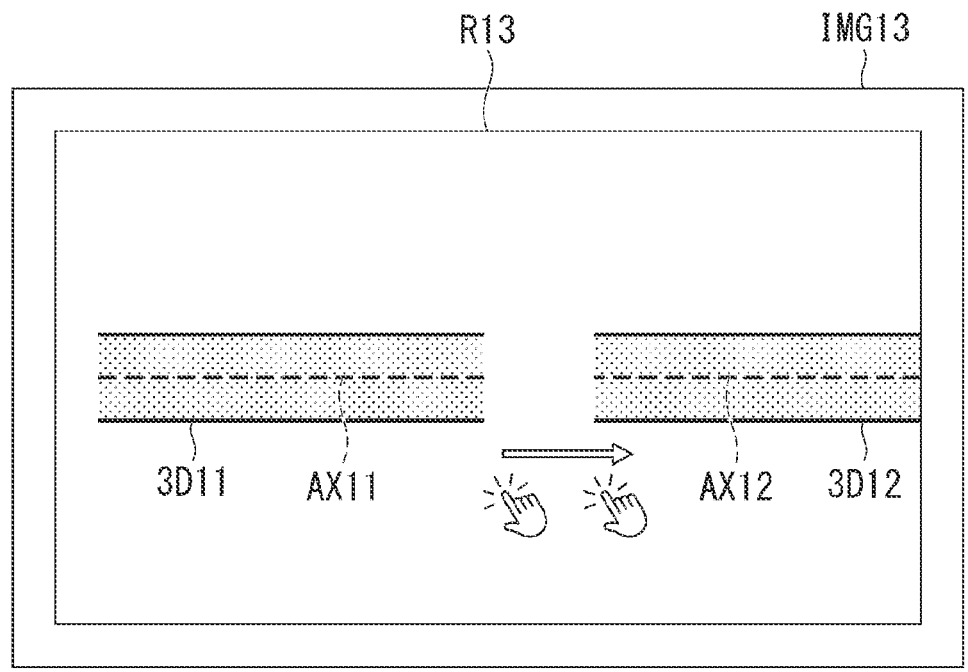
FIG. 11 is a diagram showing an example of an image displayed on the display unit according to the first modified example of the first embodiment of the present invention.

FIG. 11 shows an example of an image displayed on the display unit 71. The same parts as those shown in FIG. 8 will not be described. The display control unit 56 displays an image IMG13 on the display unit 71.

A user inputs an instruction to bring the second 3D shape 3D12 closer to the first 3D shape 3D11 or an instruction to put the second 3D shape 3D12 away from the first 3D shape 3D11 into the image display device 50*a*. Alternatively, the user inputs an instruction to rotate the second 3D shape 3D12 into the image display device 50*a*.

An operation performed by a user in order to freely change the position and the posture of the second 3D shape 3D12 is complicated. Therefore, movement of the second 3D shape 3D12 may be restricted. For example, when a "straight pipe" is selected, the user may move the second 3D shape 3D12 in a range in which the direction of the cylinder axis does not change. In this case, the user can move the second 3D shape 3D12 in a parallel direction to the cylinder axis and can rotate the second 3D shape 3D12 around the cylinder axis.

Even when a subject is a straight pipe, a condition for restricting movement of the second 3D shape 3D12 is not limited to the above-described example.

In the example shown in FIG. 11, a user inputs an instruction to move the second 3D shape 3D12 in the right direction into the image display device 50*a*. The adjustment unit 59 changes the 3D coordinates of the 3D data such that the second 3D shape 3D12 moves in the right direction.

Each aspect of the present invention may include the following modified example. The adjustment unit 59 adjusts at least one of the position and the posture of at least one of the first 3D data and the second 3D data in the common coordinate system in an adjustment step (Step S110).

In the first modified example of the first embodiment, at least one of the position and the posture of the first 3D shape and the second 3D shape in the 3D shape of the wide range is adjusted. Since the 3D shape indicated by the 3D data of the wide range approximates the structure of an actual inspection target as a result of this adjustment, the quality of the 3D data is improved.

Second Modified Example of First Embodiment

A second modified example of the first embodiment of the present invention will be described. In the second modified example of the first embodiment, the image display device 50 shown in FIG. 1 is used.

A subject in the first embodiment described above is a straight pipe. On the other hand, in the second modified example of the first embodiment, an example in which the subject is a 90-degree fitting will be described.

For example, a user selects a "pipe" shown in FIG. 4 and then selects a "90-degree fitting." When the user inputs information indicating that the selection is finalized into the image display device 50, the information acceptance unit 57 accepts the information selected by the user. At this time, the information acceptance unit 57 accepts a character string "90-degree fitting."

For example, structure information of a 90-degree fitting indicates that the 3D shape of the first 3D data and the 3D shape of the second 3D data are almost a cylinder. The structure information indicates that the inner diameter of the 3D shape of the first 3D data and the inner diameter of the 3D shape of the second 3D data are the same. The structure information indicates that the center axis of the cylinder of the first 3D data is orthogonal to the center axis of the cylinder of the second 3D data. The parameter generation unit 53 generates a conversion parameter on the basis of the structure information in Step S106.

Figure 12:
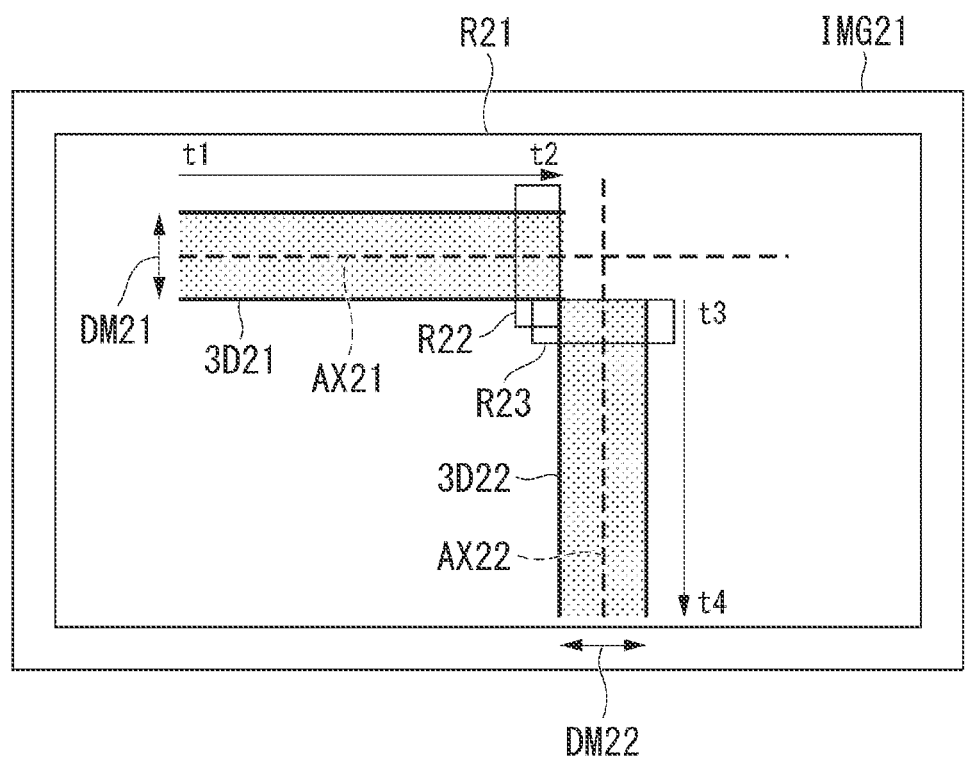
FIG. 12 is a diagram showing an example of an image displayed on a display unit according to a second modified example of the first embodiment of the present invention.

FIG. 12 shows an example of an image displayed on the display unit 71. The display control unit 56 displays an image IMG21 on the display unit 71. The image IMG21 includes a region R21. An image of a first 3D shape 3D21 and a second 3D shape 3D22 is displayed in the region R21. The first 3D shape 3D21 is indicated by the first 3D data. The second 3D shape 3D22 is indicated by the second 3D data.

In the example shown in FIG. 12, the parameter generation unit 53 generates a position-and-posture conversion parameter used for causing the position and the posture of the second 3D coordinate system to match the position and the posture of the first 3D coordinate system, respectively. In addition, the parameter generation unit 53 generates a scale conversion parameter used for causing the scale of the second 3D coordinate system to match the scale of the first 3D coordinate system. The parameter generation unit 53 calculates a first cylinder axis AX21 of the first 3D shape 3D21 and a second cylinder axis AX22 of the second 3D shape 3D22. The parameter generation unit 53 generates a scale conversion parameter used for causing a diameter DM22 of the cylinder of the second 3D shape 3D22 to match a diameter DM21 of the cylinder of the first 3D shape 3D21.

The first 3D data include timestamps from a time point t1 to a time point t2 shown in FIG. 12, and the second 3D data include timestamps from a time point t3 to a time point t4 shown in FIG. 12. The parameter generation unit 53 identifies a first connection region of the first 3D shape 3D21 associated with the time point t2 and identifies a second connection region of the second 3D shape 3D22 associated with the time point t3.

The first connection region includes the terminal end of the first 3D shape 3D21. The second connection region includes the start end of the second 3D shape 3D22. The parameter generation unit 53 generates a position-and-posture conversion parameter used for causing the second cylinder axis AX22 in the second connection region to be orthogonal to the first cylinder axis AX21 in the first connection region.

The second connection region is disposed at a position close to the first connection region. The parameter generation unit 53 generates the position-and-posture conversion parameter causing a region between the first connection region and the second connection region to be small. The 3D data of the region (a region of a 90-degree fitting) between the first connection region and the second connection region are lost. The parameter generation unit 53 generates the position-and-posture conversion parameter such that the first connection region and the second connection region do not overlap each other.

There is a possibility that 3D data of a straight pipe part are lost in addition to 3D data of a curved region. Therefore, the length of a section between the first connection region and the second connection region is actually unknown. After the image IMG21 shown in FIG. 12 is displayed, the position or the posture of the 3D shape may be adjusted as in the first modified example of the first embodiment.

The display control unit 56 displays a region R22 and a region R23 in the region R21. The region R22 corresponds to the first connection region, and the region R23 corresponds to the second connection region.

The purpose of each embodiment of the present invention is to display an image of a 3D shape of a wide range even when the first 3D data and the second 3D data do not include 3D data of a common region. Therefore, the positions and the postures of the first 3D data and the second 3D data do not need to be accurately adjusted. A user may adjust the positions and the postures. The first 3D data and the second 3D data may be roughly connected together.

Figure 13:
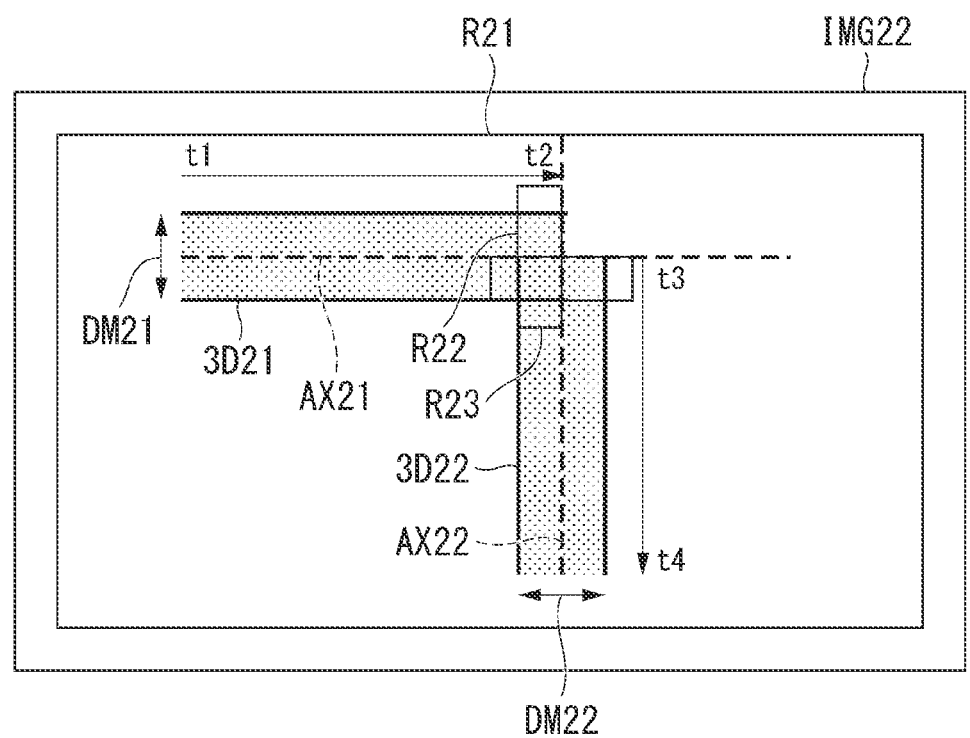
FIG. 13 is a diagram showing an example of an image displayed on the display unit according to the second modified example of the first embodiment of the present invention.

FIG. 13 shows an example of an image displayed on the display unit 71. The same parts as those shown in FIG. 12 will not be described. The display control unit 56 displays an image IMG22 on the display unit 71.

A point on a first cylinder axis AX21 at the terminal end of a first 3D shape 3D21 matches a point on a second cylinder axis AX22 at the start end of a second 3D shape 3D22. Part of a first connection region and a part of a second connection region overlap each other. The structure of a subject, which is an inspection target, is actually different from that shown in FIG. 13. In a case in which the first 3D data and the second 3D data do not need to be accurately connected together, the display control unit 56 can display the image IMG22 on the display unit 71, as shown in FIG. 13. A user may adjust the position and the posture of the 3D data as in the first modified example of the first embodiment in order to improve the appearance of a 3D shape of a wide range.

In the second modified example of the first embodiment, in a case in which a subject is a 90-degree fitting, the image display device 50 executes similar processing to that of selecting a straight pipe as a subject. In this way, the image display device 50 can connect the first 3D data and the second 3D data together and can display an image of a 3D shape of a wide range.

(Third modified example of first embodiment) A third modified example of the first embodiment of the present invention will be described. In the third modified example of the first embodiment, the image display device 50 shown in FIG. 1 is used.

A subject in the second modified example of the first embodiment described above is a 90-degree fitting. On the other hand, in the third modified example of the first embodiment, an example in which a subject is a 90-degree fitting having different diameters will be described. There is a case in which a fitting having different diameters is used for a pipe. The third modified example of the first embodiment is applied to an inspection of such a pipe.

Figure 14:
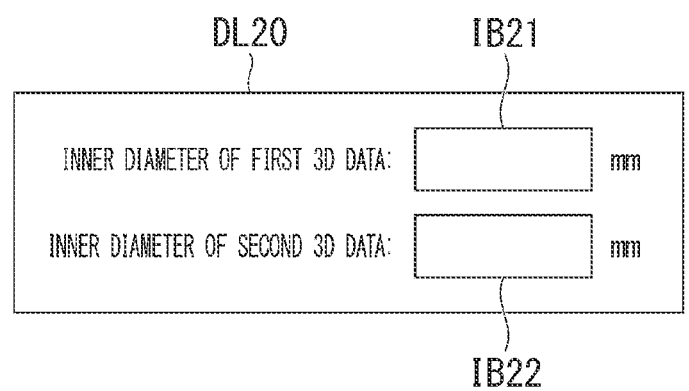
FIG. 14 is a diagram showing an example of a dialog box displayed on a display unit according to a third modified example of the first embodiment of the present invention.

After the dialog box DL10 shown in FIG. 4 is displayed on the display unit 71, the display control unit 56 displays a dialog box DL20 shown in FIG. 14 on the display unit 71. A user inputs the inner diameter of the first 3D data into an input box IB21 and inputs the inner diameter of the second 3D data into an input box IB22 by operating the operation unit 70.

The information acceptance unit 57 accepts the inner diameter input into the input box IB21 and the inner diameter input into the input box IB22. The parameter generation unit 53 generates a scale conversion parameter on the basis of the inner diameter of the first 3D data and the inner diameter of the second 3D data in Step S106.

Figure 15:
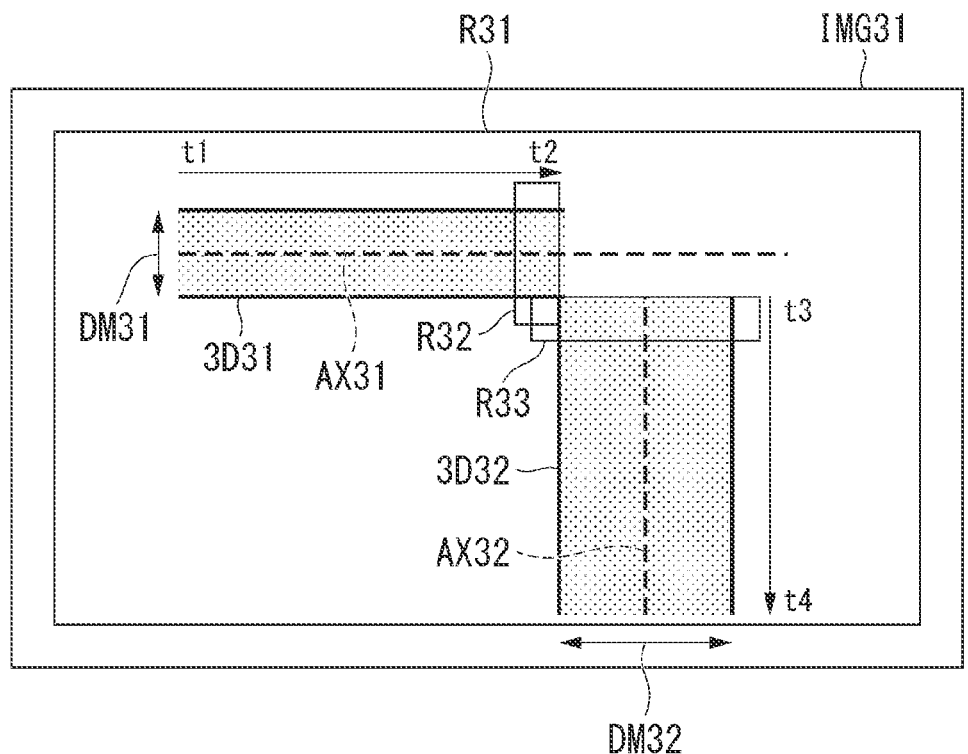
FIG. 15 is a diagram showing an example of an image displayed on the display unit according to the third modified example of the first embodiment of the present invention.

An example in which a subject is a 90-degree fitting and the inner diameter of the cylinder of the second 3D data is 1.5 times as large as that of the cylinder of the first 3D data will be described. FIG. 15 shows an example of an image displayed on the display unit 71. The display control unit 56 displays an image IMG31 on the display unit 71. The image IMG31 includes a region R31. An image of a first 3D shape 3D31 and a second 3D shape 3D32 is displayed in the region R31. The first 3D shape 3D31 is indicated by the first 3D data. The second 3D shape 3D32 is indicated by the second 3D data.

In the example shown in FIG. 15, the parameter generation unit 53 generates a position-and-posture conversion parameter used for causing the position and the posture of the second 3D coordinate system to match the position and the posture of the first 3D coordinate system, respectively. In addition, the parameter generation unit 53 generates a scale conversion parameter used for causing the scale of the second 3D coordinate system to match the scale of the first 3D coordinate system. The parameter generation unit 53 calculates a first cylinder axis AX31 of the first 3D shape 3D31 and a second cylinder axis AX32 of the second 3D shape 3D32. The parameter generation unit 53 generates a scale conversion parameter used for causing a diameter DM32 of the cylinder of the second 3D shape 3D32 to be 1.5 times as large as a diameter DM31 of the cylinder of the first 3D shape 3D31.

The first 3D data include timestamps from a time point t1 to a time point t2 shown in FIG. 15, and the second 3D data include timestamps from a time point t3 to a time point t4 shown in FIG. 15. The parameter generation unit 53 identifies a first connection region of the first 3D shape 3D31 associated with the time point t2 and identifies a second connection region of the second 3D shape 3D32 associated with the time point t3.

The first connection region includes the terminal end of the first 3D shape 3D31. The second connection region includes the start end of the second 3D shape 3D32. The parameter generation unit 53 generates a position-and-posture conversion parameter used for causing the second cylinder axis AX32 in the second connection region to be orthogonal to the first cylinder axis AX31 in the first connection region.

The second connection region is disposed at a position close to the first connection region. The parameter generation unit 53 generates the position-and-posture conversion parameter causing a region between the first connection region and the second connection region to be small. The 3D data of the region between the first connection region and the second connection region are lost. The parameter generation unit 53 generates the position-and-posture conversion parameter such that the first connection region and the second connection region do not overlap each other. After an image of 3D data of a wide range is displayed, a user may adjust the position and the posture of the 3D data as in the first modified example of the first embodiment.

The display control unit 56 displays a region R32 and a region R33 in the region R31. The region R32 corresponds to the first connection region, and the region R33 corresponds to the second connection region.

In the third modified example of the first embodiment, in a case in which a subject is a 90-degree fitting having different diameters, the image display device 50 executes similar processing to that of selecting a straight pipe as a subject. In this way, the image display device 50 can connect the first 3D data and the second 3D data together and can display an image of a 3D shape of a wide range.

Fourth Modified Example of First Embodiment

A fourth modified example of the first embodiment of the present invention will be described. In the fourth modified example of the first embodiment, the image display device 50 shown in FIG. 1 is used.

A subject in the first embodiment described above is a straight pipe. A subject in the second and third modified examples of the first embodiment described above is a 90-degree fitting. On the other hand, in the fourth modified example of the first embodiment, an example in which a subject is a u-shaped tube will be described. A heat exchange tube or the like includes a u-shaped tube.

Figure 16:
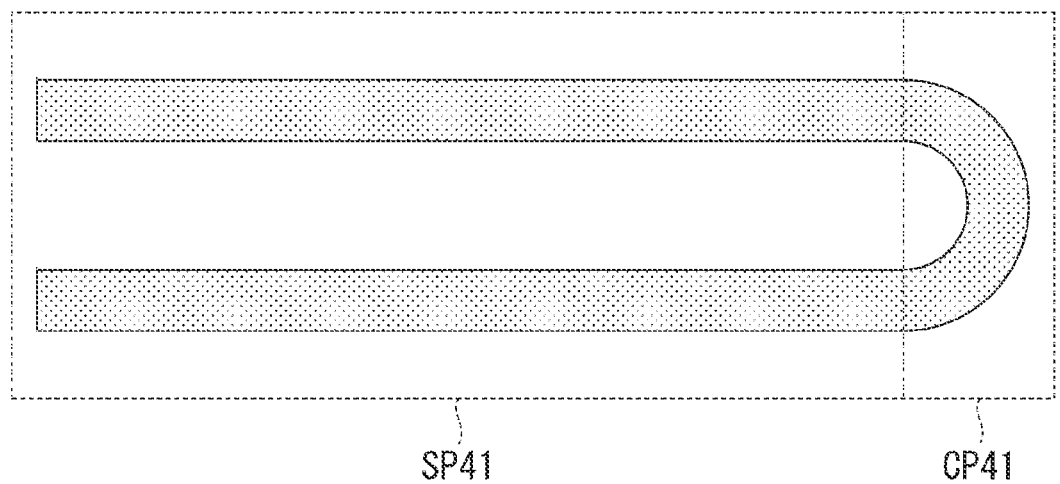
FIG. 16 is a diagram showing an example of a U-shaped tube according to a fourth modified example of the first embodiment of the present invention.

FIG. 16 shows an example of a u-shaped tube. The u-shaped tube includes a straight pipe part SP41 and a circular arc part CP41. Hereinafter, an example in which part of the 3D data are lost in the circular arc part CP41 will be described. The first 3D data and the second 3D data are connected together in the circular arc part CP41. In a case in which the first 3D data and the second 3D data are connected together in the straight pipe part SP41, the image display device 50 executes similar processing to that in the first embodiment in which a subject is a straight pipe, and connects the first 3D data and the second 3D data together.

For example, structure information of a u-shaped tube indicates that the 3D shape of the first 3D data and the 3D shape of the second 3D data are almost a cylinder. The structure information indicates that the circular arc part is almost donut-shaped. The range of the circular arc part of which 3D data exist is only a range of 180 degrees, that is, a semicircle. The structure information indicates that the inner diameter of the 3D shape of the first 3D data and the inner diameter of the 3D shape of the second 3D data are the same. The structure information indicates that the two center axes of the two cylinders in the straight pipe part are parallel to each other and the circular arc part has an arbitrary curvature radius. The parameter generation unit 53 generates a conversion parameter on the basis of the structure information in Step S106.

Figure 17:
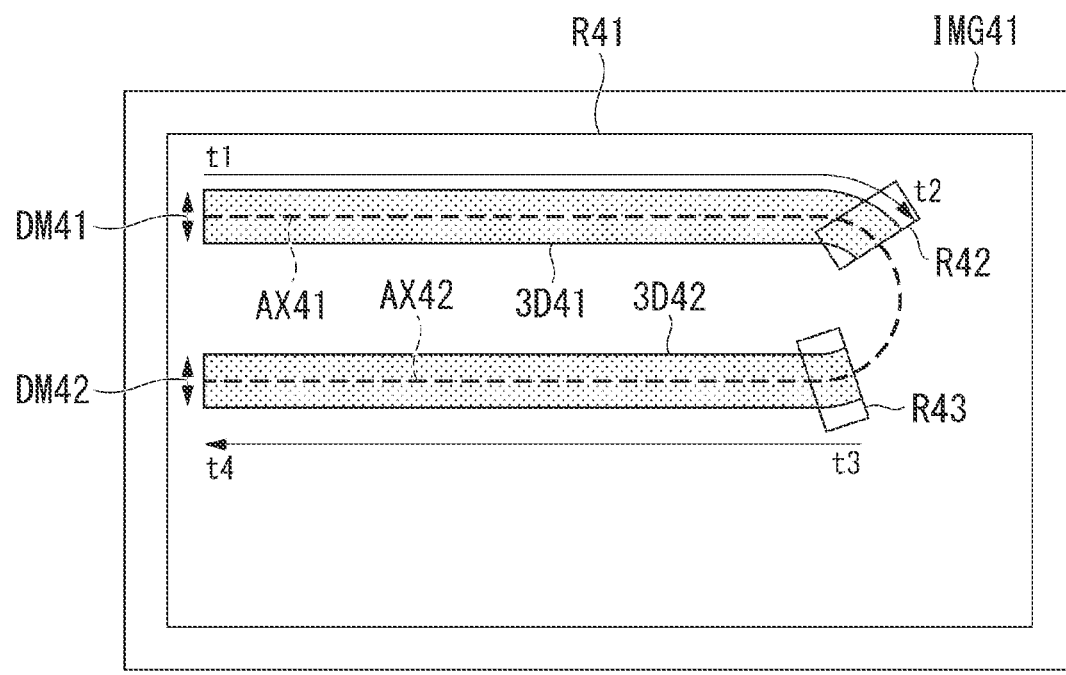
FIG. 17 is a diagram showing an example of an image displayed on a display unit according to the fourth modified example of the first embodiment of the present invention.

FIG. 17 shows an example of an image displayed on the display unit 71. The display control unit 56 displays an image IMG41 on the display unit 71. The image IMG41 includes a region R41. An image of a first 3D shape 3D41 and a second 3D shape 3D42 is displayed in the region R41. The first 3D shape 3D41 is indicated by the first 3D data. The second 3D shape 3D42 is indicated by the second 3D data.

In the example shown in FIG. 17, the parameter generation unit 53 generates a position-and-posture conversion parameter used for causing the position and the posture of the second 3D coordinate system to match the position and the posture of the first 3D coordinate system, respectively. In addition, the parameter generation unit 53 generates a scale conversion parameter used for causing the scale of the second 3D coordinate system to match the scale of the first 3D coordinate system. The parameter generation unit 53 calculates a first cylinder axis AX41 of the first 3D shape 3D41 and a second cylinder axis AX42 of the second 3D shape 3D42. Each of the first cylinder axis AX41 and the second cylinder axis AX42 has a straight line shape in the straight pipe part and has a circular arc shape in the circular arc part.

The parameter generation unit 53 generates a scale conversion parameter used for causing a diameter DM42 of the cylinder of the second 3D shape 3D42 to match a diameter DM41 of the cylinder of the first 3D shape 3D41. In many cases, two inner diameters of two cylinders in a straight pipe part of a u-shaped tube are the same. Therefore, the image display device 50 can generate the scale conversion parameter by using similar method to that of generating a scale conversion parameter in the first embodiment.

The first 3D data include timestamps from a time point t1 to a time point t2 shown in FIG. 17, and the second 3D data include timestamps from a time point t3 to a time point t4 shown in FIG. 17. The parameter generation unit 53 identifies a first connection region of the first 3D shape 3D41 associated with the time point t2 and identifies a second connection region of the second 3D shape 3D42 associated with the time point t3.

The first connection region includes the terminal end of the first 3D shape 3D41. The second connection region includes the start end of the second 3D shape 3D42. The parameter generation unit 53 generates a position-and-posture conversion parameter used for connecting the first connection region and the second connection region together. The first connection region and the second connection region are connected together on condition that the circular arc part has a predetermined curvature radius.

In a case in which part of the 3D data in the circular arc part is lost, information indicating the angle of the circular arc part corresponding to the position of the connection region is not obtained. In a case in which the second 3D data include the 3D data of the straight pipe part, the parameter generation unit 53 can estimate a section in which 3D data are lost by using a condition indicating that the two center axes of the two cylinders in the straight pipe part are parallel to each other.

The display control unit 56 displays a region R42 and a region R43 in the region R41. The region R42 corresponds to the first connection region, and the region R43 corresponds to the second connection region.

There is a case in which the second 3D data include only the 3D data in the circular arc part. In such a case, it is difficult for the parameter generation unit 53 to generate a position-and-posture conversion parameter used for accurately connecting the first 3D data and the second 3D data together. The parameter generation unit 53 may generate a temporary position-and-posture conversion parameter such that a region between the first 3D data and the second 3D data disappears. After an image of 3D data of a wide range is displayed, a user may adjust the position and the posture of the 3D data as in the first modified example of the first embodiment. At this time, the user may adjust the position of the 3D data along a circular arc.

Fifth Modified Example of First Embodiment

A fifth modified example of the first embodiment of the present invention will be described. In the fifth modified example of the first embodiment, the image display device 50 shown in FIG. 1 is used.

A subject in the second to fourth modified examples of the first embodiment described above is an inspection portion of a pipe. On the other hand, in the fifth modified example of the first embodiment, an example in which a subject is an inspection portion of a gas turbine will be described. The gas turbine is a main inspection target in an aircraft engine, an electrical generator, and the like. Hereinafter, an example in a blade inspection will be described. A blade is a typical inspection portion in an aircraft engine.

The size of a turbine blade of an electrical generator is different from that of a gas turbine blade of an aircraft engine. However, the structure of the turbine blade is similar to that of the gas turbine blade. Therefore, the following processing may be applied to an inspection of the gas turbine blade.

A gas turbine includes two or more blades. The two or more blades are circularly and radially fixed to a discoid component called a disk.

Figure 18:
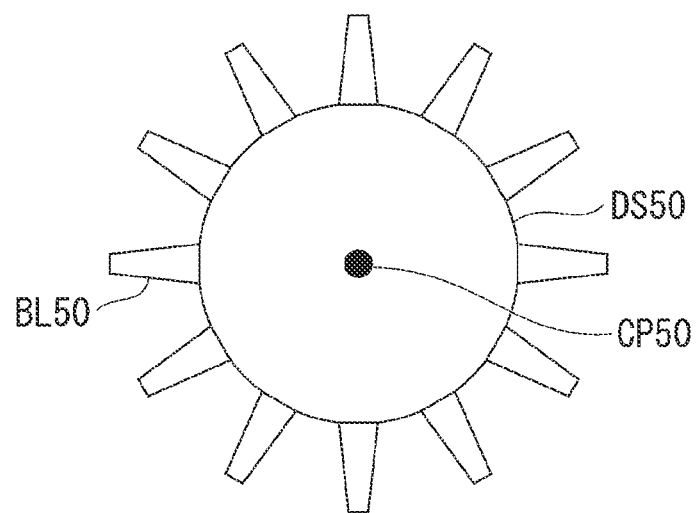
FIG. 18 is a block diagram showing a configuration of blades in a fifth modified example of the first embodiment of the present invention.

FIG. 18 schematically shows a configuration of a blade. In FIG. 18, twelve blades BL50 are disposed in a disk DS50. In fact, several tens of blades or more than 100 blades are disposed in one disk. A center position CP50 indicates the center of the disk DS50 in a perpendicular plane to a rotation axis of an engine. Multiple steps of disks are disposed in each of a compressor section and a turbine section of a gas turbine. A disk of each step includes many blades functioning as one of a rotor blade and a stator blade. In many cases, an ID is allocated to each blade.

When rotor blades are inspected, a scope is inserted into an engine from an access port provided in the engine. The rotor blades manually or automatically rotate, and the distal end of the scope is fixed. An inspector performs an inspection in this state and checks whether there is an abnormality in each blade.

On the other hand, when stator blades (nozzle guide vanes) disposed immediately behind a combustion chamber are inspected, the scope is inserted from an access port of the combustion chamber toward the rear of the combustion chamber. Hereinafter, nozzle guide vanes are called stator blades. In an inspection of the stator blades, it is impossible to rotate the blades. An inspector moves the distal end of the scope above the periphery of the disk of the stator blades and checks whether there is an abnormality in each blade.

The information INF10 of the dialog box DL10 shown in FIG. 4 includes information of a gas turbine, which is an inspection target, and information of blades in the gas turbine. For example, a user selects a "gas turbine" and then selects a "blade." When the user inputs information indicating that the selection is finalized into the image display device 50, the information acceptance unit 57 accepts the information selected by the user. At this time, the information acceptance unit 57 accepts a character string "blade."

For example, structure information of blades indicates that blades in the first 3D data and the second 3D data are disposed at regular intervals on a periphery of a circle having an arbitrary curvature radius. The structure information indicates that the lengths of the blades are the same. The parameter generation unit 53 generates a conversion parameter on the basis of the structure information in Step S106.

The total number of blades, the length of each blade, and the ID of each blade are known in a case in which an engine type, a section, and a stage step number have already been identified. The engine type indicates a type of an engine in which blades are disposed. The section indicates a compressor section or a turbine section. The stage step number indicates a position (step number) of a disk in a stage including multiple steps of disks. The structure information may include the total number of blades, the length of each blade, and the ID of each blade. In this case, the parameter generation unit 53 can generate a position-and-posture conversion parameter used for accurately connecting the first 3D data and the second 3D data together.

The image display device 50 executes the processing shown in FIG. 2. Specific processing in Step S106 is different from that in a case in which an inspection target is a pipe.

Figure 19:
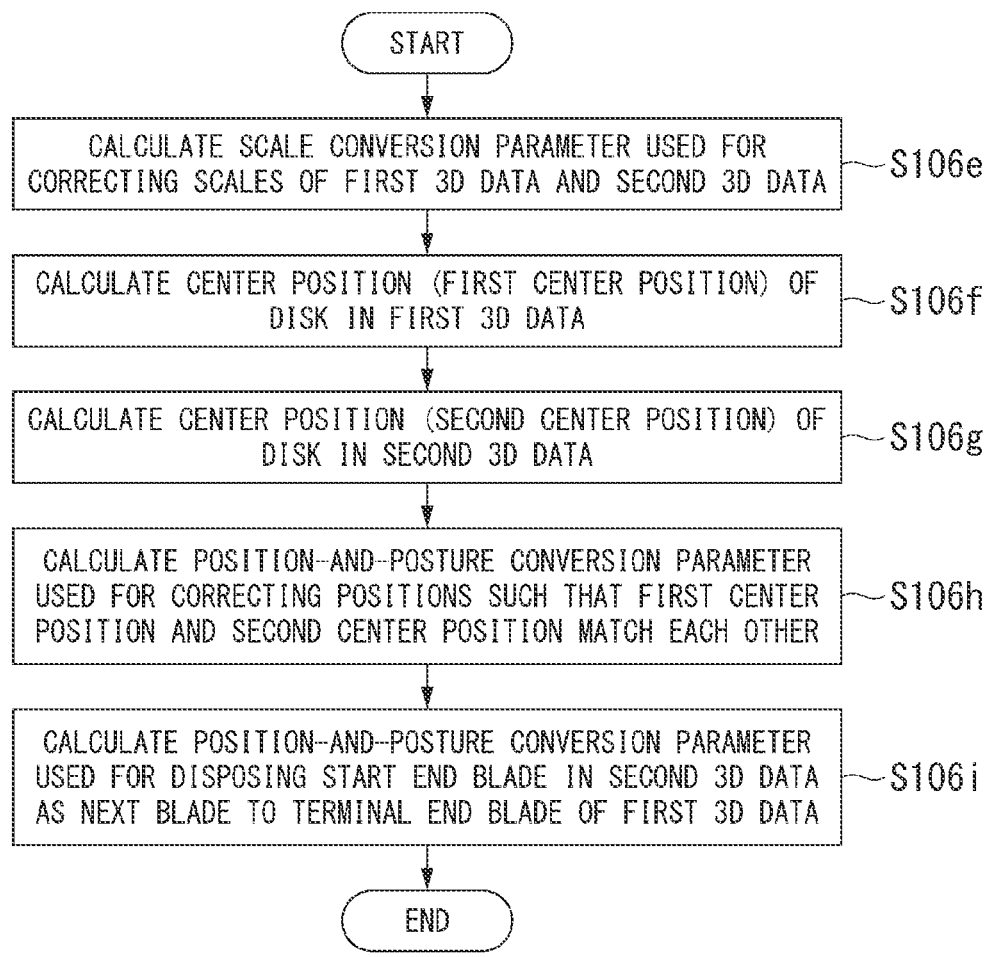
FIG. 19 is a flow chart showing a procedure of processing executed by an image display device according to the fifth modified example of the first embodiment of the present invention.

The parameter generation unit 53 executes processing shown in FIG. 19 in Step S106. FIG. 19 shows a procedure of the processing executed by the parameter generation unit 53. In the following example, the parameter generation unit 53 generates a position-and-posture conversion parameter used for causing the position and the posture of the second 3D coordinate system to match the position and the posture of the first 3D coordinate system, respectively. In addition, the parameter generation unit 53 generates a scale conversion parameter used for causing the scale of the second 3D coordinate system to match the scale of the first 3D coordinate system.

The structure information indicates that the lengths of the blades are the same. Therefore, the parameter generation unit 53 generates a scale conversion parameter used for correcting the scale of the second 3D data such that the length of the blade of the first 3D data and the length of the blade of the second 3D data match each other (Step S106*e*). The structure information may include information indicating the total length of the blade. The parameter generation unit 53 may determine that the length of the blade of the first 3D data and the length of the blade of the second 3D data are the same on the basis of the information.

After Step S106*e*, the parameter generation unit 53 calculates a center position (first center position) of the disk in the first 3D data (Step S106*f*). In the example shown in FIG. 18, the parameter generation unit 53 calculates the center position CP50.

The parameter generation unit 53 may use any method in order to calculate a center position of the disk. For example, the parameter generation unit 53 may calculate a position at which straight lines, each of which extends in a longitudinal direction of each blade, intersect as a center position. The parameter generation unit 53 may detect a blade in 3D data by executing pattern matching. The parameter generation unit 53 may calculate a circumscribed or inscribed circle on the basis of a positional relationship between the blades and may calculate a center position of the circle.

After Step S106*f*, the parameter generation unit 53 calculates a center position (second center position) of the disk in the second 3D data by executing similar processing to Step S106*f* (Step S106*g*). A method of calculating the center position of the disk in Step S106*g* may be the same as or different from that of calculating the center position of the disk in Step S106*f*.

After Step S106*g*, the parameter generation unit 53 generates a position-and-posture conversion parameter used for correcting the positions of the first 3D data and the second 3D data such that the first center position and the second center position match each other (Step S106*h*).

After Step S106*h*, the parameter generation unit 53 calculates a position-and-posture conversion parameter used for disposing the start end blade in the second 3D data as a next blade to the terminal end blade in the first 3D data (Step S106*i*).

When Step S106*i* is executed, the processing shown in FIG. 19 is completed.

Figure 20:
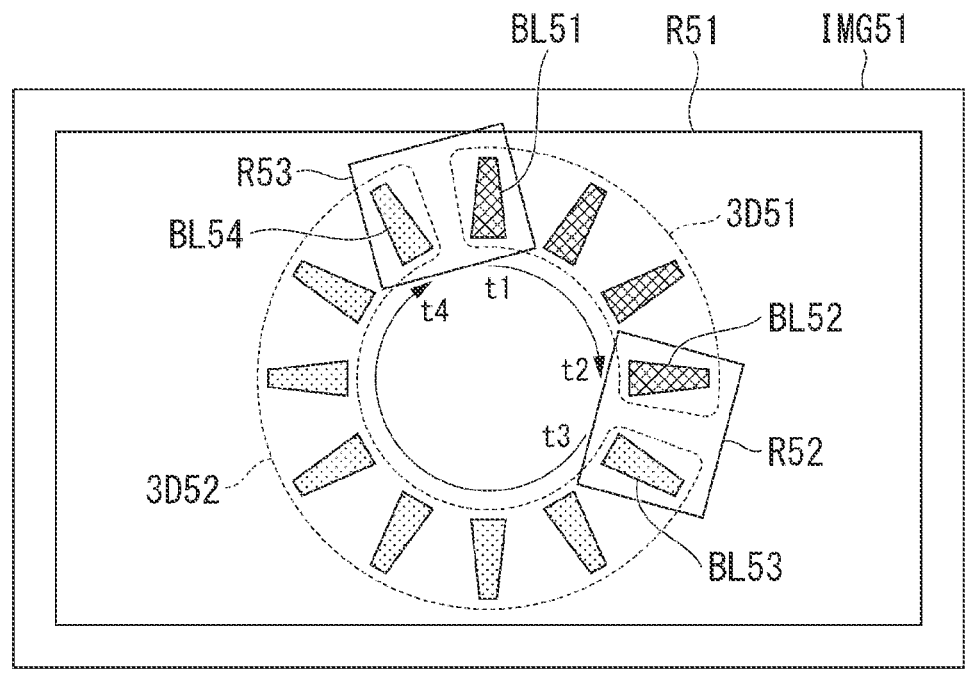
FIG. 20 is a diagram showing an example of an image displayed on a display unit according to the fifth modified example of the first embodiment of the present invention.

FIG. 20 shows an example of an image displayed on the display unit 71. The display control unit 56 displays an image IMG51 on the display unit 71. The image IMG51 includes a region R51. An image of a first 3D shape 3D51 and a second 3D shape 3D52 is displayed in the region R51. The first 3D shape 3D51 is indicated by the first 3D data. The second 3D shape 3D52 is indicated by the second 3D data.

The first 3D shape 3D51 includes four blades. The first 3D data include timestamps from a time point t1 to a time point t2 shown in FIG. 20. A timestamp (t1) of a blade BL51 is the earliest, and a timestamp (t2) of a blade BL52 is the last. The second 3D shape 3D52 includes eight blades. The second 3D data include timestamps from a time point t3 to a time point t4 shown in FIG. 20. A timestamp (t3) of a blade BL53 is the earliest, and a timestamp (t4) of a blade BL54 is the last.

The parameter generation unit 53 identifies a first connection region of the first 3D shape 3D51 associated with the time point t2 and identifies a second connection region of the second 3D shape 3D52 associated with the time point t3. The first connection region includes the blade BL52 at the terminal end of the first 3D shape 3D51. The second connection region includes the blade BL53 at the start end of the second 3D shape 3D52. The parameter generation unit 53 generates a position-and-posture conversion parameter used for connecting the second connection region to the first connection region.

The parameter generation unit 53 identifies a first connection region of the first 3D shape 3D51 associated with the time point t1 and identifies a second connection region of the second 3D shape 3D52 associated with the time point t4. The first connection region includes the blade BL51 at the start end of the first 3D shape 3D51. The second connection region includes the blade BL54 at the terminal end of the second 3D shape 3D52. The parameter generation unit 53 generates a position-and-posture conversion parameter used for connecting the second connection region to the first connection region.

The display control unit 56 displays a region R52 and a region R53 in the region R51. Each of the region R52 and the region R53 includes the first connection region and the second connection region.

The positional relationship between the blade BL51 and the blade BL54 may be determined on the basis of features of two or more images in order to connect the first connection region including the blade BL51 and the second connection region including the blade BL54 together. The two or more images are used for generating the first 3D data and the second 3D data. The first connection region and the second connection region may be connected together on the basis of the features. This method is called loop closing. A known technique can be applied to the loop closing.

In a case in which the total number of actual blades and the total number of blades in 3D data are the same, the parameter generation unit 53 can generate a position-and-posture conversion parameter used for accurately connecting the first 3D data and the second 3D data together. The total number of blades in the 3D data is equal to the sum of the number of blades in the first 3D data and the number of blades in the second 3D data.

Figure 21:
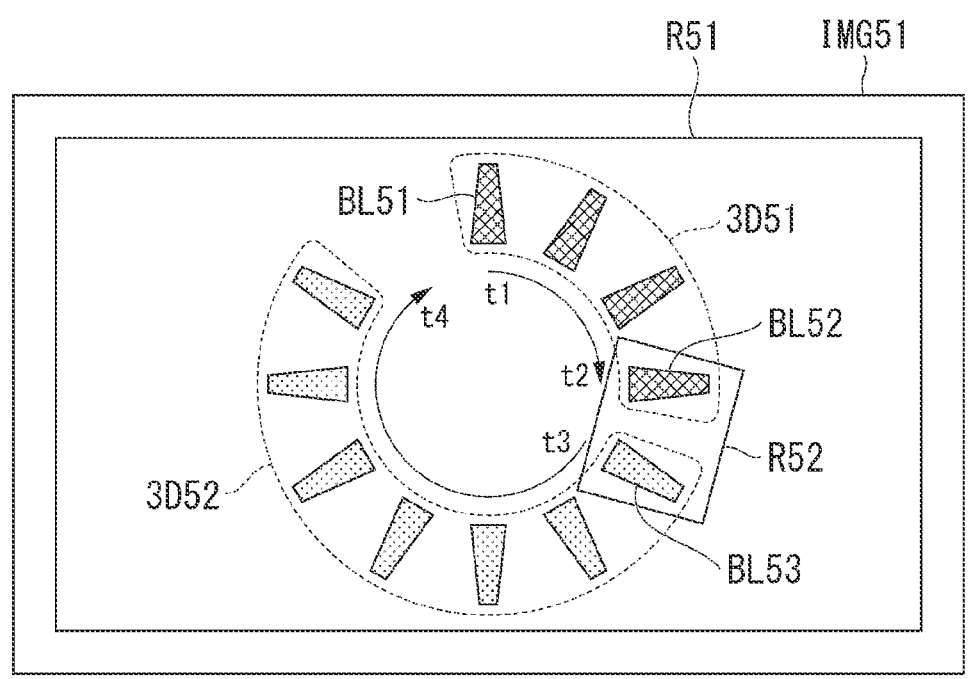
FIG. 21 is a diagram showing an example of an image displayed on the display unit according to the fifth modified example of the first embodiment of the present invention.

FIG. 21 shows an example of an image displayed on the display unit 71 when the total number of blades in the 3D data is less than that of actual blades by one. The same parts as those shown in FIG. 20 will not be described.

A second 3D shape 3D52 shown in FIG. 21 does not include the blade BL54 shown in FIG. 20. There is a possibility that the second 3D shape 3D52 shown in FIG. 21 does not include the blade BL53 shown in FIG. 20. Therefore, there is a possibility that the second 3D shape 3D52 does not actually include one of the blade BL53 and the blade BL54.

After an image of 3D data of a wide range is displayed, a user may adjust the position and the posture of the 3D data as in the first modified example of the first embodiment. At this time, the user may adjust the position of the second 3D data by rotating the second 3D data. The user may rotate the first 3D data and the second 3D data. The position of the 3D data may be adjusted only on a periphery of a circle having an arbitrary diameter.

Second Embodiment

A second embodiment of the present invention will be described. In the second embodiment, a method of generating the first 3D data and the second 3D data will be described. Hereinafter, an example in which the image display device is an endoscope will be described.

Figure 22:
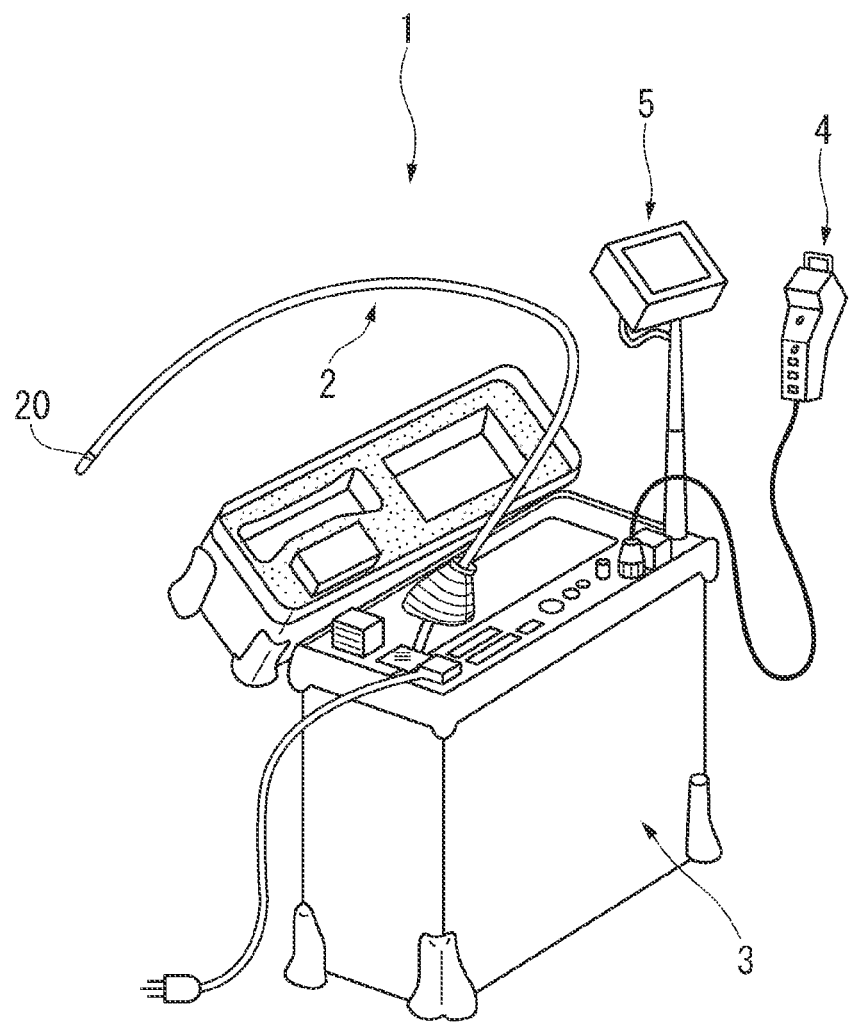
FIG. 22 is a perspective view showing an entire configuration of an endoscope device according to a second embodiment of the present invention.
Figure 23:
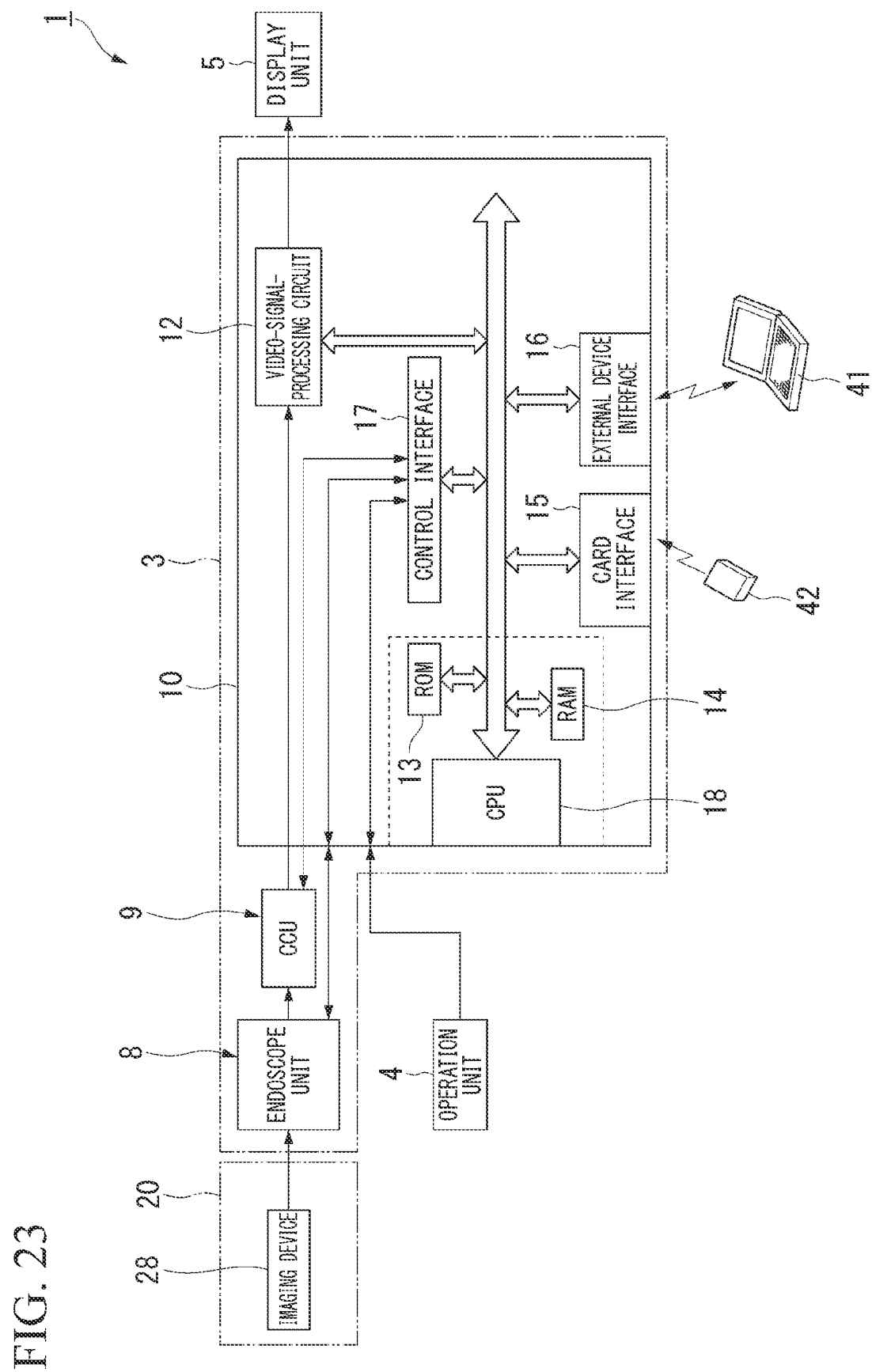
FIG. 23 is a block diagram showing an internal configuration of the endoscope device according to the second embodiment of the present invention.

A configuration of an endoscope device 1 in the second embodiment will be described by referring to FIG. 22 and FIG. 23. FIG. 22 shows an external appearance of the endoscope device 1. FIG. 23 shows an internal configuration of the endoscope device 1.

The endoscope device 1 shown in FIG. 22 includes the insertion unit 2, a main body unit 3, an operation unit 4, and a display unit 5. The endoscope device 1 images a subject and generates an image. The subject is an industrial product. In order to observe various subjects, a user can perform replacement of an optical adaptor mounted at a distal end 20 of the insertion unit 2, selection of a built-in video-processing program, and addition of a video-processing program.

The insertion unit 2 is inserted inside a subject. The insertion unit 2 has a long and thin bendable tube shape from the distal end 20 to a base end portion. The insertion unit 2 images a subject and outputs an imaging signal to the main body unit 3. An optical adapter is mounted on the distal end 20 of the insertion unit 2. For example, a single-eye optical adapter is mounted on the distal end 20. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface. The display unit 5 is a monitor (display) such as a liquid crystal display (LCD). The display unit 5 may be a touch panel. In such a case, the operation unit 4 and the display unit 5 are integrated.

The main body unit 3 shown in FIG. 23 includes an endoscope unit 8, a camera control unit (CCU) 9, and a control device 10.

The endoscope unit 8 includes a light source device and a bending device not shown in the drawing. The light source device provides the distal end 20 with illumination light that is necessary for observation. The bending device bends a bending mechanism that is built in the insertion unit 2.

An imaging device 28 is built in the distal end 20 of the insertion unit 2. The imaging device 28 is an image sensor. The imaging device 28 photo-electrically converts an optical image of a subject formed by an optical adaptor and generates an imaging signal.

The CCU 9 drives the imaging device 28. An imaging signal output from the imaging device 28 is input into the CCU 9. The CCU 9 performs pre-processing including amplification, noise elimination, and the like for the imaging signal acquired by the imaging device 28. The CCU 9 converts the imaging signal for which the pre-processing has been executed into a video signal such as an NTSC signal.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. For example, the video-signal-processing circuit 12 combines the video signal output from the CCU 9 and a graphic image signal generated by the CPU 18. The graphic image signal includes an image of the operation screen and the like. The video-signal-processing circuit 12 outputs a combined video signal to the display unit 5.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42 is connected to the card interface 15. The memory card 42 is a recording medium that is attachable to and detachable from the endoscope device 1. The card interface 15 inputs control-processing information, image information, and the like stored on the memory card 42 into the control device 10. In addition, the card interface 15 records the control-processing information, the image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. In this way, the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by the user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

The imaging device 28 is a camera that acquires a still image group. The still image group includes two or more images. Each of the two or more images is temporally associated with the other images included in the two or more images. For example, each of the two or more images is a still image. A video may be used instead of the still image group. Two or more frames included in the video are associated with each other by timestamps (timecodes).

For example, the imaging device 28 is a single-eye camera having a single viewpoint. In this case, each of two or more still images is an image acquired by the single-eye camera. A camera in the second embodiment includes the imaging device 28 and an observation optical system.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by imaging the subject. The image is a two-dimensional image (2D image). The image acquired by the imaging device 28 is input into the CPU 18 via the video-signal-processing circuit 12.

Figure 24:
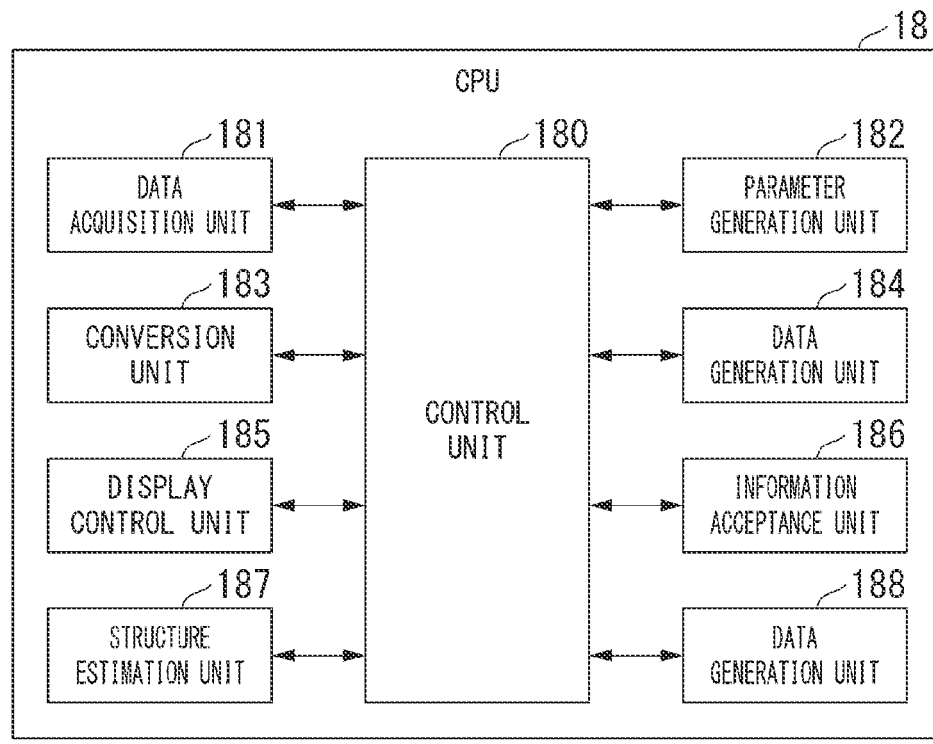
FIG. 24 is a block diagram showing a functional configuration of a CPU included in the endoscope device according to the second embodiment of the present invention.

FIG. 24 shows a functional configuration of the CPU 18. The CPU 18 has functional units including a control unit 180, a data acquisition unit 181, a parameter generation unit 182, a conversion unit 183, a data generation unit 184, a display control unit 185, an information acceptance unit 186, a structure estimation unit 187, and a data generation unit 188. At least one of the blocks shown in FIG. 24 may be constituted by a different circuit from the CPU 18.

Each unit shown in FIG. 24 may be constituted by at least one of a processor and a logic circuit. Each unit shown in FIG. 24 may include one or a plurality of processors. Each unit shown in FIG. 24 may include one or a plurality of logic circuits.

The control unit 180 controls processing executed by each unit shown in FIG. 24.

The data acquisition unit 181 has a similar function to that of the data acquisition unit 52 shown in FIG. 1. The data acquisition unit 181 connects to the RAM 14 and acquires first 3D data and second 3D data from the RAM 14. The data acquisition unit 181 may acquire the first 3D data and the second 3D data from a recording medium in the PC 41 or from the memory card 42.

The parameter generation unit 182 has a similar function to that of the parameter generation unit 53 shown in FIG. 1. The parameter generation unit 182 generates a conversion parameter used for converting the first 3D coordinate system and the second 3D coordinate system into a common coordinate system.

The conversion unit 183 has a similar function to that of the conversion unit 54 shown in FIG. 1. The conversion unit 183 converts the first 3D coordinate system and the second 3D coordinate system into the common coordinate system by using the conversion parameter generated by the parameter generation unit 182. In this way, the conversion unit 183 converts the first 3D data and the second 3D data into 3D data in the common coordinate system.

The data generation unit 184 has a similar function to that of the data generation unit 55 shown in FIG. 1. The data generation unit 184 connects together the first 3D data and the second 3D data converted by the conversion unit 183 into the 3D data in the common coordinate system. In this way, the data generation unit 184 generates 3D data of a wide range of a subject.

The display control unit 185 controls processing executed by the video-signal-processing circuit 12. The CCU 9 outputs a video signal. The video signal includes color data of each pixel of an image acquired by the imaging device 28. The display control unit 185 causes the video-signal-processing circuit 12 to output the video signal output from the CCU 9 to the display unit 5. The video-signal-processing circuit 12 outputs the video signal to the display unit 5. The display unit 5 displays an image on the basis of the video signal output from the video-signal-processing circuit 12. In this way, the display control unit 185 displays the image acquired by the imaging device 28 on the display unit 5.

The display control unit 185 displays various kinds of information on the display unit 5. In other words, the display control unit 185 displays various kinds of information on an image. The various kinds of information may include a cursor. The cursor is a mark used by a user to designate a specific point on an image.

For example, the display control unit 185 generates a graphic image signal of the various kinds of information. The display control unit 185 outputs the generated graphic image signal to the video-signal-processing circuit 12. The video-signal-processing circuit 12 combines the video signal output from the CCU 9 and the graphic image signal output from the CPU 18. In this way, the various kinds of information are superimposed on an image. The video-signal-processing circuit 12 outputs the combined video signal to the display unit 5. The display unit 5 displays an image on which the various kinds of information are superimposed.

In addition, the display control unit 185 has a similar function to that of the display control unit 56 shown in FIG. 1. The display control unit 185 generates a graphic image signal of 3D data. The display control unit 185 outputs the graphic image signal to the video-signal-processing circuit 12. Similar processing to that described above is executed, and the display unit 5 displays an image of the 3D data. In this way, the display control unit 185 displays the image of the 3D data on the display unit 5.

A user inputs various kinds of information into the endoscope device 1 by operating the operation unit 4. The operation unit 4 outputs the information input by the user. The information is input into the control interface 17, which is an input unit. The information is output from the control interface 17 to the CPU 18. The information acceptance unit 186 accepts the information input into the endoscope device 1 via the operation unit 4.

For example, a user inputs position information of a cursor into the endoscope device 1 by operating the operation unit 4. In a case in which the display unit 5 is constituted as a touch panel, the user inputs position information indicating a position on an image into the endoscope device 1 by touching the screen of the display unit 5. The information acceptance unit 186 accepts the position information input into the endoscope device 1. The information acceptance unit 186 calculates the position on the image on the basis of the position information. The display control unit 185 displays a cursor at the position calculated by the information acceptance unit 186.

In addition, the information acceptance unit 186 has a similar function to that of the information acceptance unit 57 shown in FIG. 1. The information acceptance unit 186 accepts structure information.

The structure estimation unit 187 has a similar function to that of the structure estimation unit 58 shown in FIG. 1. In a case in which the information acceptance unit 186 accepts information not including structure information, the structure estimation unit 187 estimates a structure of a subject in a connection region on the basis of the accepted information and generates structure information.

Figure 25:
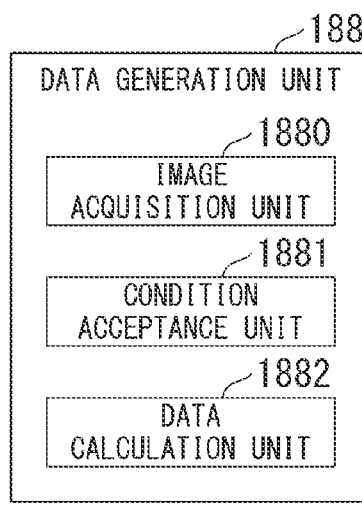
FIG. 25 is a block diagram showing a functional configuration of a data generation unit included in the endoscope device according to the second embodiment of the present invention.

The data generation unit 188 has functions shown in FIG. 25. FIG. 25 shows a functional configuration of the data generation unit 188. The data generation unit 188 has functional units including an image acquisition unit 1880, a condition acceptance unit 1881, and a data calculation unit 1882.

The image acquisition unit 1880 acquires the still image group from the RAM 14. The image acquisition unit 1880 may acquire the still image group from a recording medium in the PC 41 or from the memory card 42.

A user inputs information indicating a condition for generating 3D data into the endoscope device 1 by operating the operation unit 4. The condition acceptance unit 1881 accepts the condition for generating the 3D data on the basis of the information input by the user. Specifically, the condition includes an internal parameter of a camera, a distortion correction parameter of the camera, a setting value, a reference length, and the like. The setting value is used for various kinds of processing for generating the 3D data. The reference length is used for matching the 3D data with the actual scale of a subject.

The data calculation unit 1882 generates (reconfigures) 3D data of a subject on the basis of two or more images included in the still image group. The data calculation unit 1882 does not need to use all the images included in the still image group. In a case in which the still image group includes three or more images, the data calculation unit 1882 generates the 3D model on the basis of all or part of the still image group. The 3D data include 3D coordinates of two or more points (three-dimensional point cloud) of the subject, a camera coordinate, and posture information.

The camera coordinate indicates 3D coordinates of a camera, which acquires each of the two or more images, and is associated with each of the two or more images. The camera coordinate indicates 3D coordinates of a viewpoint when an image is acquired. For example, the camera coordinate indicates 3D coordinates of an observation optical system included in the camera. The posture information indicates a posture of the camera, which acquires each of the two or more images, and is associated with each of the two or more images. For example, the posture information indicates a posture of the observation optical system included in the camera.

A procedure of specific processing executed by the data calculation unit 1882 will be described. The data calculation unit 1882 uses the still image group acquired by the image acquisition unit 1880 and the condition accepted by the condition acceptance unit 1881. Hereinafter, an example in which the data calculation unit 1882 uses two images (still images) included in the still image group will be described. When the two images are generated, two viewpoints of the camera are different from each other. Even when three or more images are used, a basic principle is not changed from that of a case in which two images are used. A method described below may be also applied to a case in which three or more images are used.

In the method described below, feature points in each of two images acquired at two different viewpoints are detected, and a plurality of feature points are associated with each other. In addition, in the method described below, the position of the camera, the posture of the camera, and the 3D coordinates of the feature points are estimated on the basis of the plurality of feature points. A method using information of feature points is called an indirect method. A method applied to each embodiment of the present invention is not limited to this method.

For example, there is a method of directly using pixel values of two images acquired at two different viewpoints. By using this method, the position of the camera, the posture of the camera, and the 3D coordinates corresponding to each pixel are estimated. This method is called a direct method. This method may be used in each embodiment of the present invention. As long as the position of the camera, the posture of the camera, and the 3D coordinates of a subject are estimated by using two or more images acquired at two or more different viewpoints, any method may be used.

Figure 26:
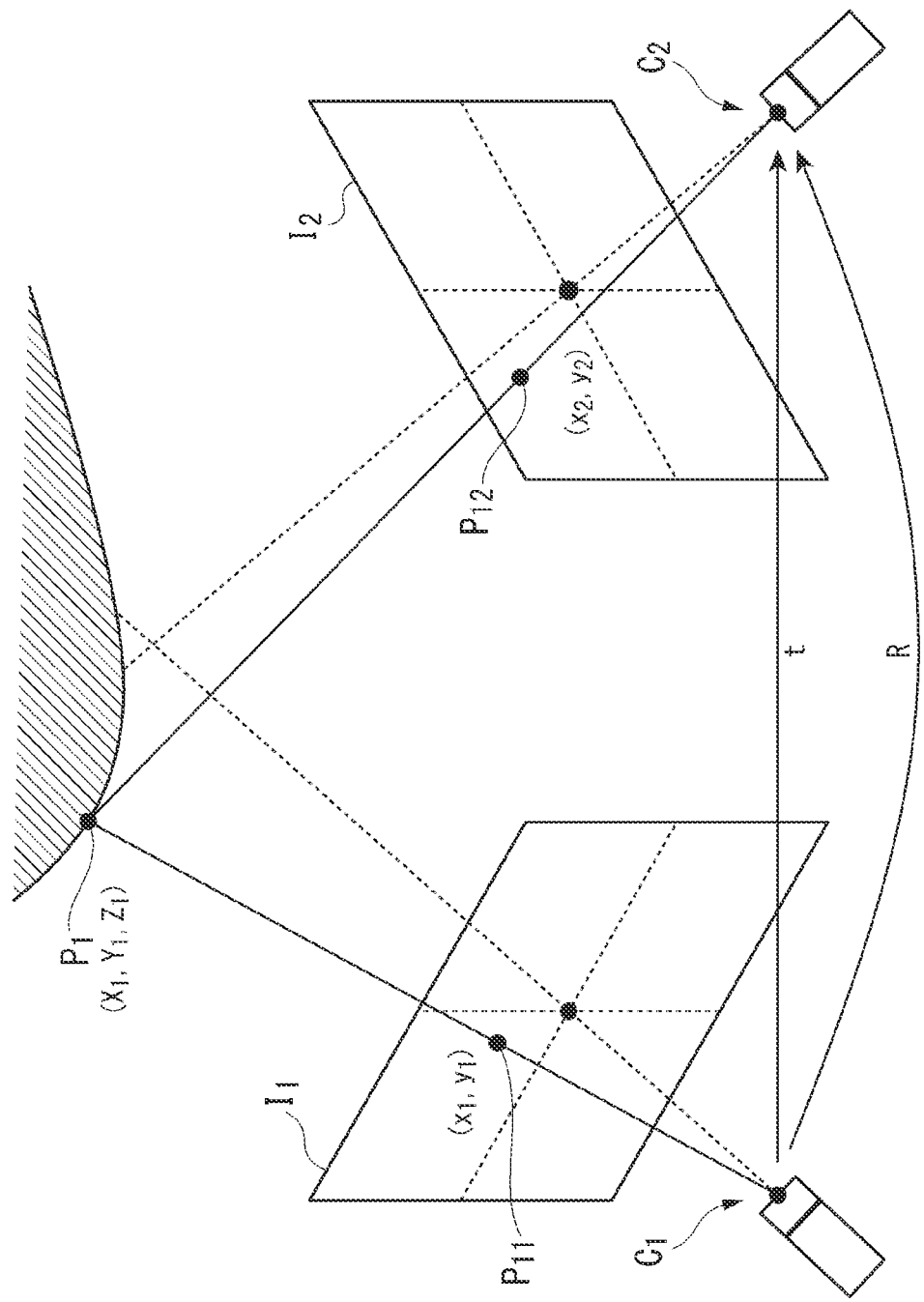
FIG. 26 is a schematic diagram showing a situation in which an image is acquired in the second embodiment of the present invention.

FIG. 26 schematically shows a situation of image acquisition in a case in which two images of a subject are acquired. In the following description, an expression "camera" is used in a broad sense. In a case in which an endoscope acquires an image, the camera in the following description specifically indicates an observation optical system of the distal end of the endoscope.

As shown in FIG. 26, first, an image $I_1$ is acquired in an imaging state $c_1$ of the camera. Next, an image $I_2$ is acquired in an imaging state $c_2$ of the camera. At least one of an imaging position and an imaging posture is different between the imaging state $c_1$ and the imaging state $c_2$. In FIG. 26, both the imaging position and the imaging posture are different between the imaging state $c_1$ and the imaging state $c_2$.

In each embodiment of the present invention, it is assumed that the image $I_1$ and the image $I_2$ are acquired by the same endoscope. In addition, in each embodiment of the present invention, it is assumed that parameters of an objective optical system of the endoscope do not change. The parameters of the objective optical system are a focal distance, a distortion aberration, a pixel size of an image sensor, and the like. Hereinafter, for the convenience of description, the parameters of the objective optical system will be abbreviated to internal parameters. When such conditions are assumed, the internal parameters specifying characteristics of the optical system of the endoscope can be used in common regardless of the position and the posture of the camera (observation optical system). In each embodiment of the present invention, it is assumed that the internal parameters are acquired at the time of factory shipment. In addition, in each embodiment of the present invention, it is assumed that the internal parameters are known at the time of acquiring an image.

In each embodiment of the present invention, it is assumed that two or more images are extracted from the still image group and the still image group is acquired by one endoscope. However, the present invention is not limited to this. For example, the present invention may be also applied to a case in which a 3D model is restored by using a plurality of still image groups acquired by a plurality of endoscopes. In this case, the image $I_1$ and the image $I_2$ have only to be acquired by using different endoscope devices, and each internal parameter has only to be stored for each endoscope. Even if the internal parameters are unknown, it is possible to perform calculation by using the internal parameters as variables. Therefore, the subsequent procedure does not greatly change in accordance with whether the internal parameters are known.

Figure 27:
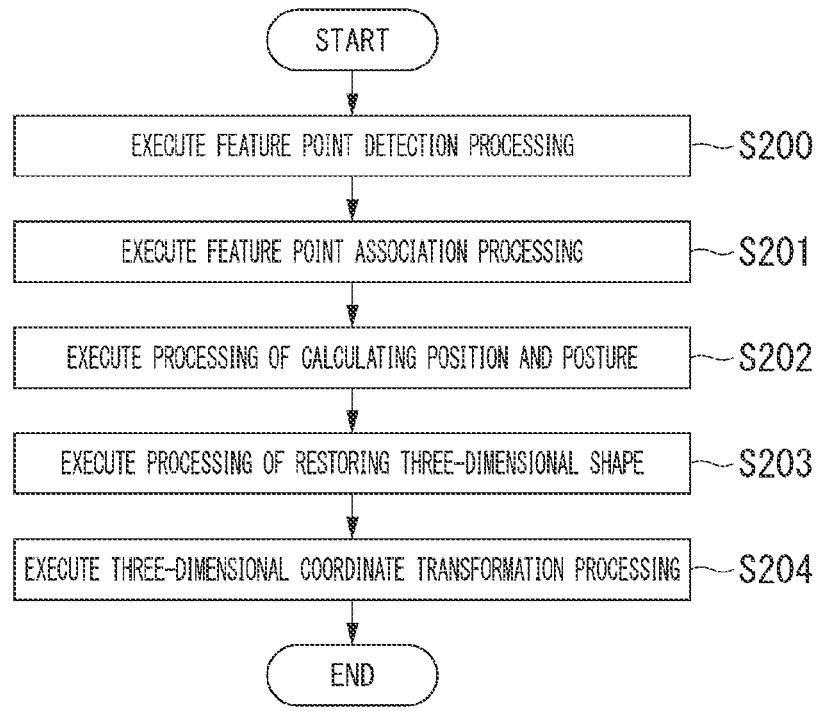
FIG. 27 is a flow chart showing a procedure of processing for generating 3D data in the second embodiment of the present invention.

Processing for calculating 3D coordinates of a subject on the basis of two images and generating 3D data will be described by using FIG. 27. FIG. 27 shows a procedure of processing for generating 3D data.

First, the data calculation unit 1882 executes feature point detection processing (Step S200). The data calculation unit 1882 detects a feature point of each of two images in the feature point detection processing. The feature point indicates a corner, an edge, and the like in which an image luminance gradient is large in information of a subject seen in an image. As a method of detecting this feature point, scale-invariant feature transform (SIFT), features from accelerated segment test (FAST), or the like is used. The data calculation unit 1882 can detect a feature point within an image by using such a method.

FIG. 26 shows an example in which a feature point Pu is detected from the image $I_1$ and a feature point $P_{12}$ is detected from the image $I_2$. Although only one feature point of each image is shown in FIG. 26, in fact, a plurality of feature points are detected in each image. There is a possibility that the number of feature points detected in each image is different between images. Each feature point detected from each image is converted into data called a feature quantity. The feature quantity is data indicating characteristics of a feature point.

After Step S200, the data calculation unit 1882 executes feature point association processing (Step S201). In the feature point association processing, the data calculation unit 1882 compares correlations of feature quantities between images for each feature point detected in the feature point detection processing (Step S200). In a case in which the correlations of the feature quantities are compared and a feature point of which feature quantities are close to those of a feature point of another image is found in each image, the data calculation unit 1882 stores information of the feature point on the RAM 14. In this way, the data calculation unit 1882 associates feature points of respective images together. On the other hand, in a case in which a feature point of which feature quantities are close to those of a feature point of another image is not found, the data calculation unit 1882 discards information of the feature point.

After Step S201, the data calculation unit 1882 reads coordinates of feature points (feature point pair) of two images associated with each other from the RAM 14. The data calculation unit 1882 executes processing of calculating a position and a posture on the basis of the read coordinates (Step S202). In the processing of calculating a position and a posture, the data calculation unit 1882 calculates a relative position and a relative posture between the imaging state $c_1$ of the camera that acquires the image $I_1$ and the imaging state $c_2$ of the camera that acquires the image $I_2$. More specifically, the data calculation unit 1882 calculates a matrix E by solving the following Equation (1) using an epipolar restriction.

$$p_1^T E p_2 = 0 \quad E = [t]_X R \quad \because [t]_X = \begin{pmatrix} 0 & -t_z & t_y \\ t_z & 0 & -t_x \\ -t_y & t_x & 0 \end{pmatrix} \quad (1)$$

The matrix E is called a basic matrix. The basic matrix E is a matrix storing a relative position and a relative posture between the imaging state $c_1$ of the camera that acquires the image $I_1$ and the imaging state $c_2$ of the camera that acquires the image $I_2$. In Equation (1), a matrix $p_1$ is a matrix including coordinates of a feature point detected from the image $I_1$. A matrix $p_2$ is a matrix including coordinates of a feature point detected from the image $I_2$. The basic matrix E includes information related to a relative position and a relative posture of the camera and thus corresponds to external parameters of the camera. The data calculation unit 1882 can solve the basic matrix E by using a known algorithm.

As shown in FIG. 26, Expression (2) and Expression (3) are satisfied in a case in which the amount of position (relative position) change of the camera is t and the amount of posture (relative posture) change of the camera is R.

$$t = (t_x, t_y, t_z) \quad (2)$$

$$R = R_x(\alpha) R_y(\beta) R_z(\gamma) = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \quad (3)$$

In Expression (2), the amount of movement in an x-axis direction is expressed as $t_x$, the amount of movement in a y-axis direction is expressed as $t_y$, and the amount of movement in a z-axis direction is expressed as $t_z$. In Expression (3), a rotation amount α around the x-axis is expressed as $R_x(\alpha)$, a rotation amount β around the y axis is expressed as $R_y(\beta)$, and a rotation amount γ around the z axis is expressed as $R_z(\gamma)$. After the basic matrix E is calculated, optimization processing called bundle adjustment may be executed in order to improve restoration accuracy of 3D coordinates.

The data calculation unit 1882 calculates 3D coordinates (camera coordinate) in a coordinate system of a 3D model by using the calculated amount of positional change of the camera. For example, the data calculation unit 1882 defines 3D coordinates of the camera that acquires the image $I_1$. The data calculation unit 1882 calculates 3D coordinates of the camera that acquires the image $I_2$ on the basis of the 3D coordinates of the camera that acquires the image $I_1$ and the amount of positional change of the camera that acquires the image $I_2$.

The data calculation unit 1882 calculates posture information in a coordinate system of a 3D model by using the calculated amount of postural change of the camera. For example, the data calculation unit 1882 defines posture information of the camera that acquires the image $I_1$. The data calculation unit 1882 generates posture information of the camera that acquires the image $I_2$ on the basis of the posture information of the camera that acquires the image $I_1$ and the amount of postural change of the camera that acquires the image $I_2$.

The data calculation unit 1882 generates data (3D shape data) of a three-dimensional shape (3D shape) by executing the processing (Step S202) of calculating a position and a posture. The 3D shape data include 3D coordinates (camera coordinate) at a position of a camera and posture information indicating a posture of the camera. In addition, in a case in which a method such as structure from motion, visual-SLAM, or the like is applied to the processing (Step S202) of calculating a position and a posture, the data calculation unit 1882 further calculates 3D coordinates of each feature point in Step S202. The 3D shape data generated in Step S202 do not include 3D coordinates of points on a subject other than the feature point. Therefore, the 3D shape data indicate a sparse 3D shape of the subject.

The 3D shape data include the 3D coordinates of each feature point, the above-described camera coordinate, and the above-described posture information. The 3D coordinates of each feature point are defined in the coordinate system of the 3D data.

The 3D coordinates of each feature point are associated with two-dimensional coordinates (2D coordinates) of each feature point. The 2D coordinates of each feature point are defined in a coordinate system of an image including each feature point. The 2D coordinates and the 3D coordinates of each feature point are associated with an image including each feature point.

After Step S202, the data calculation unit 1882 executes processing of restoring a three-dimensional shape on the basis of the relative position and the relative posture of the camera (the amount t of positional change and the amount R of postural change) calculated in Step S202 (Step S203). The data calculation unit 1882 generates 3D data of a subject in the processing of restoring a three-dimensional shape. As a technique for restoring a three-dimensional shape of a subject, there are patch-based multi-view stereo (PMVS), matching-processing that uses parallelization stereo, and the like. However, a means therefor is not particularly limited.

The data calculation unit 1882 calculates 3D coordinates of points on a subject other than feature points in Step S203. The 3D coordinates of each point other than the feature points are defined in the coordinate system of the 3D data. The 3D coordinates of each point are associated with the 2D coordinates of each point. The 2D coordinates of each point are defined in a coordinate system of a 2D image including each point. The 3D coordinates and the 2D coordinates of each point are associated with a 2D image including each point. The data calculation unit 1882 updates the 3D shape data. The updated 3D shape data include the 3D coordinates of each feature point, the 3D coordinates of each point other than the feature points, the camera coordinate, and the posture information. The 3D shape data updated in Step S203 include 3D coordinates of a point on the subject other than the feature points in addition to the 3D coordinates of the feature points. Therefore, the 3D shape data indicate a dense 3D shape of the subject.

After Step S203, the data calculation unit 1882 executes three-dimensional coordinate transformation processing on the basis of both the 3D shape data processed in the processing (Step S203) of restoring a three-dimensional shape and the reference length accepted by the condition acceptance unit 1881 (Step S204). The data calculation unit 1882 transforms the 3D shape data of the subject into three-dimensional coordinate data (3D data) having a dimension of length in the three-dimensional coordinate transformation processing. When Step S204 is executed, the processing shown in FIG. 27 is completed.

In order to shorten a processing time, Step S203 may be omitted. In this case, after Step S202 is executed, Step S204 is executed without executing Step S203.

Step S204 may be omitted. In this case, after Step S203 is executed, the processing shown in FIG. 27 is completed without executing Step S204. In this case, the 3D data indicate a relative shape of the subject not having a dimension of length. Even when the 3D data indicate a relative shape of the subject, the endoscope device 1 can identify a region of the 3D data corresponding to the camera coordinate.

It is necessary that at least part of a region of one of images and at least part of a region of each of at least one of the other images overlap each other in order to generate 3D data in accordance with the principle shown in FIG. 26. In other words, a region of a first image and a region of a second image different from the first image include a common region. The other region in the first image excluding the common region and the other region in the second image excluding the common region are different from each other.

After the 3D data are generated, the endoscope device 1 executes similar processing to that shown in FIG. 2. The endoscope device 1 can connect the first 3D data and the second 3D data together and can display an image of a 3D shape of a wide range. The image display device 50 shown in FIG. 1 may include the data generation unit 188.

Third Embodiment

A third embodiment of the present invention will be described. In the third embodiment, a structure in a connection region of a subject is estimated by using data generated by a sensor.

Figure 28:
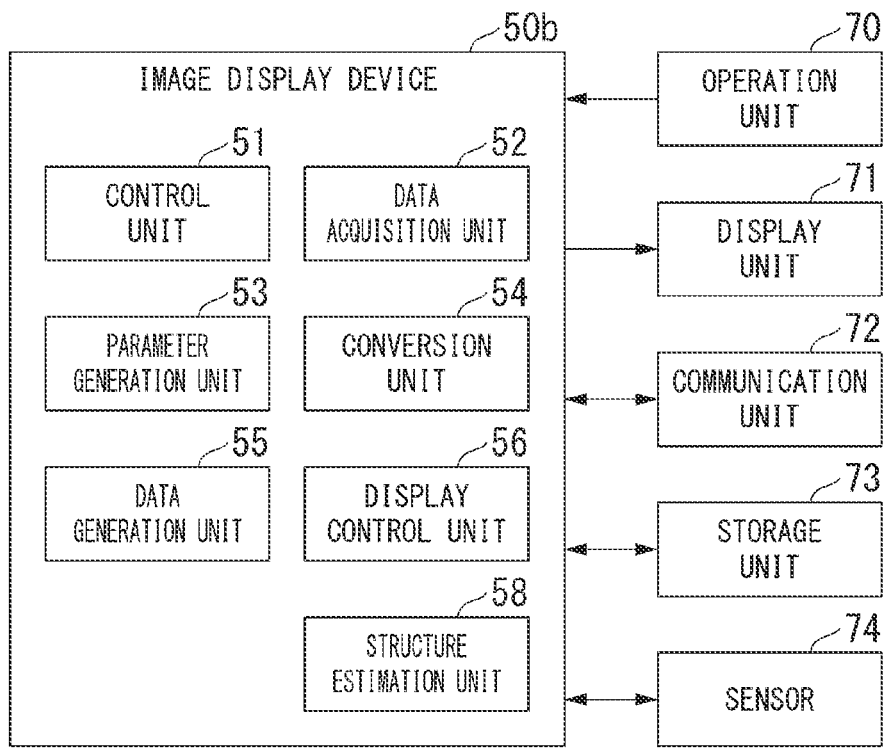
FIG. 28 is a block diagram showing a configuration of an image display device according to a third embodiment of the present invention.

The image display device 50 shown in FIG. 1 is changed to an image display device 50b shown in FIG. 28. FIG. 28 shows a configuration of the image display device 50b. The same configuration as that shown in FIG. 1 will not be described.

The image display device 50b shown in FIG. 28 includes a control unit 51, a data acquisition unit 52, a parameter generation unit 53, a conversion unit 54, a data generation unit 55, a display control unit 56, and a structure estimation unit 58. The image display device 50b does not include the information acceptance unit 57 shown in FIG. 1. An operation unit 70, a display unit 71, a communication unit 72, a storage unit 73, and a sensor 74 shown in FIG. 28 are connected to the image display device 50b. The image display device 50b may include at least one of the operation unit 70, the display unit 71, the communication unit 72, the storage unit 73, and the sensor 74.

Each unit of the image display device 50b may be constituted by at least one of a processor and a logic circuit. Each unit of the image display device 50b may include one or a plurality of processors. Each unit of the image display device 50b may include one or a plurality of logic circuits.

The sensor 74 outputs sensor data. The sensor data are influenced by a geometric structure of a subject. The sensor 74 is an image sensor (imaging device).

The sensor data include a pixel value, a measured value of an acceleration, or a measured value of an angular velocity as a sensor value. The image sensor generates an image of a subject. The structure of the subject is seen in the image.

The sensor data are saved on the storage unit 73. The structure estimation unit 58 estimates a structure of a subject in a connection region by using the sensor data and generates structure information.

Figure 29:
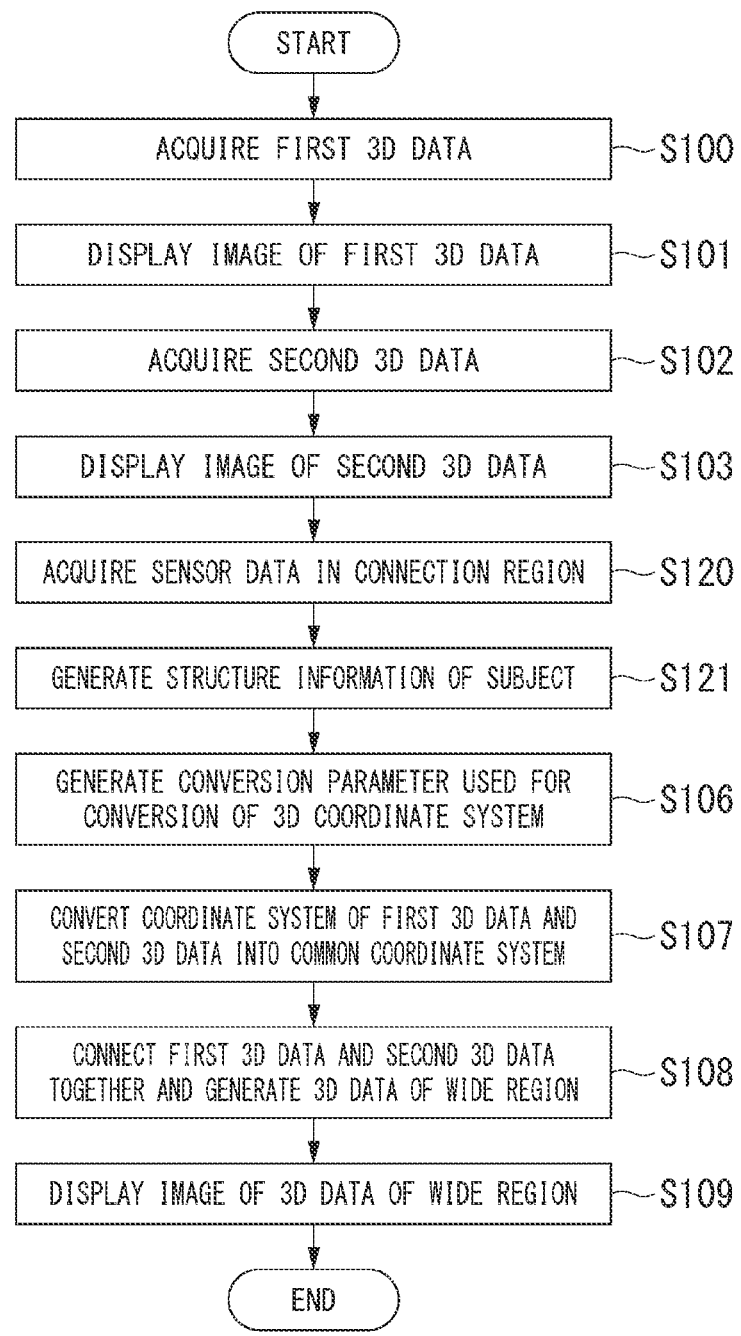
FIG. 29 is a flow chart showing a procedure of processing executed by the image display device according to the third embodiment of the present invention.

Processing executed by the image display device 50b will be described by using FIG. 29. FIG. 29 shows a procedure of the processing executed by the image display device 50b. The same processing as that shown in FIG. 2 will not be described.

After Step S103, the data acquisition unit 52 connects to the storage unit 73 and acquires the sensor data in the connection region from the storage unit 73 (Step S120).

The 3D data include timestamps. In the sensor data, a sensor value and a timestamp are associated with each other. Therefore, the data acquisition unit 52 can acquire sensor data generated at a time point indicated by the timestamp of the 3D data. For example, the data acquisition unit 52 acquires sensor data in a section from the time point of the terminal end of the first 3D data to the time point of the start end of the second 3D data from the storage unit 73.

Hereinafter, an example in which the sensor 74 is an image sensor and the data acquisition unit 52 acquires two or more images from the storage unit 73 will be described. The following processing can be also applied to a case in which the data acquisition unit 52 acquires one image from the storage unit 73.

After Step S120, the structure estimation unit 58 estimates a structure of a subject in a connection region by using the two or more images acquired in Step S120 and generates structure information (Step S121). After Step S121, Step S106 is executed.

The structure estimation unit 58 may use any method in order to estimate the structure of the subject. For example, the structure estimation unit 58 may estimate the structure of the subject by using AI. The structure estimation unit 58 may estimate the structure of the subject by determining features of an image, calculating feature quantities, and using support vector machines (SVM).

When the structure estimation unit 58 determines that the subject is a straight pipe, the structure estimation unit 58 may acquire structure information of the straight pipe from the reference table TB11 shown in FIG. 5.

Each aspect of the present invention may include the following modified example. The structure information is generated on the basis of data output from the sensor 74.

In the third embodiment, the structure estimation unit 58 estimates a structure of a subject in a connection region by using sensor data. The image display device 50b does not need to accept information from a user.

First Modified Example of Third Embodiment

A first modified example of the third embodiment of the present invention will be described. In the first modified example of the third embodiment, the image display device 50b shown in FIG. 28 is used. In the first modified example of the third embodiment, the endoscope device 1 shown in FIG. 22 is used in order to generate 3D data.

In the third embodiment described above, the structure estimation unit 58 estimates a structure of a subject in a connection region by using an image generated by an image sensor. On the other hand, in the first modified example of the third embodiment, the structure estimation unit 58 uses sensor data output from an inertial measurement unit (IMU) instead of using an image.

The IMU is used as the sensor 74. The sensor 74 includes an acceleration sensor and an angular velocity sensor and determines an acceleration and an angular velocity. For example, the sensor 74 is disposed in the distal end 20 of the insertion unit 2. In a case in which the insertion unit 2 is inserted into a pipe, the insertion unit 2 moves in accordance with the structure of the pipe. Therefore, the sensor 74 outputs sensor data in accordance with the structure of the pipe. The structure estimation unit 58 calculates traces (tracks) of the distal end 20 by using the sensor data. The traces indicate two or more positions at which the distal end 20 is disposed.

The image display device 50b executes the processing shown in FIG. 29. The structure estimation unit 58 calculates traces of the distal end 20 by using the sensor data in Step S121. The structure estimation unit 58 estimates a structure of a subject in a connection region on the basis of the traces and generates structure information in Step S121.

For example, the structure estimation unit 58 estimates the structure of the subject by executing the following processing. The first 3D data and the second 3D data include 3D coordinates in each of a first section, a second section, and a third section. The first section includes the start end of a 3D shape. The second section includes the terminal end of the 3D shape. The third section is disposed between the first section and the second section. For example, the second section in the first 3D data and the first section in the second 3D data correspond to a connection region.

The structure estimation unit 58 analyzes the traces of the distal end 20 in each of the second section in the first 3D data, the third section in the first 3D data close to the second section, the first section in the second 3D data, and the third section in the second 3D data close to the first section. When the structure estimation unit 58 determines that the distal end 20 moves almost linearly in all the sections, the structure estimation unit 58 determines that the subject is a straight pipe. When the structure estimation unit 58 determines that the moving direction of the distal end 20 changes by almost 90 degrees as the distal end 20 passes through the above-described sections, the structure estimation unit 58 determines that the subject is a 90-degree fitting. The structure estimation unit 58 generates structure information in accordance with the structure of the subject.

Second Modified Example of Third Embodiment

A second modified example of the third embodiment of the present invention will be described. In the second modified example of the third embodiment, the image display device 50*b* shown in FIG. 28 is used. The image display device 50*b* does not need to include the sensor 74. In the second modified example of the third embodiment, the endoscope device 1 shown in FIG. 22 is used in order to generate 3D data.

In the third embodiment described above, the structure estimation unit 58 estimates a structure of a subject in a connection region by using an image generated by an image sensor. On the other hand, in the second modified example of the third embodiment, the structure estimation unit 58 uses history information of operations related to bending of the insertion unit 2 instead of using an image.

A user inputs information indicating a bending direction and a bending amount into the endoscope device 1 by operating the operation unit 4. The control unit 180 of the CPU 18 generates a control signal on the basis of the information input by the user. The control signal is output to the endoscope unit 8 via the control interface 17. The bending device of the endoscope unit 8 bends the bending mechanism on the basis of the control signal.

The control unit 180 generates history information of operations related to bending of the insertion unit 2. The history information includes information indicating the bending direction and the bending amount. The communication unit 72 receives the history information from the endoscope device 1. The history information is saved on the storage unit 73.

The image display device 50*b* executes the processing shown in FIG. 29. The data acquisition unit 52 acquires the history information from the storage unit 73 instead of the sensor data in Step S120. The structure estimation unit 58 estimates a structure of a subject in a connection region by using the history information instead of the sensor data and generates structure information in Step S121.

For example, the structure estimation unit 58 estimates the structure of the subject by executing the following processing. The first 3D data and the second 3D data include 3D coordinates in each of a first section, a second section, and a third section. The first section includes the start end of a 3D shape. The second section includes the terminal end of the 3D shape. The third section is disposed between the first section and the second section. For example, the second section in the first 3D data and the first section in the second 3D data correspond to a connection region.

The structure estimation unit 58 analyzes the history information in each of the second section in the first 3D data, the third section in the first 3D data close to the second section, the first section in the second 3D data, and the third section in the second 3D data close to the first section. When the structure estimation unit 58 determines that the insertion unit 2 does not bend in any of the sections, the structure estimation unit 58 determines that the subject is a straight pipe. When the structure estimation unit 58 determines that the insertion unit 2 bends by almost 90 degrees as the distal end 20 of the insertion unit 2 passes through the above-described sections, the structure estimation unit 58 determines that the subject is a 90-degree fitting.

Each aspect of the present invention may include the following modified example. The first 3D data are generated by using two or more first images. The second 3D data are generated by using two or more second images. The two or more first images and the two or more second images are generated on the basis of an optical image of a subject acquired by the insertion unit 2. The insertion unit 2 is inserted inside an object having the subject and is bendable. The structure information is generated on the basis of information indicating a bending direction and a bending amount of the insertion unit 2.

Fourth Embodiment

A fourth embodiment of the present invention will be described. In the fourth embodiment, the image display device 50 shown in FIG. 1 is used. Reference data are used as structure information. For example, the reference data are design data including a design value of a geometric structure. For example, the design data are generated by using 3D computer-aided design (3D-CAD).

Figure 30:
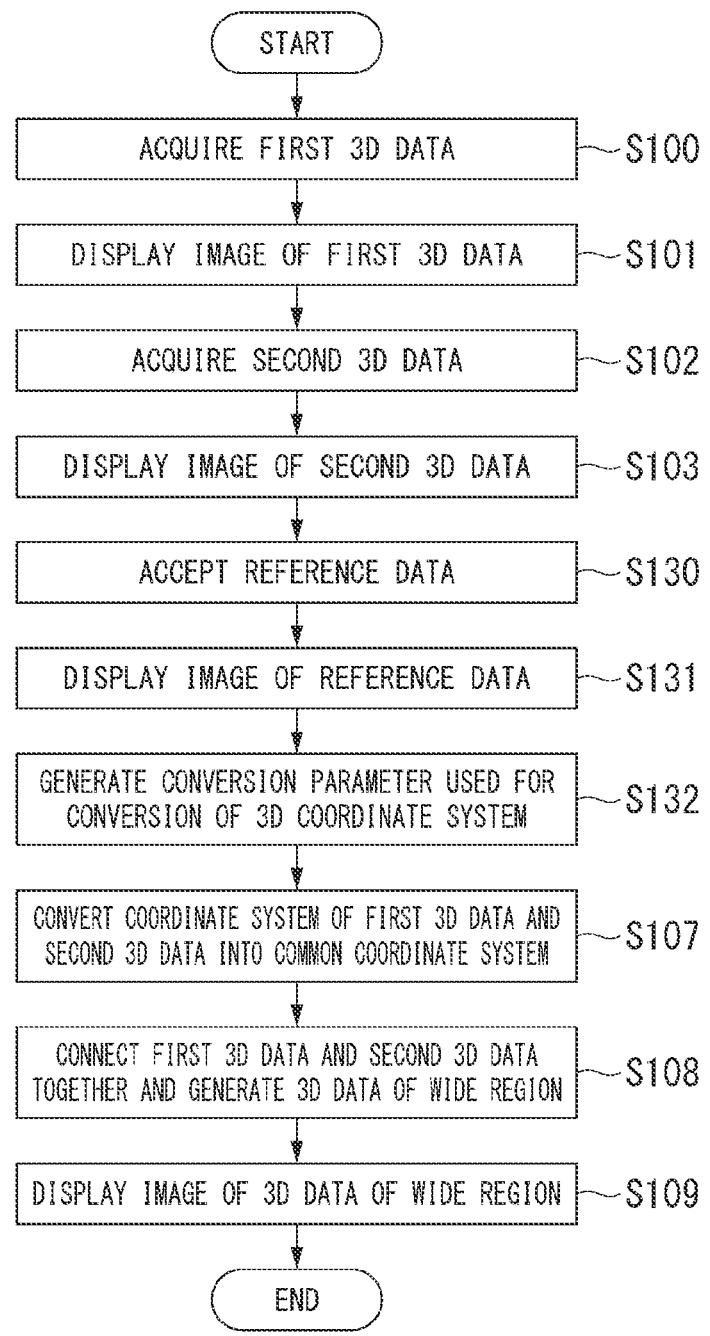
FIG. 30 is a flow chart showing a procedure of processing executed by an image display device according to a fourth embodiment of the present invention.

Processing executed by the image display device 50 will be described by using FIG. 30. FIG. 30 shows a procedure of the processing executed by the image display device 50. The same processing as that shown in FIG. 2 will not be described.

After Step S103, the information acceptance unit 57 accepts the reference data (Step S130). For example, the communication unit 72 receives the reference data from an external device. The information acceptance unit 57 accepts the reference data received by the communication unit 72.

After Step S130, the display control unit 56 displays an image of the reference data on the display unit 71 (Step S131).

Figure 31:
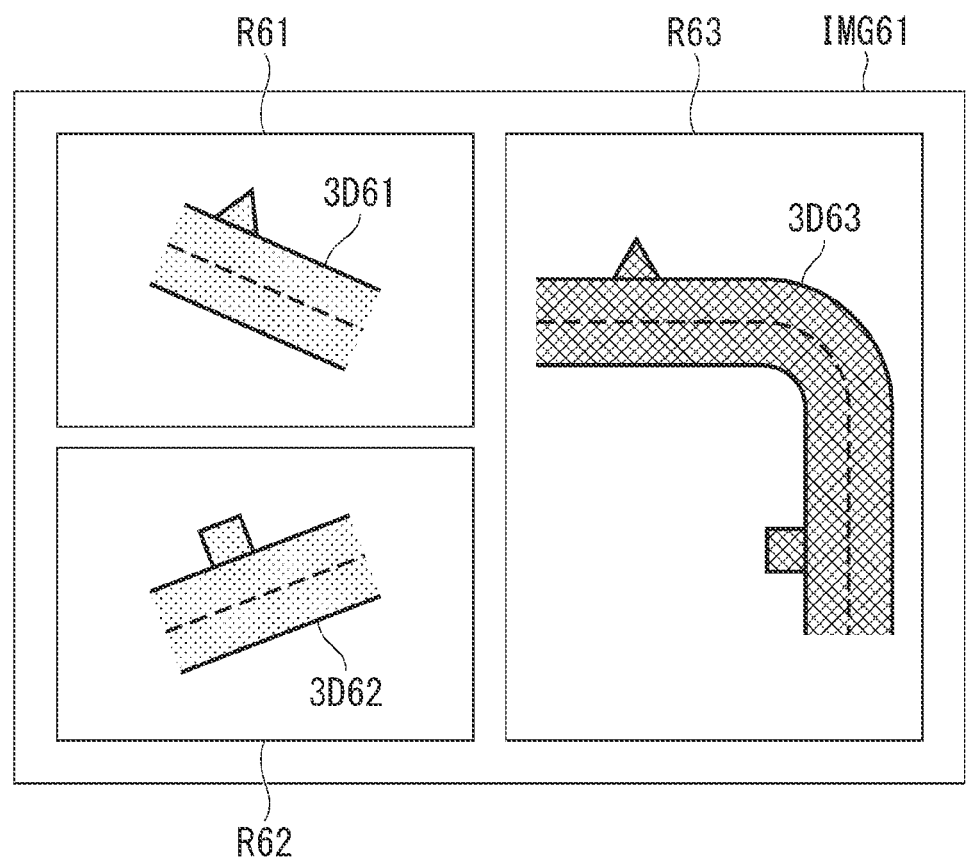
FIG. 31 is a diagram showing an example of an image displayed on a display unit according to the fourth embodiment of the present invention.

FIG. 31 shows an example of an image displayed on the display unit 71. The display control unit 56 displays an image IMG61 on the display unit 71. The image IMG61 includes a region R61, a region R62, and a region R63. An image of a first 3D shape 3D61 is displayed in the region R61. The first 3D shape 3D61 is indicated by the first 3D data. An image of a second 3D shape 3D62 is displayed in the region R62. The second 3D shape 3D62 is indicated by the second 3D data. An image of a third 3D shape 3D63 is displayed in the region R63. The third 3D shape 3D63 is indicated by the reference data.

When the information acceptance unit 57 accepts the reference data, three types of images shown in FIG. 31 are displayed. When the information acceptance unit 57 accepts the reference data, the image of the reference data does not need to be displayed on the display unit 71. Accordingly, Step S131 does not need to be executed.

After Step S131, the parameter generation unit 53 generates a conversion parameter by using the reference data (Step S132). After Step S132, Step S107 is executed.

The parameter generation unit 53 executes the following processing in Step S132. The parameter generation unit 53 executes shape matching by using the first 3D data and the reference data. In this way, the parameter generation unit 53 detects a 3D shape of the reference data corresponding to the 3D shape of the first 3D data. The parameter generation unit 53 executes shape matching by using the second 3D data and the reference data. In this way, the parameter generation unit 53 detects a 3D shape of the reference data corresponding to the 3D shape of the second 3D data.

A known method may be applied to 3D shape matching. The parameter generation unit 53 may execute matching processing by using color information in addition to shape information.

The parameter generation unit 53 generates a position-and-posture conversion parameter used for causing the position and the posture of the first 3D coordinate system to match the position and the posture of the common coordinate system, respectively.

The parameter generation unit 53 generates a scale conversion parameter used for causing the scale of the first 3D coordinate system to match the scale of the common coordinate system. The common coordinate system is a 3D coordinate system of the reference data.

The parameter generation unit 53 generates a position-and-posture conversion parameter used for causing the position and the posture of the second 3D coordinate system to match the position and the posture of the common coordinate system, respectively. The parameter generation unit 53 generates a scale conversion parameter used for causing the scale of the second 3D coordinate system to match the scale of the common coordinate system.

Figure 32:
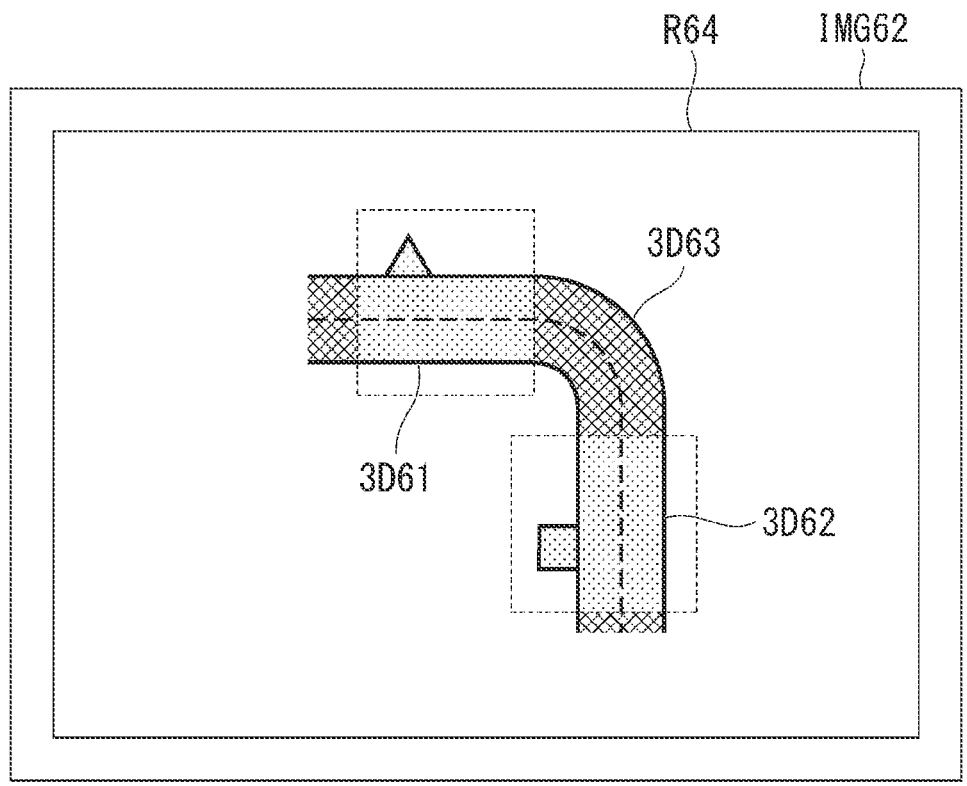
FIG. 32 is a diagram showing an example of an image displayed on the display unit according to the fourth embodiment of the present invention.

FIG. 32 shows an example of an image displayed on the display unit 71. The same parts as those shown in FIG. 31 will not be described. The display control unit 56 displays an image IMG62 on the display unit 71. The image IMG62 includes a region R64. An image of a first 3D shape 3D61, a second 3D shape 3D62, and a third 3D shape 3D63 is displayed in the region R64. A user can confirm that the first 3D data and the second 3D data are disposed at a correct position in the reference data. In this way, the user can confirm that the first 3D data and the second 3D data are accurately connected to each other.

Reference data used as structure information are not limited to design data. The reference data may be data other than the design data.

For example, 3D data generated by using two or more images of an inspection target generated in a previous inspection may be used as reference data. The 3D data are generated in the processing shown in FIG. 27. The 3D data are different from any of the first 3D data and the second 3D data. The 3D data used as the reference data may be generated by equipment other than endoscope equipment that generates 3D data of a subject inside an inspection target.

As long as the parameter generation unit 53 can cause the positions of the first 3D data and the second 3D data to match the position of reference data, the reference data are not necessarily 3D data. The reference data may be two-dimensional data (2D data). The parameter generation unit 53 converts the 3D data into 2D information in order to cause the position of the 3D data and the position of the 2D data to match each other. The 2D information indicates a two-dimensional shape in an arbitrary plane. The parameter generation unit 53 causes the position of the 2D information and the position of the 2D data to match each other.

Each aspect of the present invention may include the following modified example. The structure information is configured as design data including a design value of a geometric structure of a subject or is configured as 3D data different from any of the first 3D data and the second 3D data.

In the fourth embodiment, the image display device 50 can connect the first 3D data and the second 3D data together and can display an image of a 3D shape of a wide range on an image of the reference data.

First Modified Example of Fourth Embodiment

A first modified example of the fourth embodiment of the present invention will be described. In the fourth embodiment described above, the ID of each blade is not used for connecting the first 3D data and the second 3D data together. On the other hand, in the first modified example of the fourth embodiment, the first 3D data and the second 3D data are connected together such that the ID of each blade of the first 3D data and the second 3D data matches the ID of each blade of the reference data.

Figure 33:
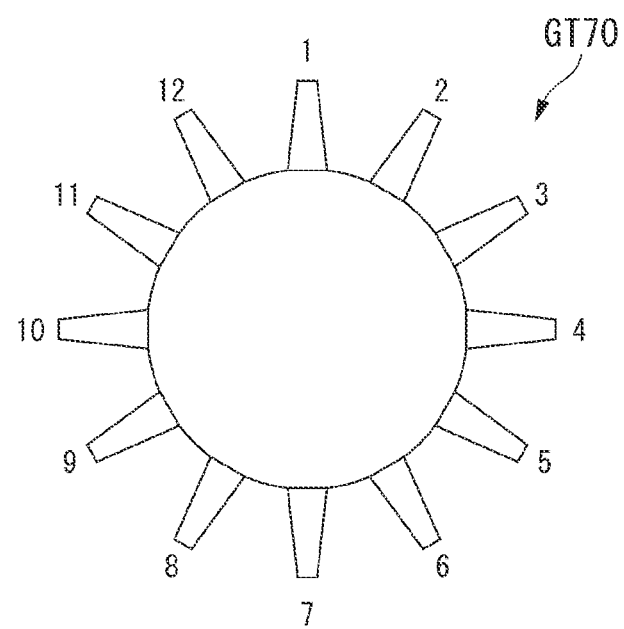
FIG. 33 is a diagram showing reference data in a first modified example of the fourth embodiment of the present invention.

In the first modified example of the fourth embodiment, the image display device 50 shown in FIG. 1 is used. The storage unit 73 stores reference data of a gas turbine. FIG. 33 shows reference data of a gas turbine GT70. In the example shown in FIG. 33, the gas turbine GT70 includes twelve blades. An ID is allocated to each of the blades. The reference data shown in FIG. 33 may be a cross-section of the gas turbine GT70 or may be 3D-CAD data.

Each ID corresponds to a position of a blade. For example, in a case in which sequential IDs are allocated to the blades, two sequential IDs are allocated to two blades adjacent to each other. Structure information in the first modified example of the fourth embodiment is the reference data and the ID allocated to each blade.

Figure 34:
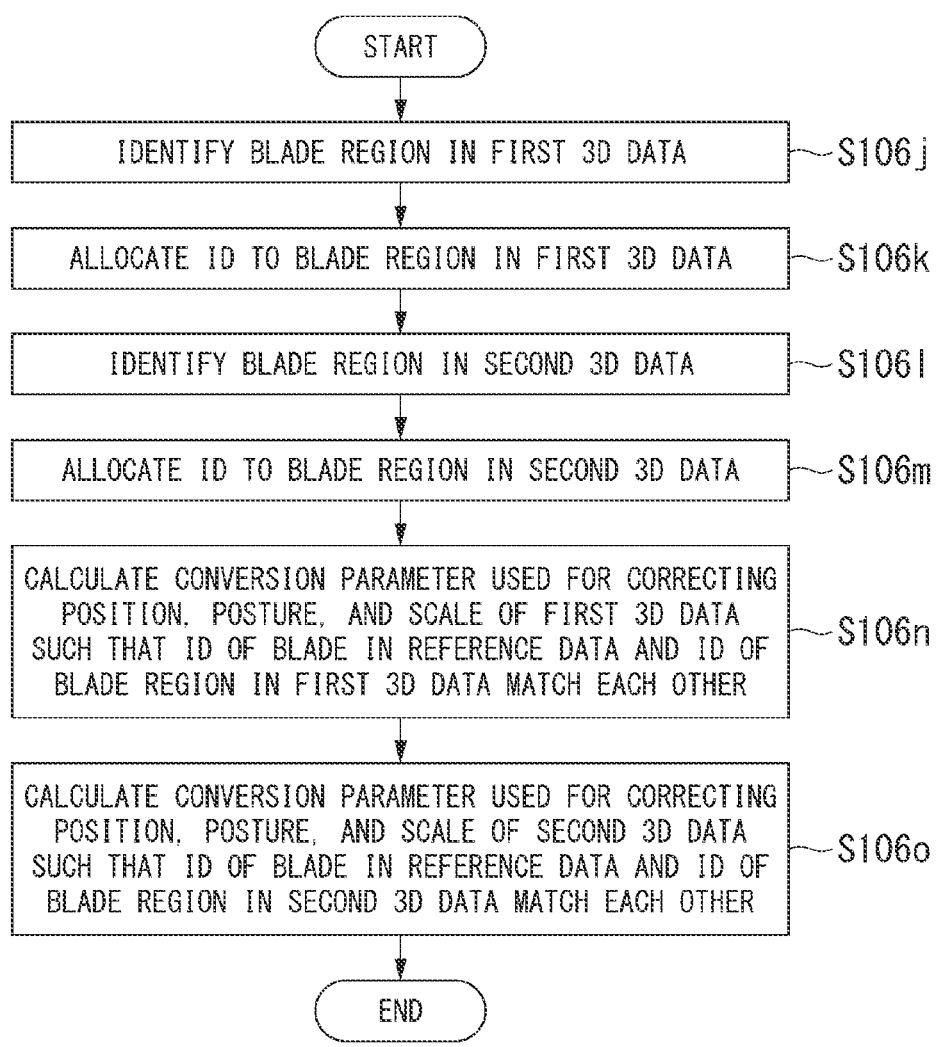
FIG. 34 is a flow chart showing a procedure of processing executed by an image display device according to the first modified example of the fourth embodiment of the present invention.

The parameter generation unit 53 executes processing shown in FIG. 34 in Step S106. FIG. 34 shows a procedure of the processing executed by the parameter generation unit 53.

The parameter generation unit 53 identifies blade regions in the first 3D data (Step S106*j*). Each of the blade regions includes one blade.

The parameter generation unit 53 may use any method in order to identify a blade region. For example, the parameter generation unit 53 extracts two or more similar shapes in the first 3D data as blade regions. Alternatively, the parameter generation unit 53 executes shape matching by using a shape of a blade registered in advance and the first 3D data and extracts a blade region including a shape that matches the shape of the blade.

After Step S106*j*, the parameter generation unit 53 allocates IDs to the blade regions identified in Step S106*j* (Step S106*k*).

The parameter generation unit 53 may use any method in order to allocate IDs to the blade regions. For example, an image of the first 3D data is displayed on the display unit 71. A user inputs an ID of each blade into the image display device 50 by operating the operation unit 70. The parameter generation unit 53 allocates the ID to the blade region. The parameter generation unit 53 may detect a reference blade having a distinctive structure from the first 3D data and may alternately allocate an ID to each blade starting from the reference blade.

When endoscope equipment generates an image used for generating 3D data, a turning tool may be used. The turning tool automatically rotates a disk. The turning tool outputs information of a rotation angle of the disk to the endoscope equipment. The endoscope equipment determines a position of a blade seen in an image on the basis of the information.

For example, before the turning tool rotates the disk, the endoscope equipment sets a blade seen in an image as a reference blade. The total number of blades are known, and the angle between two adjacent blades is known. While the disk rotates, the endoscope equipment determines a blade seen in an image on the basis of the rotation angle of the disk. When the disk rotates once, the endoscope equipment can determine that the reference blade is seen in an image again.

The endoscope equipment allocates an ID to each blade and embeds the ID in an image. The endoscope equipment may allocate an ID to each blade without using the turning tool and may embed the ID in an image.

3D coordinates of each point included in 3D data are associated with an image used for generating the 3D data. The parameter generation unit 53 acquires IDs of images associated with the blade regions identified in Step S106*j* and allocates the IDs to the blade regions.

After Step S106*k*, the parameter generation unit 53 identifies blade regions in the second 3D data (Step S106*l*). Step S106*l* is similar to Step S106*j*.

After Step S106*l*, the parameter generation unit 53 allocates IDs to the blade regions identified in Step S106*l* (Step S106*m*). Step S106*m* is similar to Step S106*k*.

After Step S106*m*, the parameter generation unit 53 calculates a conversion parameter used for correcting the position, the posture, and the scale of the first 3D data such that the ID of a blade in the reference data and the ID of a blade region in the first 3D data match each other (Step S106*n*).

After Step S106*n*, the parameter generation unit 53 calculates a conversion parameter used for correcting the position, the posture, and the scale of the second 3D data such that the ID of a blade in the reference data and the ID of a blade region in the second 3D data match each other (Step S106*o*). When Step S106*o* is executed, the processing shown in FIG. 34 is completed.

Figure 35:
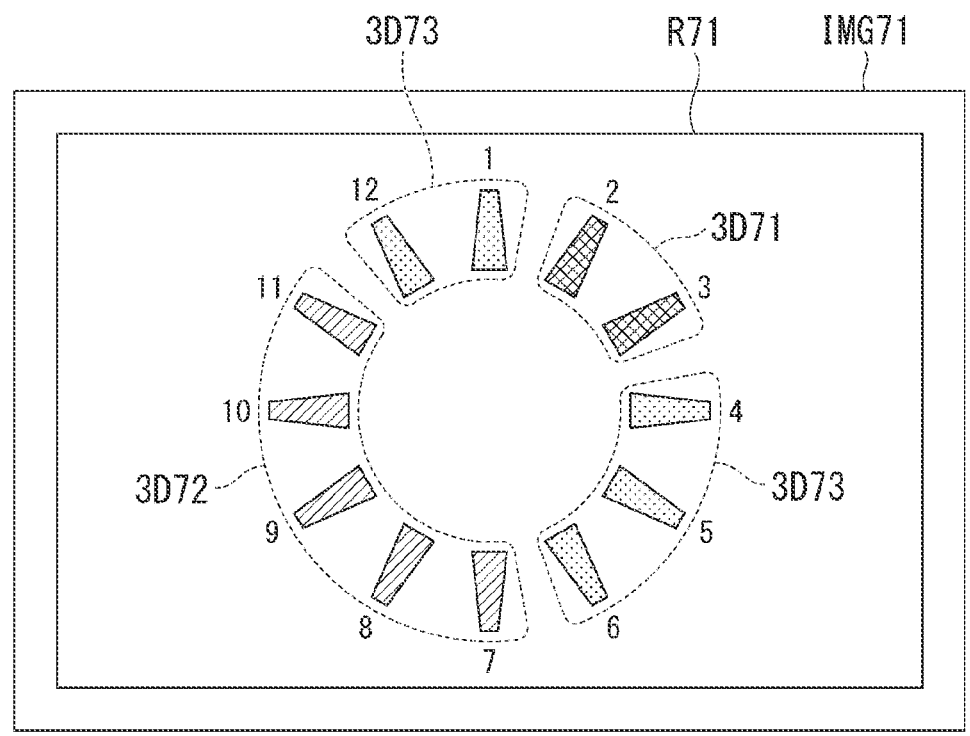
FIG. 35 is a diagram showing an example of an image displayed on a display unit according to the first modified example of the fourth embodiment of the present invention.

FIG. 35 shows an example of an image displayed on the display unit 71. The display control unit 56 displays an image IMG71 on the display unit 71. The image IMG71 includes a region R71. An image of a first 3D shape 3D71, a second 3D shape 3D72, and a third 3D shape 3D73 is displayed in the region R71. The first 3D shape 3D71 is indicated by the first 3D data. The second 3D shape 3D72 is indicated by the second 3D data. The third 3D shape 3D73 is indicated by the reference data.

The first 3D shape 3D71 includes two blades. The IDs of the two blades are 2 and 3. The position of the first 3D data is set to that overlapping two blades of the reference data to which 2 and 3 are allocated as IDs.

The second 3D shape 3D72 includes five blades. The IDs of the five blades are 7 to 11. The position of the second 3D data is set to that overlapping five blades of the reference data to which 7 to 11 are allocated as IDs.

There is no blade to which 1, 4, 5, 6, or 12 is allocated as an ID in the first 3D data or the second 3D data. The blades of the reference data to which these IDs are allocated are displayed.

The display control unit 56 may display each blade on the display unit 71 so that a user can distinguish a blade included in the first 3D data or the second 3D data and a blade included in the reference data from each other. For example, the color of a blade included in the first 3D data or the second 3D data may be different from that of a blade included in the reference data. The user can check a blade included in the 3D data and a blade not included in the 3D data.

The parameter generation unit 53 may execute the processing shown in FIG. 19 in addition to the processing shown in FIG. 34. In this way, the parameter generation unit 53 can more accurately connect the first 3D data and the second 3D data together.

Each aspect of the present invention may include the following modified example. A subject includes two or more objects. The structure information indicates positions at which the two or more objects are disposed.

In the first modified example of the fourth embodiment, the parameter generation unit 53 generates a conversion parameter by using an ID as structure information. Therefore, the image display device 50 can accurately connect the first 3D data and the second 3D data together.

Second Modified Example of Fourth Embodiment

A second modified example of the fourth embodiment of the present invention will be described. In the second modified example of the fourth embodiment, the image display device 50 shown in FIG. 1 is used.

A subject in the first modified example of the fourth embodiment described above is a blade of a gas turbine. On the other hand, a subject in the second modified example of the fourth embodiment is a combustion chamber of a gas turbine. The combustion chamber includes fuel injection nozzles and plates as typical inspection portions. The plates are disposed around the fuel injection nozzles.

The fuel injection nozzles are circularly disposed like blades in many cases. An ID is allocated to each fuel injection nozzle in many cases. Each ID has a value in accordance with a position at which each fuel injection nozzle is disposed. Each fuel injection nozzle is disposed on an arbitrary periphery of a circle, and a center position of the circle is defined.

Figure 36:
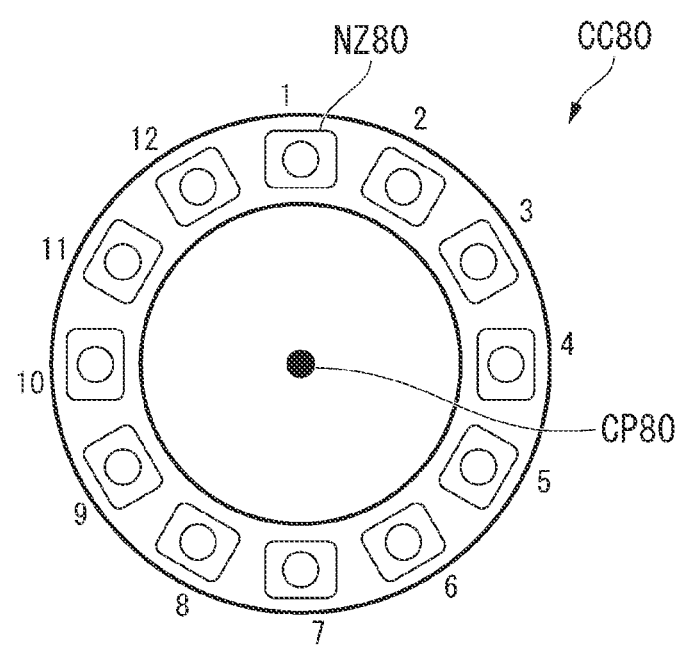
FIG. 36 is a diagram showing a structure of a combustion chamber in a second modified example of the fourth embodiment of the present invention.

FIG. 36 shows a structure of a combustion chamber CC80. The combustion chamber CC80 includes twelve fuel injection nozzles NZ80. The actual number of fuel injection nozzles is different in accordance with the engine type. The twelve fuel injection nozzles NZ80 are disposed on the front side of the combustion chamber CC80. A center position CP80 indicates the center of the circle on which the twelve fuel injection nozzles NZ80 are disposed. In the second modified example of the fourth embodiment, the first 3D data and the second 3D data are connected together by using IDs allocated to the fuel injection nozzles.

The information INF10 of the dialog box DL10 shown in FIG. 4 includes information of a gas turbine, which is an inspection target, and information of a combustion chamber in the gas turbine. For example, a user selects a "gas turbine" and then selects a "combustion chamber." When the user inputs information indicating that the selection is finalized into the image display device 50, the information acceptance unit 57 accepts the information selected by the user. At this time, the information acceptance unit 57 accepts a character string "combustion chamber."

For example, the structure information of the combustion chamber indicates that fuel injection nozzles in the first 3D data and the second 3D data are disposed at regular intervals on a periphery of a circle having an arbitrary curvature radius. The structure information indicates that the sizes of the fuel injection nozzles are the same. The parameter generation unit 53 generates a conversion parameter on the basis of the structure information in Step S106.

The total number of fuel injection nozzles, the size of each fuel injection nozzle, and the ID of each fuel injection nozzle are known in a case in which the engine type has already been identified. The structure information may include the total number of fuel injection nozzles, the size of each fuel injection nozzle, and the ID of each fuel injection nozzle. In this case, the parameter generation unit 53 can generate a position-and-posture conversion parameter used for accurately connecting the first 3D data and the second 3D data together.

The parameter generation unit 53 executes the processing shown in FIG. 34 in Step S106. The processing shown in FIG. 34 is also applied to a case in which a subject is a combustion chamber.

Figure 37:
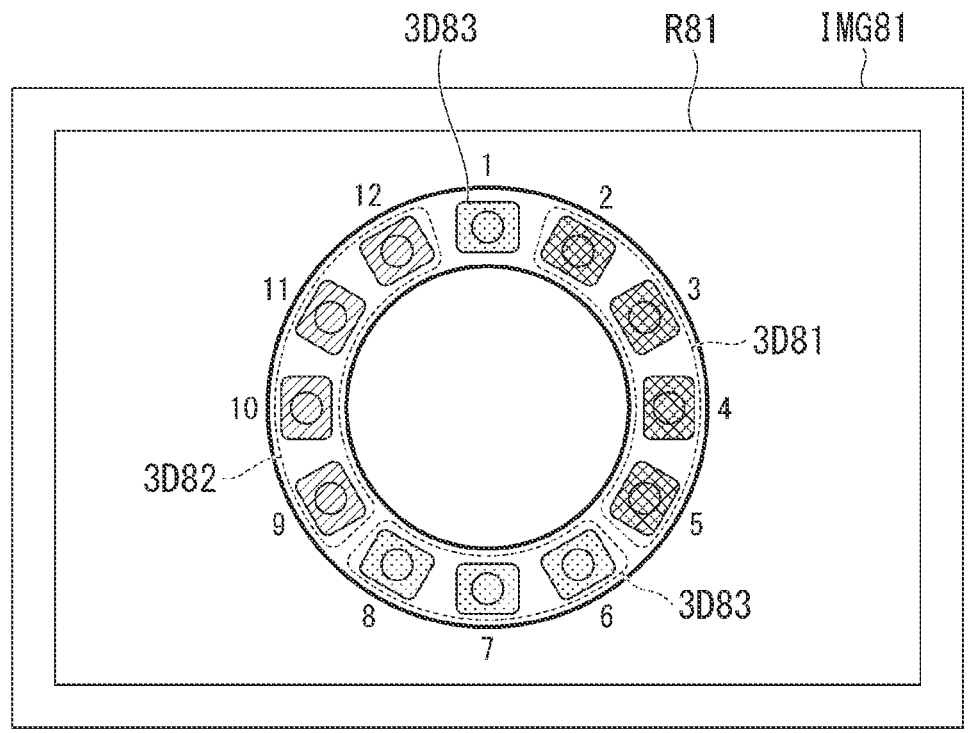
FIG. 37 is a diagram showing an example of an image displayed on a display unit according to the second modified example of the fourth embodiment of the present invention.

FIG. 37 shows an example of an image displayed on the display unit 71. The display control unit 56 displays an image IMG81 on the display unit 71. The image IMG81 includes a region R81. An image of a first 3D shape 3D81, a second 3D shape 3D82, and a third 3D shape 3D83 is displayed in the region R81. The first 3D shape 3D81 is indicated by the first 3D data. The second 3D shape 3D82 is indicated by the second 3D data. The third 3D shape 3D83 is indicated by the reference data.

The first 3D shape 3D81 includes four fuel injection nozzles. The IDs of the four fuel injection nozzles are 2 to 5. The position of the first 3D data is set to that overlapping four fuel injection nozzles of the reference data to which 2 to 5 are allocated as IDs.

The second 3D shape 3D82 includes four fuel injection nozzles. The IDs of the four fuel injection nozzles are 9 to 12. The position of the second 3D data is set to that overlapping four fuel injection nozzles of the reference data to which 9 to 12 are allocated as IDs.

There is no fuel injection nozzle to which 1, 6, 7, or 8 is allocated as an ID in the first 3D data or the second 3D data. Fuel injection nozzles of the reference data to which these IDs are allocated are displayed.

The display control unit 56 may display each fuel injection nozzle on the display unit 71 so that a user can distinguish a fuel injection nozzle included in the first 3D data or the second 3D data and a fuel injection nozzle included in the reference data from each other. For example, the color of a fuel injection nozzle included in the first 3D data or the second 3D data may be different from that of a fuel injection nozzle included in the reference data. A user can check a fuel injection nozzle included in the 3D data and a fuel injection nozzle not included in the 3D data.

In the second modified example of the fourth embodiment, the parameter generation unit 53 generates a conversion parameter by using an ID as structure information. Therefore, the image display device 50 can accurately connect the first 3D data and the second 3D data together.

The first and second modified examples of the fourth embodiment are applied to an inspection of a gas turbine of an aircraft engine. These modified examples may be applied to an inspection of a tube-like structure. For example, these modified examples may be applied to an inspection of a heat exchange tube. The heat exchange tube includes tens of thin tubes. An ID may be allocated to each tube. The parameter generation unit 53 can connect the first 3D data and the second 3D data together by using the ID.

Fifth Embodiment

A fifth embodiment of the present invention will be described. In the fifth embodiment, the structure information is configured as camera trace data. The camera trace data indicate two or more positions at which a camera that generates two or more images used for generating 3D data is disposed. Each of the positions corresponds to the camera coordinate described above. In other words, the camera trace data indicate traces of the camera. The camera trace data are associated with the first 3D data and the second 3D data. In a case in which the endoscope device 1 shown in FIG. 22 is used, the camera trace data indicate two or more positions at which the distal end 20 of the insertion unit 2 is disposed. The first 3D data and the second 3D data are connected together by using the camera trace data.

Figure 38:
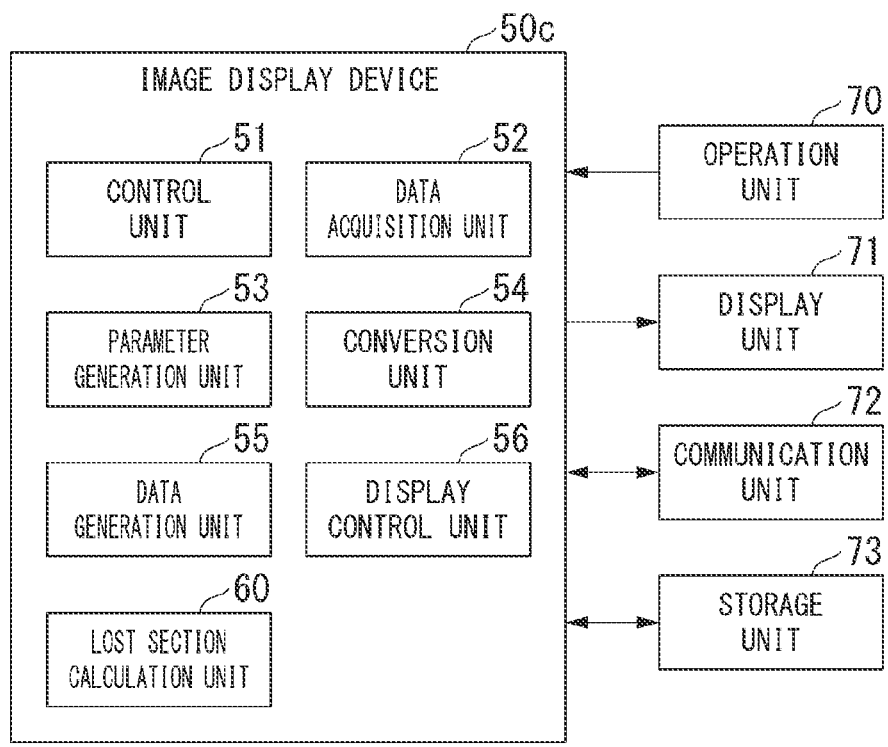
FIG. 38 is a block diagram showing a configuration of an image display device according to a fifth embodiment of the present invention.

The image display device 50 shown in FIG. 1 is changed to an image display device 50c shown in FIG. 38. FIG. 38 shows a configuration of the image display device 50c. The same configuration as that shown in FIG. 1 will not be described.

The image display device 50c shown in FIG. 38 includes a control unit 51, a data acquisition unit 52, a parameter generation unit 53, a conversion unit 54, a data generation unit 55, a display control unit 56, and a lost section calculation unit 60. The image display device 50c does not include the information acceptance unit 57 and the structure estimation unit 58 shown in FIG. 1.

Each unit of the image display device 50c may be constituted by at least one of a processor and a logic circuit. Each unit of the image display device 50c may include one or a plurality of processors. Each unit of the image display device 50c may include one or a plurality of logic circuits.

The storage unit 73 stores first camera trace data and second camera trace data. The first camera trace data are associated with the first 3D data, and the second camera trace data are associated with the second 3D data. The data acquisition unit 52 connects to the storage unit 73 and acquires the first camera trace data and the second camera trace data from the storage unit 73.

The lost section calculation unit 60 calculates a position of a lost section by using the first camera trace data and the second camera trace data. The lost section includes 3D data corresponding to a lost region of a subject. The lost region is not included in a first region or a second region of the subject. The first region corresponds to the 3D coordinates included in the first 3D data. The second region corresponds to the 3D coordinates included in the second 3D data. The lost section calculation unit 60 can calculate the length of the lost section on the basis of the position of the lost section.

Figure 39:
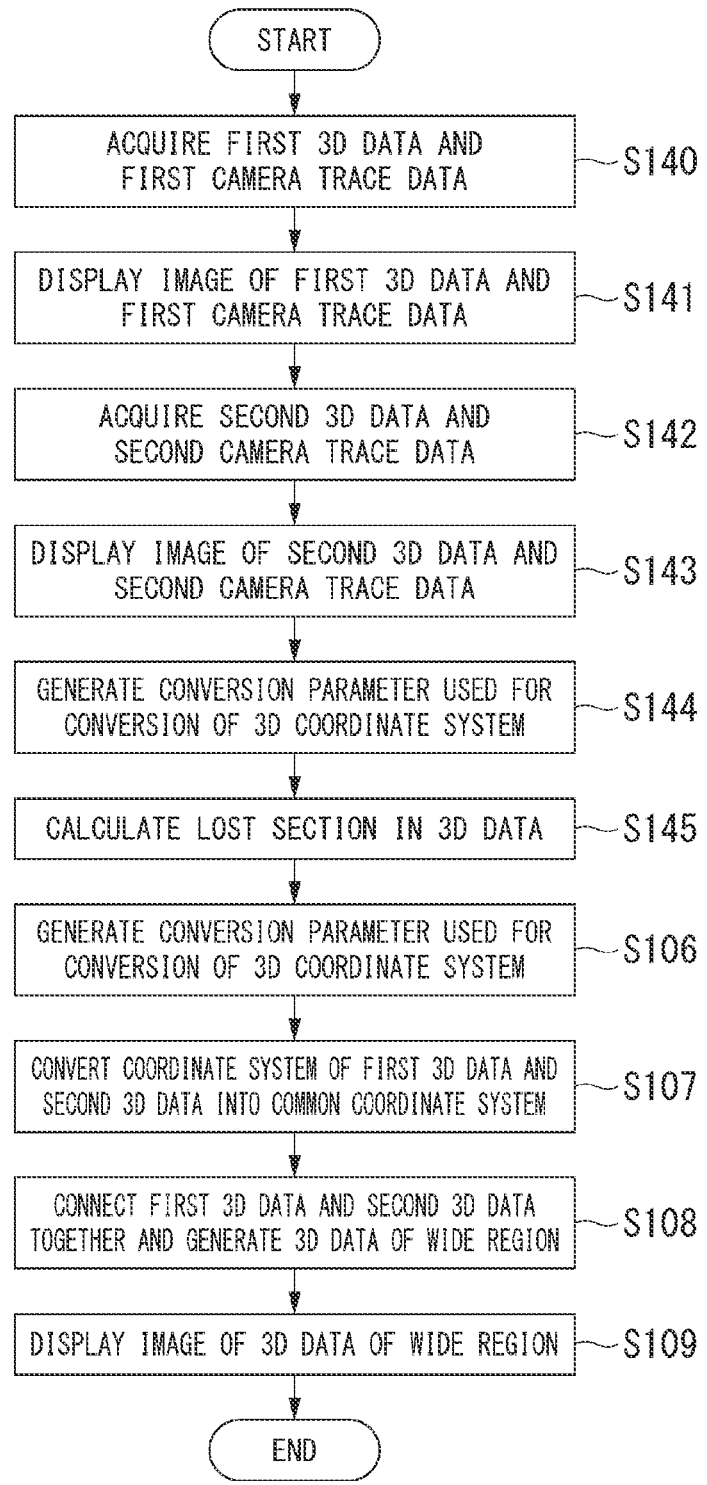
FIG. 39 is a flow chart showing a procedure of processing executed by the image display device according to the fifth embodiment of the present invention.

Processing executed by the image display device 50c will be described by using FIG. 39. FIG. 39 shows a procedure of the processing executed by the image display device 50c. The same processing as that shown in FIG. 2 will not be described.

The data acquisition unit 52 connects to the storage unit 73 and acquires the first 3D data and the first camera trace data from the storage unit 73 (Step S140). After Step S140, the display control unit 56 displays an image of the first 3D data and the first camera trace data on the display unit 71 (Step S141).

After Step S141, the data acquisition unit 52 connects to the storage unit 73 and acquires the second 3D data and the second camera trace data from the storage unit 73 (Step S142). After Step S142, the display control unit 56 displays an image of the second 3D data and the second camera trace data on the display unit 71 (Step S143).

The order of Steps S140 to S143 is not limited to that shown in FIG. 39. For example, Step S140 and Step S141 may be executed after Step S142 and Step S143 are executed. Alternatively, Step S141 and Step S143 may be executed after Step S140 and Step S142 are executed. Step S141 and Step S143 may be omitted.

After Step S143, the parameter generation unit 53 generates a conversion parameter on the basis of the relationship between the first camera trace data and the second camera trace data (Step S144). The parameter generation unit 53 generates a position-and-posture conversion parameter used for connecting the first 3D data and the second 3D data together by using the following method. The following method can be applied to an inspection of a pipe and an inspection of a blade (rotor blade).

In a case in which a subject is a pipe, the parameter generation unit 53 executes the following processing. The parameter generation unit 53 calculates a first straight line that approximates the traces of the camera indicated by the first camera trace data. In addition, the parameter generation unit 53 calculates a second straight line that approximates the traces of the camera indicated by the second camera trace data. The parameter generation unit 53 generates a position-and-posture conversion parameter used for correcting the positions and the postures of the first 3D data and the second 3D data such that the first straight line and the second straight line match each other.

The parameter generation unit 53 may calculate a first straight line by using the first camera trace data associated with the entire first 3D data. The parameter generation unit 53 may calculate a first straight line by using the first camera trace data associated with a connection region identified on the basis of the timestamps of the first 3D data.

The parameter generation unit 53 may calculate a second straight line by using the second camera trace data associated with the entire second 3D data. The parameter generation unit 53 may calculate a second straight line by using the second camera trace data associated with a connection region identified on the basis of the timestamps of the second 3D data.

Figure 40:
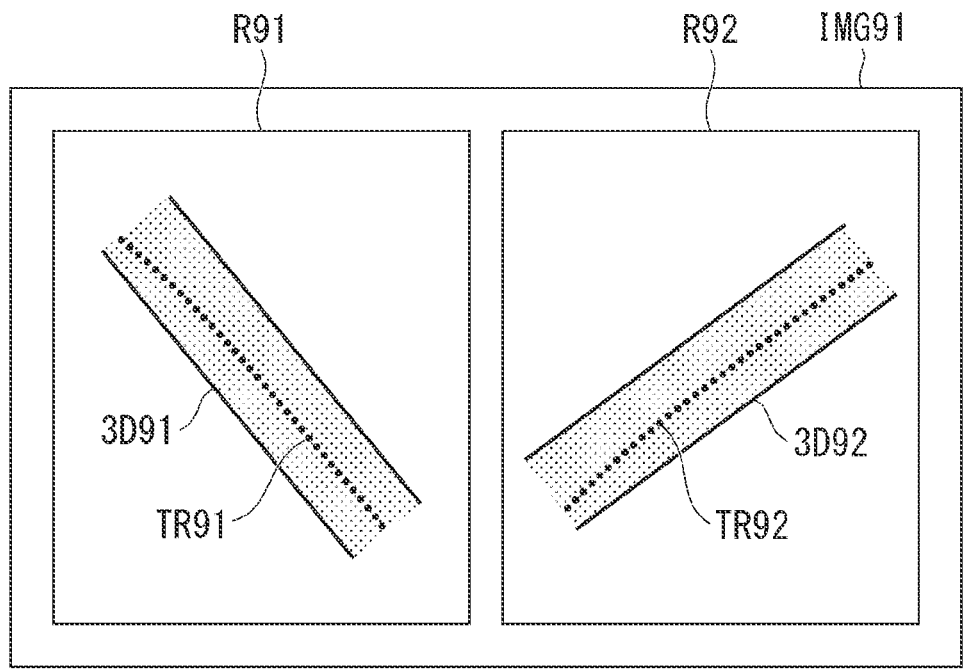
FIG. 40 is a diagram showing an example of an image displayed on a display unit according to the fifth embodiment of the present invention.

FIG. 40 shows an example of an image displayed on the display unit 71 before the first 3D data and the second 3D data are connected together. The display control unit 56 displays an image IMG91 on the display unit 71. The image IMG91 includes a region R91 and a region R92. An image of a first 3D shape 3D91 is displayed in the region R91. The first 3D shape 3D91 is indicated by the first 3D data. An image of a second 3D shape 3D92 is displayed in the region R92. The second 3D shape 3D92 is indicated by the second 3D data.

First camera traces TR91 and second camera traces TR92 are shown in FIG. 40. The first camera traces TR91 indicate two or more positions included in the first camera trace data. The second camera traces TR92 indicate two or more positions included in the second camera trace data. The display control unit 56 does not need to display the first camera traces TR91 and the second camera traces TR92 on the display unit 71.

Figure 41:
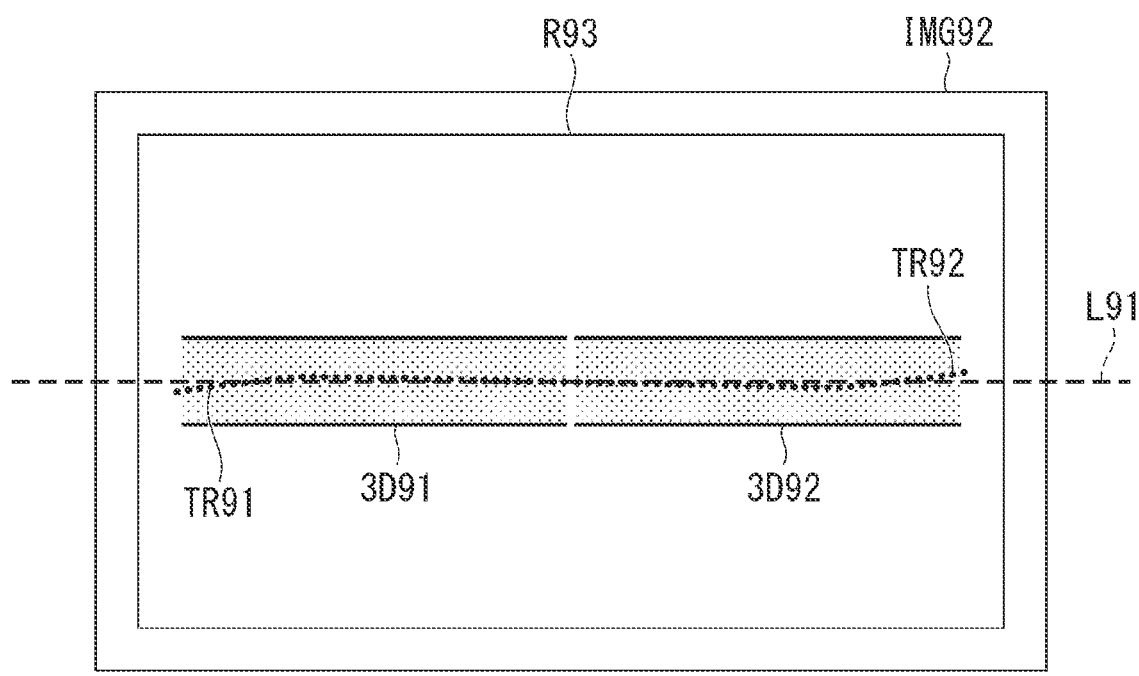
FIG. 41 is a diagram showing an example of an image displayed on the display unit according to the fifth embodiment of the present invention.

FIG. 41 shows an example of an image displayed on the display unit 71 after the first 3D data and the second 3D data are connected together. In FIG. 41, Step S145 described later is not considered. The same parts as those shown in FIG. 40 will not be described. The display control unit 56 displays an image IMG92 on the display unit 71. The image IMG92 includes a region R93. An image of a first 3D shape 3D91 and a second 3D shape 3D92 is displayed in the region R93.

The first 3D shape 3D91 and the second 3D shape 3D92 are disposed such that a first straight line approximating first camera traces TR91 and a second straight line approximating second camera traces TR92 match each other. A line L91 is constituted by the first straight line and the second straight line.

In a case in which a subject is a blade (rotor blade), the parameter generation unit 53 executes the following processing. The parameter generation unit 53 calculates a first curved line that approximates the traces of the camera indicated by the first camera trace data. In addition, the parameter generation unit 53 calculates a second curved line that approximates the traces of the camera indicated by the second camera trace data. Each of the first curved line and the second curved line has a circular arc shape. The parameter generation unit 53 generates a position-and-posture conversion parameter used for correcting the positions and the postures of the first 3D data and the second 3D data such that the first curved line and the second curved line are connected together on a periphery of a circle having an arbitrary diameter.

Figure 42:
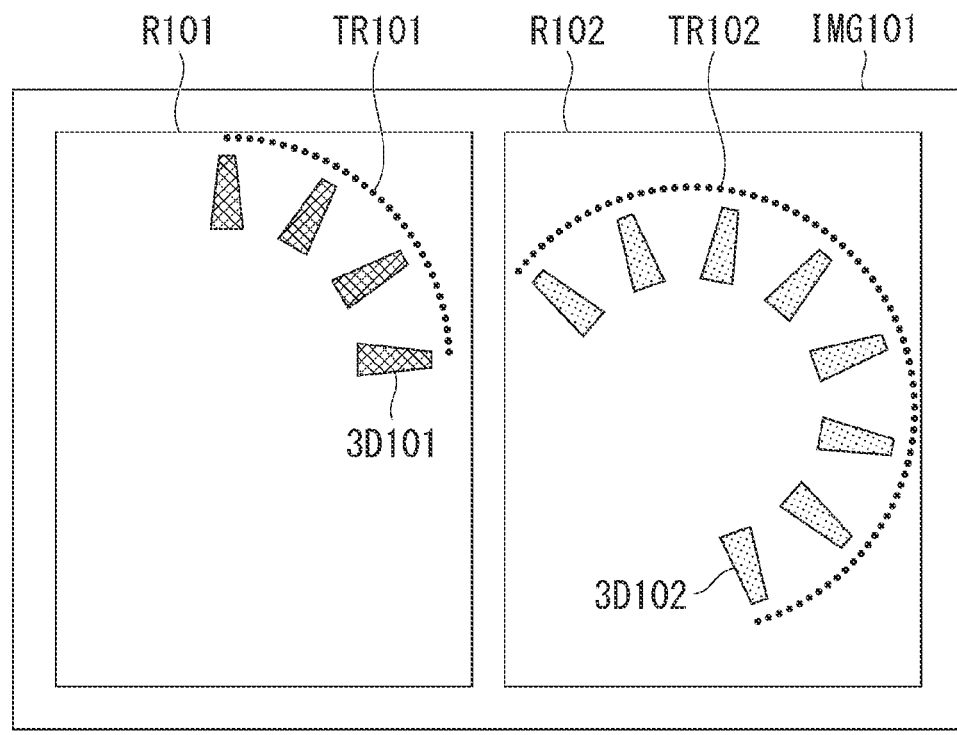
FIG. 42 is a diagram showing an example of an image displayed on the display unit according to the fifth embodiment of the present invention.

FIG. 42 shows an example of an image displayed on the display unit 71 before the first 3D data and the second 3D data are connected together. The display control unit 56 displays an image IMG101 on the display unit 71. The image IMG101 includes a region R101 and a region R102. An image of a first 3D shape 3D101 is displayed in the region R101. The first 3D shape 3D101 is indicated by the first 3D data. An image of a second 3D shape 3D102 is displayed in the region R102. The second 3D shape 3D102 is indicated by the second 3D data.

First camera traces TR101 and second camera traces TR102 are shown in FIG. 42. The first camera traces TR101 indicate two or more positions included in the first camera trace data. The second camera traces TR102 indicate two or more positions included in the second camera trace data. The display control unit 56 does not need to display the first camera traces TR101 and the second camera traces TR102 on the display unit 71.

Figure 43:
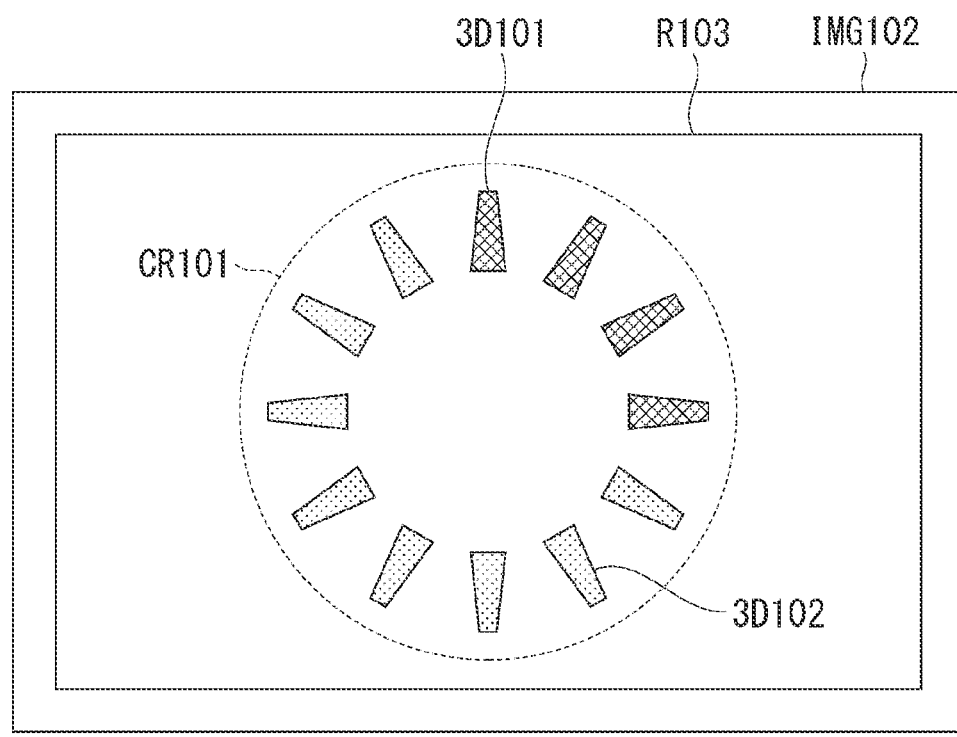
FIG. 43 is a diagram showing an example of an image displayed on the display unit according to the fifth embodiment of the present invention.

FIG. 43 shows an example of an image displayed on the display unit 71 after the first 3D data and the second 3D data are connected together. In FM. 43, Step S145 described later is not considered. The same parts as those shown in FIG. 42 will not be described. The display control unit 56 displays an image IMG102 on the display unit 71. The image IMG102 includes a region R103. An image of a first 3D shape 3D101 and a second 3D shape 3D102 is displayed in the region R103.

The first 3D shape 3D101 and the second 3D shape 3D102 are disposed such that a first curved line approximating first camera traces TR101 and a second curved line approximating second camera traces TR102 are disposed on the same periphery of a circle. A circle CR101 is constituted by the first curved line and the second curved line.

The parameter generation unit 53 can generate a position-and-posture conversion parameter in accordance with a subject by using the above-described method. In a case in which the subject is a pipe, the scales of the first 3D data and the second 3D data are not corrected. In a case in which the subject is a blade (rotor blade), the scales of the first 3D data and the second 3D data may be corrected.

After Step S144, the lost section calculation unit 60 calculates a lost section in a connection region by using the first camera trace data and the second camera trace data (Step S145). The lost section calculation unit 60 calculates a position of the lost section by using the following method. The following method can be applied to an inspection of a pipe and an inspection of a blade (rotor blade).

Figure 44:
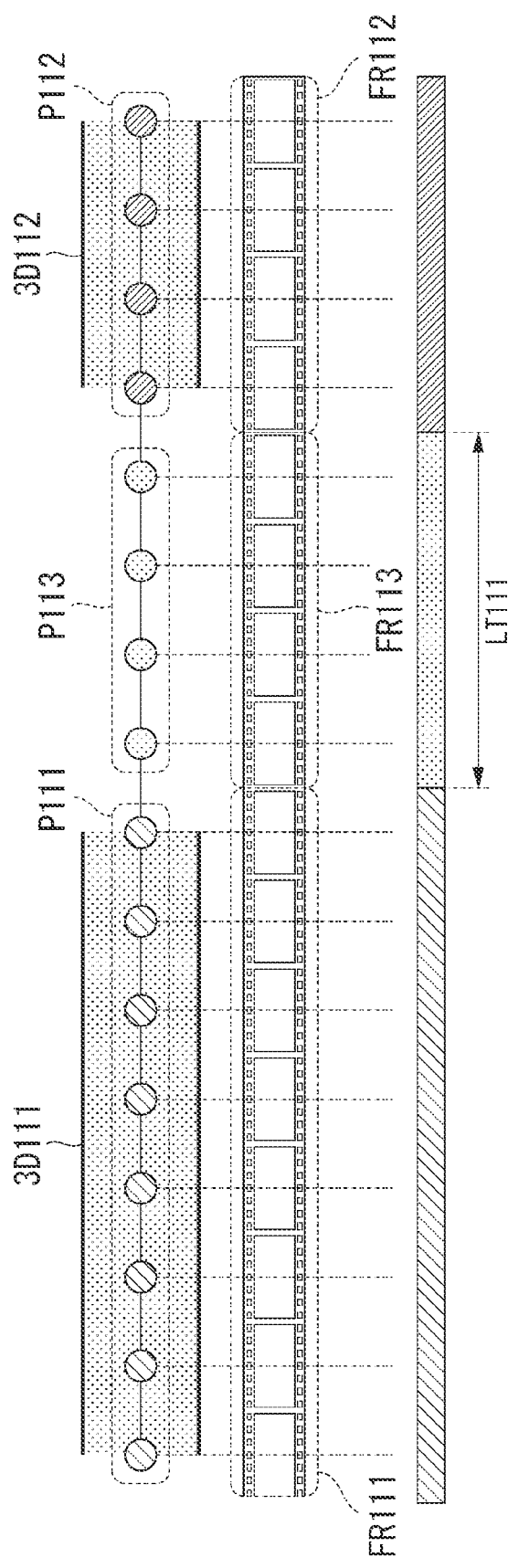
FIG. 44 is a diagram showing a method of calculating a lost section in the fifth embodiment of the present invention.

In a case in which a subject is a pipe, the lost section calculation unit 60 executes the following processing. FIG. 44 shows a method of calculating a lost section.

Each of two or more points P111, two or more points P112, and two or more points P113 indicates a position (3D coordinates) of the camera when the camera generates an image. The two or more points P111 constitute first camera trace data and are associated with first 3D data 3D111. The two or more points P112 constitute second camera trace data and are associated with second 3D data 3D112. The two or more points P113 indicate positions of the camera in a region for which there are no 3D data.

Since there are no 3D data corresponding to the two or more points P113, there are no camera trace data corresponding to the two or more points P113. The two or more points P113 constitute a lost section.

The first 3D data 3D111 are generated by using two or more images FR111. The second 3D data 3D112 are generated by using two or more images FR112. Two or more images FR113 are not used for generating the first 3D data 3D111 or the second 3D data 3D112. The two or more images FR111, the two or more images FR112, and the two or more images FR113 are included in one video file. Each of the two or more images FR111, the two or more images FR112, and the two or more images FR113 has a frame number.

Each of the two or more points P111 is associated with the image FR111. Each of the two or more points P112 is associated with the image FR112. None of the two or more points P113 is associated with the image FR113.

All the two or more images FR111 are not necessarily used for generating the first 3D data 3D111. Two or more key frames included in the two or more images FR111 are used for generating the first 3D data 3D111. The number of the key frames is less than or equal to the total number of the two or more images FR111. Similarly, two or more key frames included in the two or more images FR112 are used for generating the second 3D data 3D112.

The number of the points P111 and the number of the images FR111 (key frames) have correlation with each other. The number of the points P112 and the number of the images FR112 (key frames) have correlation with each other. The lost section calculation unit 60 calculates the number of the points P111 and the points P112 per one image. The lost section calculation unit 60 calculates the number of the points P113 by using both the number of the points P111 and the points P112 per one image and the number of the images FR113.

The lost section calculation unit 60 calculates an interval (three-dimensional distance) between the points P111 or the points P112. The lost section calculation unit 60 calculates a length LT111 of the lost section by using both the interval and the number of the points P113. The above-described method is not used in a case in which video data used for generating the first 3D data are different from that used for generating the second 3D data.

Figure 45:
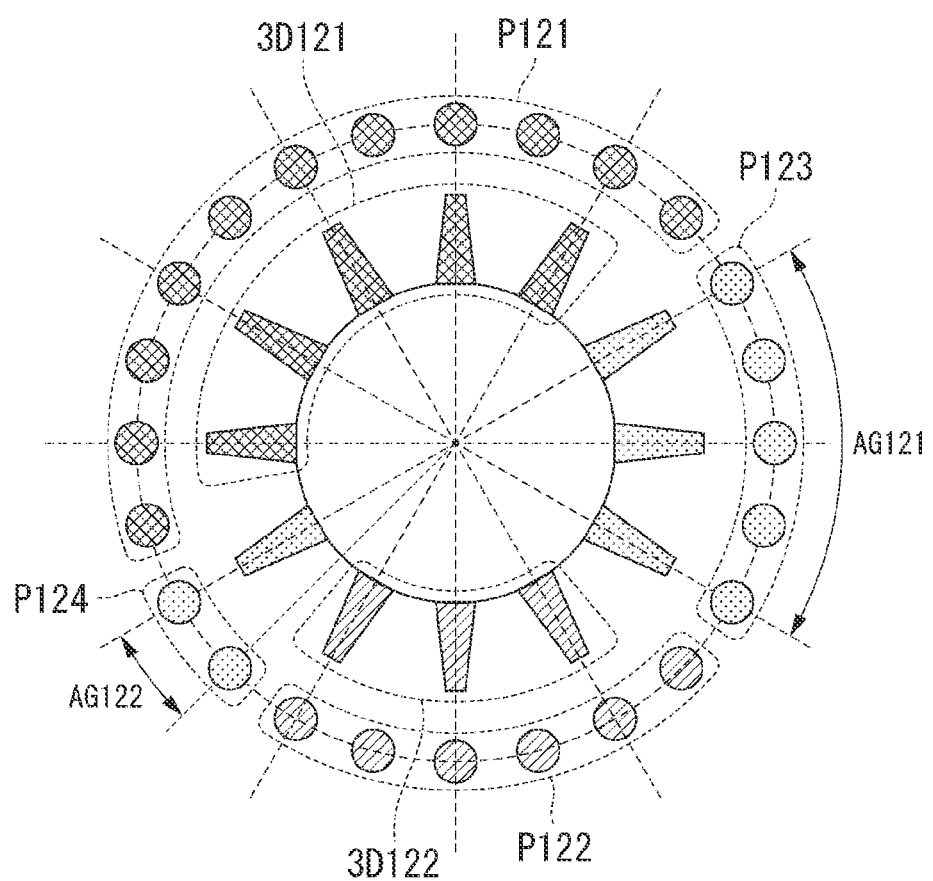
FIG. 45 is a diagram showing a relationship between camera trace data and 3D data in the fifth embodiment of the present invention.
Figure 46:
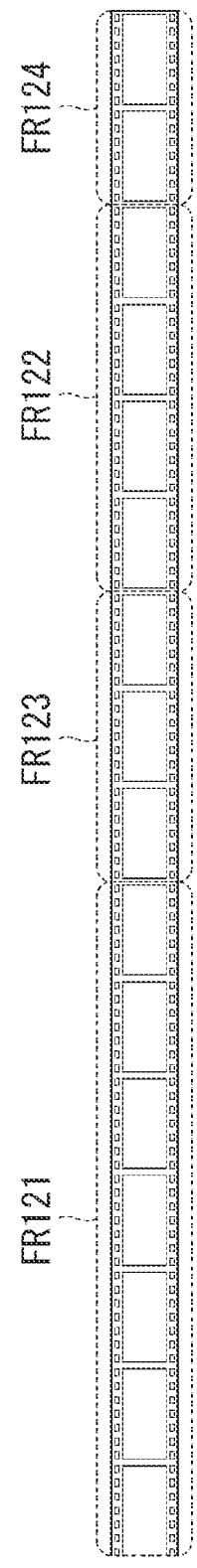
FIG. 46 is a diagram showing a video file in the fifth embodiment of the present invention.

In a case in which a subject is a blade (rotor blade), the last section calculation unit 60 executes the following processing. FIG. 45 and FIG. 46 show a method of calculating a lost section.

FIG. 45 shows a relationship between camera trace data and 3D data. Each of two or more points P121, two or more points P122, two or more points P123, and two or more points P124 indicates a position (3D coordinates) of the camera when the camera generates an image. The two or more points P121 constitute first camera trace data and are associated with first 3D data 3D121. The two or more points P122 constitute second camera trace data and are associated with second 3D data 3D122. The two or more points P123 and the two or more points P124 indicate positions of the camera in a region for which there are no 3D data.

Since there are no 3D data corresponding to the two or more points P123, there are no camera trace data corresponding to the two or more points P123. Since there are no 3D data corresponding to the two or more points P124, there are no camera trace data corresponding to the two or more points P124. The two or more points P123 constitute a first lost section. The two or more points P124 constitute a second lost section.

FIG. 46 shows a video file. First 3D data 3D121 are generated by using two or more images FR121. Second 3D data 3D122 are generated by using two or more images FR122. Two or more images FR123 and two or more images FR124 are not used for generating the first 3D data 3D121 or the second3D data 3D122. The two or more images FR121, the two or more images FR122, the two or more images FR123, and the two or more images FR124 are included in one video file. Each of the two or more images FR121, the two or more images FR122, the two or more images FR123, and the two or more images FR124 has a frame number.

Each of the two or more points P121 is associated with the image FR121. Each of the two or more points P122 is associated with the image FR122. None of the two or more points P123 is associated with the image FR123. None of the two or more points P124 is associated with the image FR124.

All the two or more images FR121 are not necessarily used for generating the first 3D data 3D121. Two or more key frames included in the two or more images FR121 are used for generating the first 3D data 3D121. The number of the key frames is less than or equal to the total number of the two or more images FR121. Similarly, two or more key frames included in the two or more images FR122 are used for generating the second 3D data 3D122.

The number of the points P121 and the number of the images FR121 (key frames) have correlation with each other. The number of the points P122 and the number of the images FR122 (key frames) have correlation with each other. The lost section calculation unit 60 calculates the number of the points P121 and the points P122 per one image. The lost section calculation unit 60 calculates the number of the points P123 by using both the number of the points P121 and the points P122 per one image and the number of the images FR123.

The lost section calculation unit 60 calculates an interval (angle) between the points P121 or the points P122. The lost section calculation unit 60 calculates an angle AG121 of the first lost section by using both the interval and the number of the points P123. The lost section calculation unit 60 may calculate an interval (angle) between blades by using both the interval between the points P121 and the number of blades in the first 3D data 3D121. The lost section calculation unit 60 may calculate the number of blades in the first lost section by using both the interval and the angle AG121 of the first lost section.

The lost section calculation unit 60 subtracts a first angle, a second angle, and the angle AG121 from the angle (360 degrees) around a blade, thus calculating an angle AG122 of the second lost section. The first angle corresponds to a range in which blades of the first 3D data 3D121 are disposed. The second angle corresponds to a range in which blades of the second 3D data 3D122 are disposed. The lost section calculation unit 60 may subtract the number of blades of the first 3D data 3D121, the number of blades of the second 3D data 3D122, and the number of blades in the first lost section from the total number of blades, thus calculating the number of blades in the second lost section. The above-described method is not used in a case in which video data used for generating the first 3D data are different from that used for generating the second 3D data.

After Step S145, the parameter generation unit 53 generates a conversion parameter on the basis of the lost section in Step S106. At this time, the parameter generation unit 53 generates a conversion parameter used for separating the first 3D data and the second 3D data from each other by the length or the angle of the lost section.

Each aspect of the present invention may include the following modified example. The structure information indicates two or more positions at which the distal end 20 of the insertion unit 2 to be inserted inside an object having a subject is disposed.

Each aspect of the present invention may include the following modified example. The structure information includes first position information (first camera trace data) and second position information (second camera trace data). The first position information indicates two or more positions at which the distal end 20 is disposed in order to acquire two or more first images. The second position information indicates two or more positions at which the distal end 20 is disposed in order to acquire two or more second images. The parameter generation unit 53 generates a position conversion parameter and a posture conversion parameter used for converting the first 3D coordinate system and the second 3D coordinate system into a common coordinate system on the basis of the first position information and the second position information in a generation step (Step S144). The conversion unit 54 converts the first 3D coordinate system and the second 3D coordinate system into the common coordinate system by using the position conversion parameter and the posture conversion parameter in a conversion step (Step S107).

Each aspect of the present invention may include the following modified example. The first 3D data are generated by using the two or more first images. The second 3D data are generated by using the two or more second images. The two or more first images and the two or more second images are included in one video file.

Each aspect of the present invention may include the following modified example. The lost section calculation unit 60 calculates a position of a lost region on the basis of the number of the two or more first images, the number of the two or more second images, and the number of third images in a calculation step (Step S145). The third images are temporally disposed between the two or more first images and the two or more second images in the video file. The lost region is a region of a subject different from any one of a first region of the subject and a second region of the subject. The first region corresponds to the 3D coordinates included in the first 3D data. The second region corresponds to the 3D coordinates included in the second 3D data. The conversion unit 54 converts the first 3D coordinate system and the second 3D coordinate system into the common coordinate system on the basis of the position of the lost region in the conversion step (Step S107).

In the fifth embodiment, the image display device 50c can connect the first 3D data and the second 3D data together and can display an image of a 3D shape of a wide range. In addition, the image display device 50c can display an image of a 3D shape close to an original shape of a subject by considering the lost section.

Modified Example of Fifth Embodiment

A modified example of the fifth embodiment of the present invention will be described. In the fifth embodiment described above, camera trace data generated through image processing are used. On the other hand, in the modified example of the fifth embodiment, a position of a camera is calculated by using sensor data, and data indicating the position are used instead of the camera trace data. In the modified example of the fifth embodiment, the image display device 50c shown in FIG. 38 is used.

Figure 47:
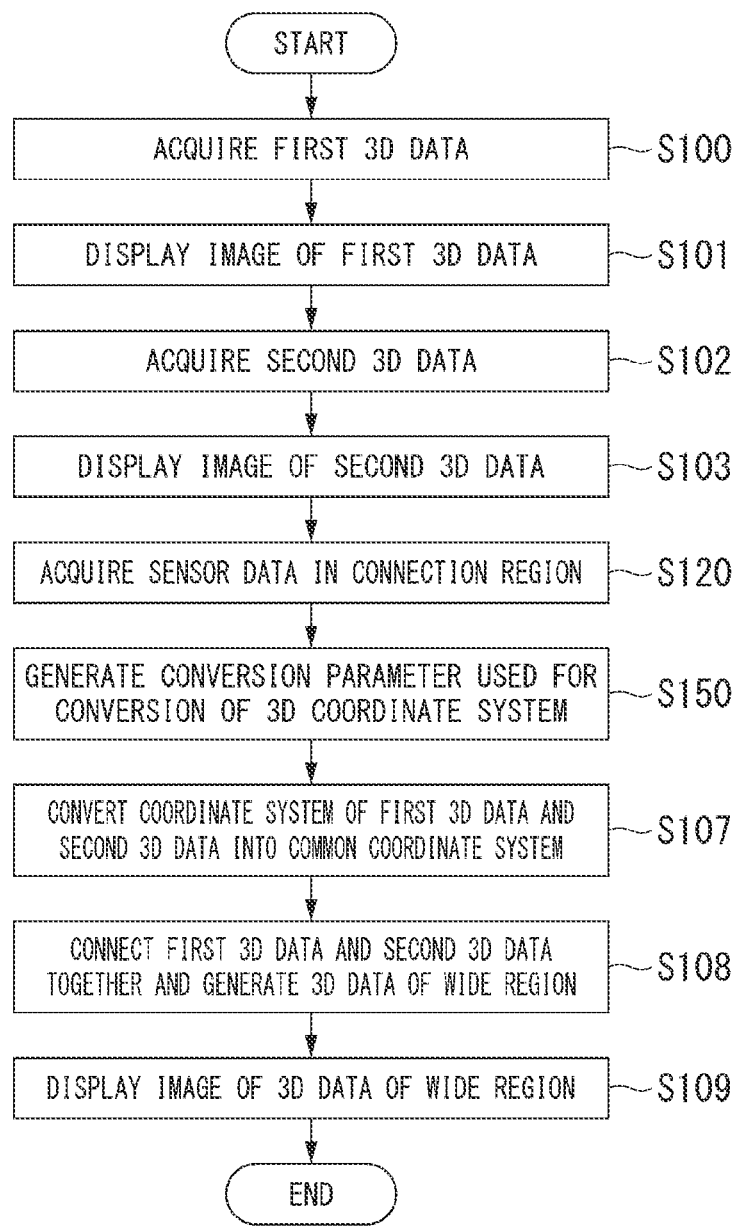
FIG. 47 is a flow chart showing a procedure of processing executed by an image display device according to a modified example of the fifth embodiment of the present invention.

For example, an IMU or an insertion-length sensor is used. The IMU is disposed in the distal end 20 of the insertion unit 2. The insertion-length sensor is disposed in the base end portion of the insertion unit 2 shown in FIG. 22 or is disposed in a drum that houses the insertion unit 2. The insertion-length sensor determines a length (insertion-length) of a part of the insertion unit 2 inserted into an inspection target. Processing executed by the image display device 50c will be described by using FIG. 47. FIG. 47 shows a procedure of the processing executed by the image display device 50c. The same processing as that shown in FIG. 2 will not be described.

After Step S103, the data acquisition unit 52 connects to the storage unit 73 and acquires sensor data in a connection region from the storage unit 73 (Step S120). For example, the data acquisition unit 52 acquires sensor data in a section from the time point of the terminal end of the first 3D data to the time point of the start end of the second 3D data from the storage unit 73. Step S120 is the same as that shown in FIG. 29.

After Step S120, the parameter generation unit 53 generates a conversion parameter on the basis of the sensor data acquired in Step S120 (Step S150).

For example, the parameter generation unit 53 calculates traces of the distal end 20 of the insertion unit 2 by using sensor data of an IMU. The traces indicate two or more positions at which the distal end 20 is disposed. The parameter generation unit 53 determines movement of the distal end 20 on the basis of the traces. Specifically, the parameter generation unit 53 determines whether the distal end 20 moves linearly or bends by 90 degrees. In addition, the lost section calculation unit 60 calculates a length of a lost section by using the method in the fifth embodiment.

In a case in which sensor data of an insertion-length sensor are used, the parameter generation unit 53 cannot determine whether the distal end 20 moves linearly or bends by 90 degrees. The lost section calculation unit 60 can calculate the length of the lost section by using the sensor data of the insertion-length sensor. In a case in which the history information of operations related to bending of the insertion unit 2 in the second modified example of the third embodiment is used, the parameter generation unit 53 can determine whether the distal end 20 moves linearly or bends by 90 degrees on the basis of the history information. The lost section calculation unit 60 can calculate a shape of the lost section on the basis of the history information.

When stator blades of a gas turbine are inspected, the distal end of a scope moves above the periphery of the disk of the stator blades. Even in this case, the parameter generation unit 53 can calculate the length of the lost section by using the sensor data of the insertion-length sensor.

Figure 48:
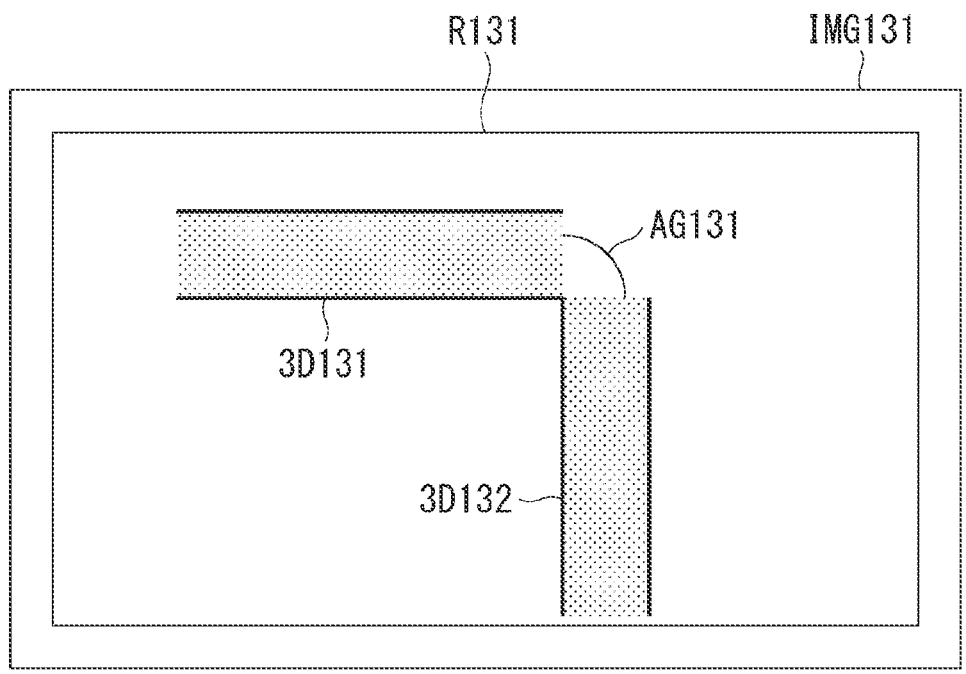
FIG. 48 is a diagram showing an example of an image displayed on a display unit according to the modified example of the fifth embodiment of the present invention.

FIG. 48 shows an example of an image displayed on the display unit 71. The display control unit 56 displays an image IMG131 on the display unit 71. The image IMG131 includes a region R131. An image of a first 3D shape 3D131 and a second 3D shape 3D132 is displayed in the region R131. The first 3D shape 3D131 is indicated by the first 3D data. The second 3D shape 3D132 is indicated by the second 3D data.

In the example shown in FIG. 48, the parameter generation unit 53 determines that the distal end 20 bends by 90 degrees. Therefore, the parameter generation unit 53 generates a position-and-posture conversion parameter used for causing the center axis of the second 3D shape 3D132 to be orthogonal to the center axis of the first 3D shape 3D131. The first 3D shape 3D131 and the second 3D shape 3D132 are disposed such that an angle AG131 between the first 3D shape 3D131 and the second 3D shape 3D132 becomes 90 degrees.

In the second modified example of the third embodiment described above, the parameter generation unit 53 generates a conversion parameter by using the structure information. On the other hand, in the modified example of the fifth embodiment, the parameter generation unit 53 generates a conversion parameter by using the sensor data without using the structure information.

Each aspect of the present invention may include the following modified example. The lost section calculation unit 60 calculates a shape of the lost region in a calculation step (Step S150). The conversion unit 54 converts the first 3D coordinate system and the second 3D coordinate system into a common coordinate system on the basis of the shape of the lost region in a conversion step (Step S107).

In the modified example of the fifth embodiment, the image display device 50c can connect the first 3D data and the second 3D data together and can display an image of a 3D shape of a wide range. In addition, the image display device 50c can display an image of a 3D shape by considering the lost section.

Sixth Embodiment

A sixth embodiment of the present invention will be described. Industrial endoscope devices have been used for an inspection of internal abnormalities (damage, corrosion, and the like) of boilers, gas turbines, automobile engines, pipes, and the like. In order to enable validation of contents of an inspection performed by an inspector, a video is generally recorded during the inspection.

A technique of reconfiguring a 3D shape of an inspection target by using a video is known. The video is generated on the basis of an optical image acquired through a single-eye optical system. By using this technique, an endoscope device can acquire 3D data of a wide range of the inspection target.

3D data of an inspection target may be used so that a user can recognize a region that has been inspected and a region that has not been inspected. 3D data of the region that has been inspected are generated, but 3D data of the region that has not been inspected are not generated. In a case in which the inspection target has a unique shape, the user can recognize which region of the inspection target actually corresponds to a region of the 3D data. The user can recognize the inspected region in the inspection target by checking the 3D shape indicated by the 3D data.

However, a heat exchange tube, a gas turbine, or the like, which is a typical inspection target in an endoscopic inspection, has only a few unique structures. Therefore, it is difficult for a user to recognize which region of the inspection target corresponds to a region of the 3D data. Even in a case in which a user visually compares the 3D data with reference data of the inspection target, it is difficult for a user to recognize which region of the reference data corresponds to a region of the 3D data.

The sixth embodiment provides a method causing a user to recognize a region that has been inspected and a region that has not been inspected even when a subject does not have a unique structure. For example, the subject includes a structure (for example, a pipe) in which the same shape continues. Alternatively, the subject includes a plurality of structures (for example, blades) having the same shape.

The sixth embodiment is almost the same as the fourth embodiment. However, 3D data are not divided into two pieces in the sixth embodiment. Hereinafter, an example in which a subject is a blade will be described. The 3D shape indicated by the 3D data is close to a circle.

Figure 49:
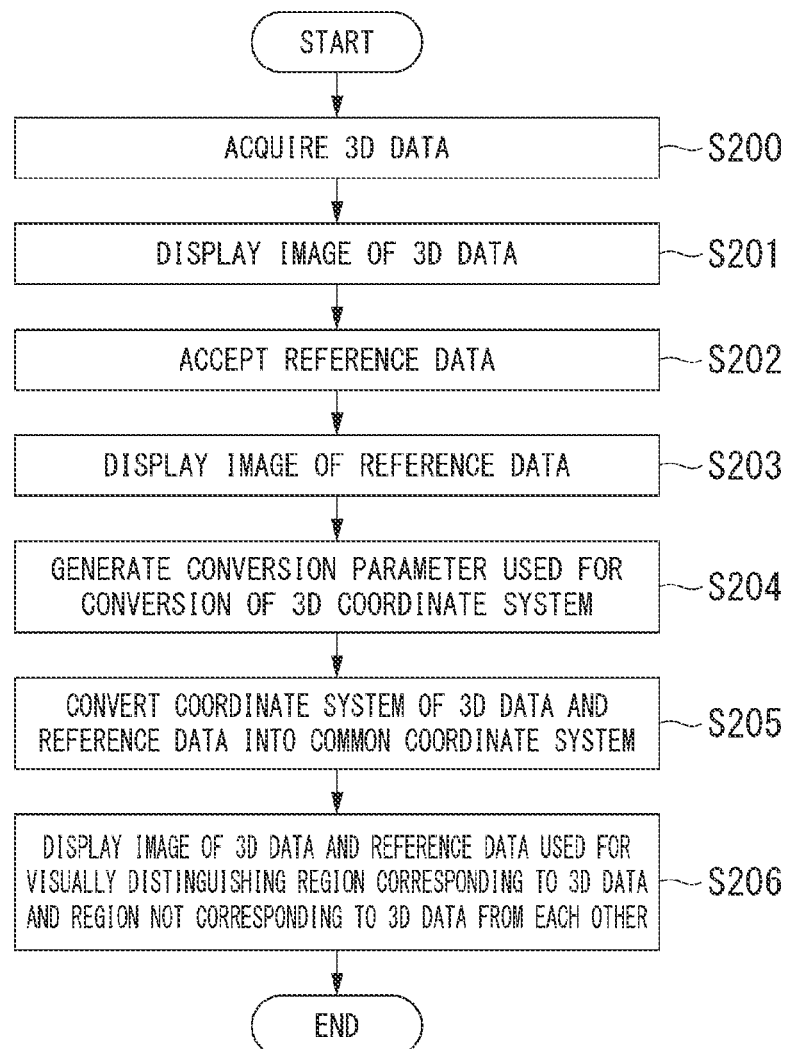
FIG. 49 is a flow chart showing a procedure of processing executed by an image display device according to a sixth embodiment of the present invention.

In the sixth embodiment, the image display device 50 shown in FIG. 1 is used. Processing executed by the image display device 50 will be described by using FIG. 49. FIG. 49 shows a procedure of the processing executed by the image display device 50.

The data acquisition unit 52 connects to the storage unit 73 and acquires the 3D data from the storage unit 73 (Step S200). After Step S200, the display control unit 56 displays an image of the 3D data on the display unit 71 (Step S201). In the first to fifth embodiments described above, two types of 3D data are acquired from the storage unit 73, and an image of each piece of the 3D data is displayed on the display unit 71. On the other hand, in the sixth embodiment, one type of 3D data are acquired from the storage unit 73, and an image of the 3D data is displayed on the display unit 71.

After Step S201, the information acceptance unit 57 accepts the reference data (Step S202). For example, the communication unit 72 receives the reference data from an external device. The information acceptance unit 57 accepts the reference data received by the communication unit 72. The reference data include structure information. An ID is allocated to each of two or more blades having the same shape. The reference data include the ID of each blade.

The reference data are data generated by using 3D-CAD, data indicating a two-dimensional shape in an arbitrary plane, or the like. As long as the reference data include the structure information and IDs are associated with the reference data, the format of the reference data is not limited to the above-described examples.

IDs do not need to be allocated to blades before the information acceptance unit 57 accepts the reference data. A user may allocate the IDs to the blades after the information acceptance unit 57 accepts the reference data. Alternatively, the IDs may be automatically allocated to the blades.

After Step S202, the display control unit 56 displays an image of the reference data accepted in Step S201 on the display unit 71 (Step S203).

The order of Steps S200 to S203 is not limited to that shown in FIG. 49. For example, Step S200 and Step S201 may be executed after Step S202 and Step S203 are executed. Alternatively, Step S201 and Step S203 may be executed after Step S200 and
Step S202 are executed. Step S201 and Step S203 may be omitted.

After Step S203, the parameter generation unit 53 generates a conversion parameter used for converting the 3D coordinate system of the 3D data and the 3D coordinate system of the reference data into a common coordinate system (Step S204).

Hereinafter, an example in which the 3D coordinate system of the reference data is the reference of coordinate systems and is used as the common coordinate system will be described. In the following example, the parameter generation unit 53 generates a position-and-posture conversion parameter used for causing the position and the posture of the 3D coordinate system of the 3D data to match the position and the posture of the 3D coordinate system of the reference data, respectively. In addition, the parameter generation unit 53 generates a scale conversion parameter used for causing the scale of the 3D coordinate system of the 3D data to match the scale of the 3D coordinate system of the reference data. However, a method of generating a conversion parameter is not limited to the following example. The 3D coordinate system of the 3D data may be used as a common coordinate system. A different 3D coordinate system from any of the 3D coordinate system of the 3D data and the 3D coordinate system of the reference data may be used as a common coordinate system.

Figure 50:
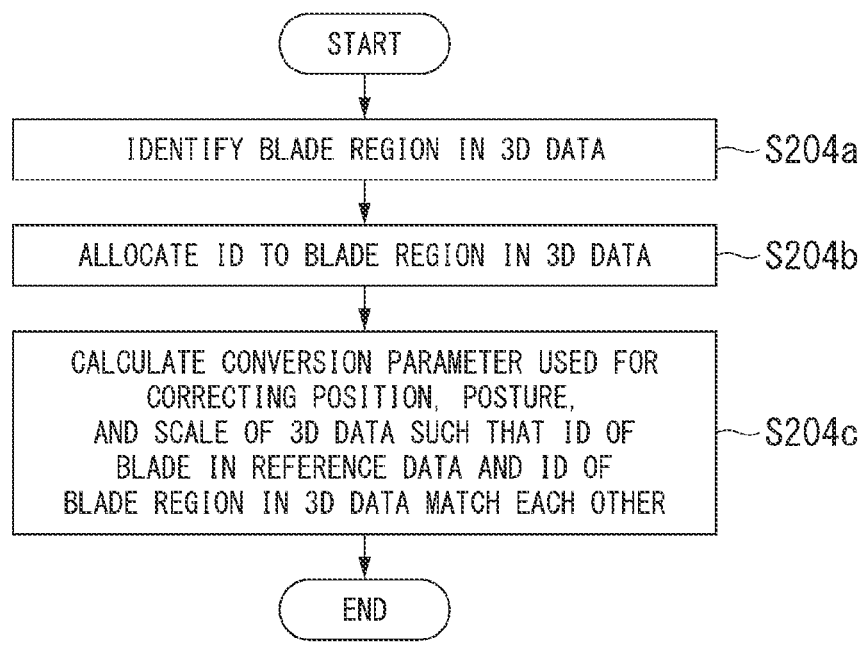
FIG. 50 is a flow chart showing a procedure of processing executed by the image display device according to the sixth embodiment of the present invention.

The parameter generation unit 53 executes processing shown in FIG. 50 in Step S204. FIG. 50 shows a procedure of the processing executed by the parameter generation unit 53.

The parameter generation unit 53 identifies blade regions in the 3D data (Step S204*a*). Each of the blade regions includes one blade.

After Step S204*a*, the parameter generation unit 53 allocates IDs to the blade regions identified in Step S204*a* (Step S204*b*).

After Step S204*b*, the parameter generation unit 53 calculates a conversion parameter used for correcting the position, the posture, and the scale of the 3D data such that the ID of a blade in the reference data and the ID of a blade region in the 3D data match each other (Step S204*c*). When Step S204*c* is executed, the processing shown in FIG. 50 is completed.

Figure 51:
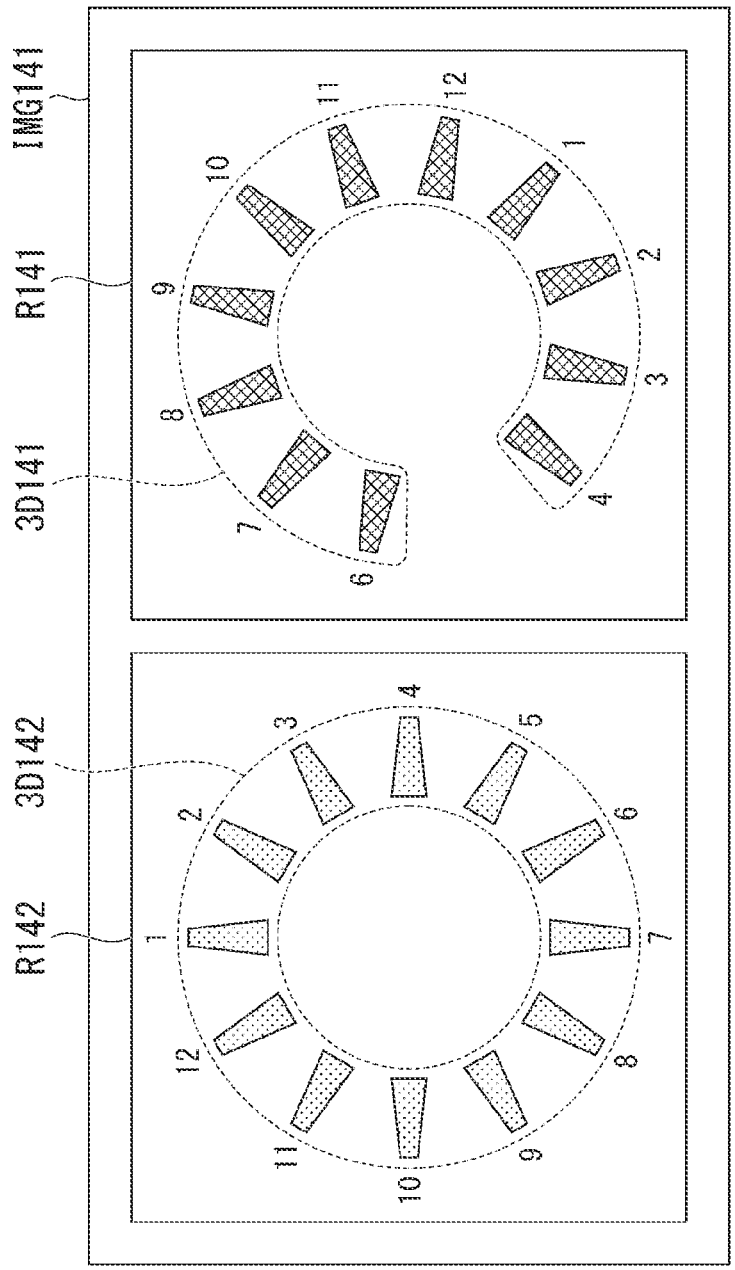
FIG. 51 is a diagram showing an example of an image displayed on a display unit according to the sixth embodiment of the present invention.

FIG. 51 shows an example of an image displayed on the display unit 71. The display control unit 56 displays an image IMG141 on the display unit 71. The image IMG141 includes a region R141 and a region R142. An image of a first 3D shape 3D141 is displayed in the region R141. The first 3D shape 3D141 is indicated by the 3D data. An image of a second 3D shape 3D142 is displayed in the region R142. The second 3D shape 3D142 is indicated by the reference data.

The first 3D shape 3D141 includes eleven blades. The IDs of the eleven blades are 1 to 4 and 6 to 12. The blade of which the ID is 5 is lost and is not included in the 3D data.

The second 3D shape 3D142 includes twelve blades. The IDs of the twelve blades are 1 to 12.

After Step S204, the conversion unit 54 converts the 3D coordinate system of the 3D data and the 3D coordinate system of the reference data into a common coordinate system by using the conversion parameter generated in Step S204. In other words, the conversion unit 54 converts the 3D data and the reference data into 3D data in the common coordinate system (Step S205). The position, the posture, and the scale of the 3D coordinate system of the reference data are not changed and the position, the posture, and the scale of the 3D coordinate system of the 3D data are changed in a case in which the 3D coordinate system of the reference data is used as the common coordinate system.

After Step S205, the display control unit 56 displays an image of a 3D shape of both the 3D data and the reference data on the display unit 71. At this time, the display control unit 56 controls the state of the image so that a user can distinguish a region corresponding to the 3D data and a region not corresponding to the 3D data from each other (Step S206). When Step S206 is executed, the processing shown in FIG. 49 is completed.

Figure 52:
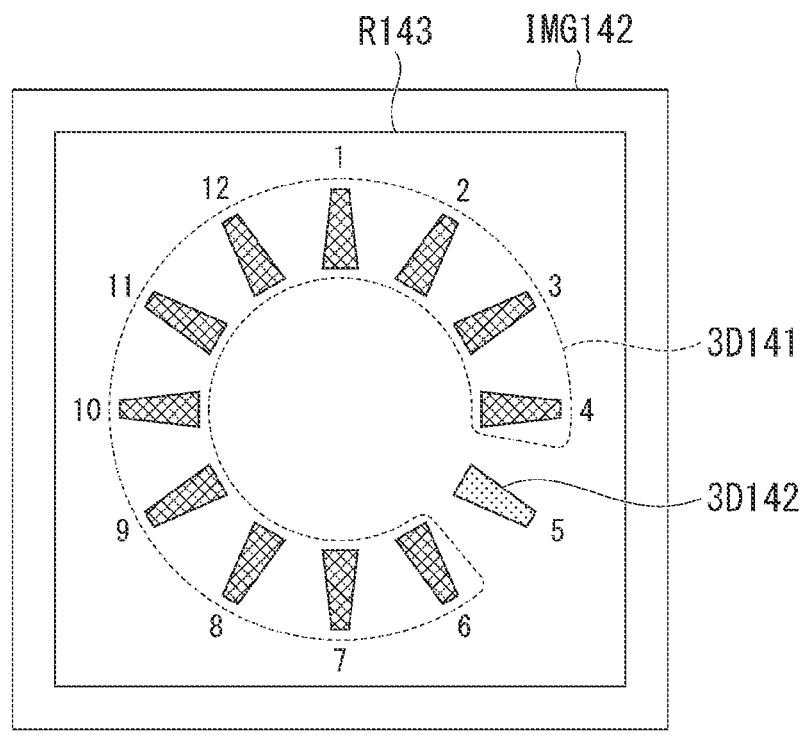
FIG. 52 is a diagram showing an example of an image displayed on the display unit according to the sixth embodiment of the present invention.

FIG. 52 shows an example of an image displayed on the display unit 71. The same parts as those shown in FIG. 51 will not be described. The display control unit 56 displays an image IMG142 on the display unit 71. The image IMG142 includes a region R143. An image of a 3D shape 3D141 and a 3D shape 3D142 is displayed in the region R143.

For example, the display control unit 56 displays the blades having the IDs of 1 to 4 and 6 to 12 in a first color and displays the blade having the ID of 5 in a second color different from the first color. The blade having the ID of 5 is not included in the 3D data. A user can check blades included in the reference data and blades not included in the reference data. In other words, the user can check blades of the reference data corresponding to the 3D data and blades of the reference data not corresponding to the 3D data.

The display control unit 56 may execute processing for highlighting a region corresponding to the 3D data or a region not corresponding to the 3D data. A user may be notified of the position of the region corresponding to the 3D data and the position of the region not corresponding to the 3D data by using voice. As long as the user can distinguish the region corresponding to the 3D data and the region not corresponding to the 3D data from each other, a method of notifying the user of a region of the 3D data is not limited to the above-described examples.

Figure 53:
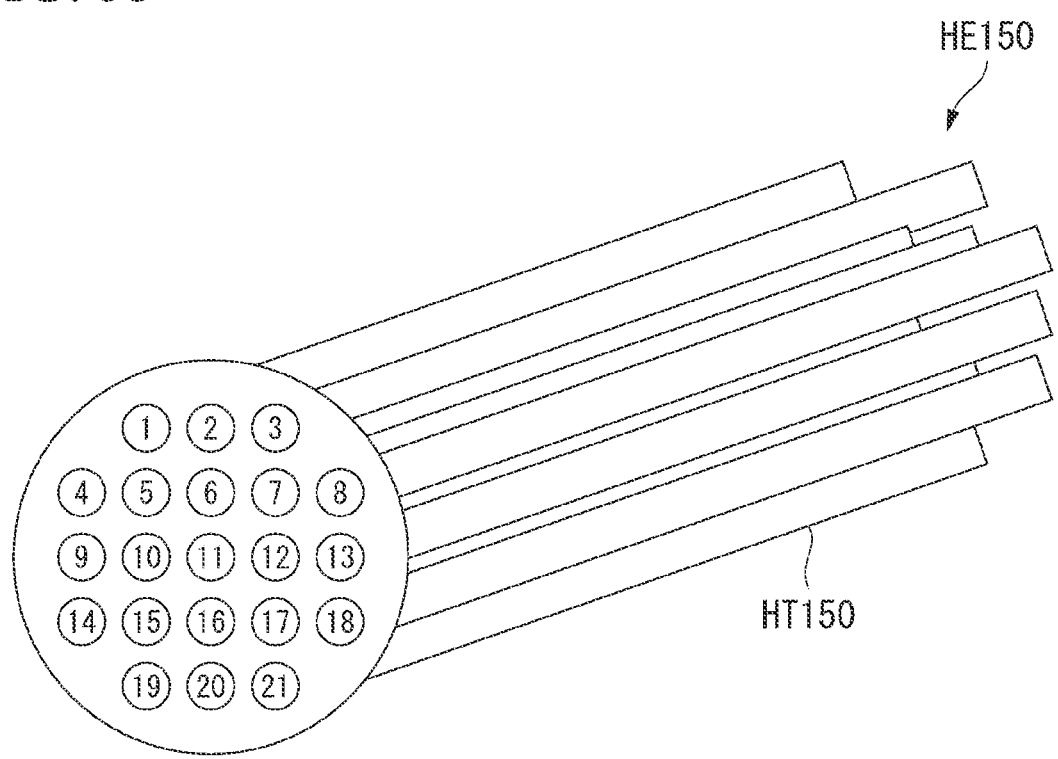
FIG. 53 is a diagram showing a structure of a heat exchanger in the sixth embodiment of the present invention.

The method in the sixth embodiment may be applied to an inspection of a combustion chamber of a gas turbine or an inspection of a heat exchanger of the gas turbine. FIG. 53 shows a configuration of a heat exchanger HE150. The heat exchanger HE150 includes two or more heat exchange tubes HT150. In general, an ID is allocated to each of two or more heat exchange tubes in reference data.

An ID may be allocated to 3D data of each heat exchange tube. The image display device 50 may execute similar processing to that shown in FIG. 49 and FIG. 50. In this way, the image display device 50 may cause the position, the posture, and the scale of the 3D data of each heat exchange tube to match the position, the posture, and the scale of a heat exchange tube of the reference data, respectively.

In the sixth embodiment, the image display device 50 can cause a user to recognize a region that has been inspected and a region that has not been inspected by using the 3D data and the reference data. Compared to a case in which only the 3D data are used, the user can easily distinguish the region that has been inspected and the region that has not been inspected from each other. Therefore, the quality of a report made by an inspector is improved.

A manager of an inspection division or a member of a client who requests an inspection approves the inspection. In general, an approver of the inspection is not very familiar with an endoscopic inspection. The approver can objectively determine whether the inspection has been correctly performed by checking a region that has been inspected and a region that has not been inspected. Therefore, reliability of the inspection is secured.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A three-dimensional image display method, comprising:
   a first acquisition step in which a processor connects to a recording medium storing first three-dimensional data of a subject and second three-dimensional data of the subject and acquires the first three-dimensional data from the recording medium,
   wherein the first three-dimensional data include three-dimensional coordinates defined in a first three-dimensional coordinate system, wherein the second three-dimensional data include three-dimensional coordinates defined in a second three-dimensional coordinate system different from the first three-dimensional coordinate system, and wherein at least part of a region of the subject corresponding to the first three-dimensional data is different from at least part of a region of the subject corresponding to the second three-dimensional data;

a second acquisition step in which the processor connects to the recording medium and acquires the second three-dimensional data from the recording medium;

a conversion step in which the processor converts the first three-dimensional coordinate system and the second three-dimensional coordinate system into a three-dimensional common coordinate system on the basis of structure information related to a geometric structure of the subject, wherein the structure information is generated without using the first three-dimensional data or the second three-dimensional data; and a display step in which the processor displays an image of the first three-dimensional data in the common coordinate system and an image of the second three-dimensional data in the common coordinate system on a display.

2. The three-dimensional image display method according to claim 1, wherein the first three-dimensional data are generated by using two or more first images acquired at two or more different viewpoints, wherein the second three-dimensional data are generated by using two or more second images acquired at two or more different viewpoints, and wherein at least one of the two or more first images and at least one of the two or more second images are different from each other.

3. The three-dimensional image display method according to claim 2, wherein each of the two or more first images and each of the two or more second images include time information, and wherein the processor converts the first three-dimensional coordinate system and the second three-dimensional coordinate system into the common coordinate system on the basis of the time information in the conversion step.

4. The three-dimensional image display method according to claim 2, wherein the two or more first images are included in two or more images included in a first video, and wherein the two or more second images are included in two or more images included in a second video that is the same as or different from the first video.

5. The three-dimensional image display method according to claim 4, wherein the two or more first images and the two or more second images are included in the same video file.

6. The three-dimensional image display method according to claim 5, further comprising a calculation step in which the processor calculates a position of a lost region on the basis of the number of the two or more first images, the number of the two or more second images, and the number of third images, wherein the third images are temporally disposed between a set of the two or more first images and a set of the two or more second images in the video file, wherein the lost region is a region of the subject different from any one of a first region of the subject and a second region of the subject, wherein the first region corresponds to the three-dimensional coordinates included in the first three-dimensional data, wherein the second region corresponds to the three-dimensional coordinates included in the second three-dimensional data, and wherein the processor converts the first three-dimensional coordinate system and the second three-dimensional coordinate system into the common coordinate system on the basis of the position of the lost region in the conversion step.

7. The three-dimensional image display method according to claim 6, wherein the processor calculates a shape of the lost region in the calculation step, and wherein the processor converts the first three-dimensional coordinate system and the second three-dimensional coordinate system into the common coordinate system on the basis of the shape of the lost region in the conversion step.

8. The three-dimensional image display method according to claim 2, wherein the structure information indicates two or more positions at which a distal end of a movable insertion unit capable of being inserted inside an object having the subject is sequentially disposed.

9. The three-dimensional image display method according to claim 8, wherein the structure information includes first position information and second position information, wherein the first position information indicates two or more positions at which the distal end is sequentially disposed in order to acquire the two or more first images, wherein the second position information indicates two or more positions at which the distal end is sequentially disposed in order to acquire the two or more second images, wherein the three-dimensional image display method further comprises a generation step in which the processor generates a position conversion parameter and a posture conversion parameter used for converting the first three-dimensional coordinate system and the second three-dimensional coordinate system into the common coordinate system on the basis of the first position information and the second position information, and wherein the processor converts the first three-dimensional coordinate system and the second three-dimensional coordinate system into the common coordinate system by using the position conversion parameter and the posture conversion parameter in the conversion step.

10. The three-dimensional image display method according to claim 2, wherein the processor converts the first three-dimensional coordinate system and the second three-dimensional coordinate system into the common coordinate system such that a first region of the subject and a second region of the subject are connected together in the conversion step, wherein the first region corresponds to the three-dimensional coordinates included in the first three-dimensional data, wherein the second region corresponds to the three-dimensional coordinates included in the second three-dimensional data, and wherein the processor displays information indicating positions of the first region and the second region on the display in the display step.

11. The three-dimensional image display method according to claim 10, wherein the processor displays information indicating accuracy of connection between the first region and the second region on the display in the display step.

12. The three-dimensional image display method according to claim 2, wherein the two or more first images and the two or more second images are generated by an endoscope.

13. The three-dimensional image display method according to claim 2, wherein the two or more first images and the two or more second images are generated on the basis of an optical image of the subject acquired through a single-eye optical system.

14. The three-dimensional image display method according to claim 2, further comprising a generation step in which the processor generates a scale conversion parameter used for correcting at least one of a scale of a three-dimensional shape indicated by the first three-dimensional data and a scale of a three-dimensional shape indicated by the second three-dimensional data, wherein the processor converts the first three-dimensional coordinate system and the second three-dimensional coordinate system into the common coordinate system by using the scale conversion parameter in the conversion step.

15. The three-dimensional image display method according to claim 2, wherein the structure information is configured as design data including a design value of the geometric structure or is configured as three-dimensional data different from any of the first three-dimensional data and the second three-dimensional data.

16. The three-dimensional image display method according to claim 2, wherein the structure information is generated on the basis of data output from a sensor.

17. The three-dimensional image display method according to claim 2, wherein the two or more first images and the two or more second images are generated on the basis of an optical image of the subject acquired by an insertion unit, wherein the insertion unit is capable of being inserted inside an object having the subject and is bendable, and wherein the structure information is generated on the basis of information indicating a bending direction and a bending amount of the insertion unit.

18. The three-dimensional image display method according to claim 2, further comprising a generation step in which the processor generates a position conversion parameter and a posture conversion parameter used for converting the first three-dimensional coordinate system and the second three-dimensional coordinate system into the common coordinate system on the basis of the structure information, wherein the processor converts the first three-dimensional coordinate system and the second three-dimensional coordinate system into the common coordinate system by using the position conversion parameter and the posture conversion parameter in the conversion step.

19. The three-dimensional image display method according to claim 2, further comprising an adjustment step in which the processor adjusts at least one of a position and a posture of at least one of the first three-dimensional data and the second three-dimensional data in the common coordinate system.

20. The three-dimensional image display method according to claim 2, wherein the subject includes two or more objects, and wherein the structure information indicates positions at which the two or more objects are disposed.

21. A three-dimensional image display device, comprising a processor configured to:

connect to a recording medium storing first three-dimensional data of a subject and second three-dimensional data of the subject, wherein the first three-dimensional data include three-dimensional coordinates defined in a first three-dimensional coordinate system, wherein the second three-dimensional data include three-dimensional coordinates defined in a second three-dimensional coordinate system different from the first three-dimensional coordinate system, and wherein at least part of a region of the subject corresponding to the first three-dimensional data is different from at least part of a region of the subject corresponding to the second three-dimensional data;

acquire the first three-dimensional data and the second three-dimensional data from the recording medium;

convert the first three-dimensional coordinate system and the second three-dimensional coordinate system into a three-dimensional common coordinate system on the basis of structure information related to a geometric structure of the subject, wherein the structure information is generated without using the first three-dimensional data or the second three-dimensional data; and display an image of the first three-dimensional data in the common coordinate system and an image of the second three-dimensional data in the common coordinate system on a display.

22. A non-transitory computer-readable recording medium storing a program causing a computer to execute:

a first acquisition step in which the computer connects to a recording medium storing first three-dimensional data of a subject and second three-dimensional data of the subject and acquires the first three-dimensional data from the recording medium, wherein the first three-dimensional data include three-dimensional coordinates defined in a first three-dimensional coordinate system, wherein the second three-dimensional data include three-dimensional coordinates defined in a second three-dimensional coordinate system different from the first three-dimensional coordinate system, and wherein at least part of a region of the subject corresponding to the first three-dimensional data is different from at least part of a region of the subject corresponding to the second three-dimensional data;

a second acquisition step in which the computer connects to the recording medium and acquires the second three-dimensional data from the recording medium;

a conversion step in which the computer converts the first three-dimensional coordinate system and the second three-dimensional coordinate system into a three-dimensional common coordinate system on the basis of structure information related to a geometric structure of the subject,
wherein the structure information is generated without using the first three-dimensional data or the second three-dimensional data; and
a display step in which the computer displays an image of the first three-dimensional data in the common coordinate system and an image of the second three-dimensional data in the common coordinate system on a display.

* * * * *